US009864508B2

(12) United States Patent
Dixon et al.

(10) Patent No.: US 9,864,508 B2
(45) Date of Patent: Jan. 9, 2018

(54) CHARACTER RECOGNITION ON A COMPUTING DEVICE

(71) Applicant: Apple Inc., Cupertino, CA (US)

(72) Inventors: Ryan S. Dixon, Mountain View, CA (US); Ueli Meier, The Hague (NL)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 14/746,620

(22) Filed: Jun. 22, 2015

(65) Prior Publication Data

US 2015/0370779 A1 Dec. 24, 2015

Related U.S. Application Data

(60) Provisional application No. 62/016,597, filed on Jun. 24, 2014.

(51) Int. Cl.
G06F 17/00 (2006.01)
G06F 3/0488 (2013.01)
G06F 3/041 (2006.01)
G06F 3/0484 (2013.01)
G06F 17/27 (2006.01)
G06F 3/023 (2006.01)
G06K 9/00 (2006.01)

(52) U.S. Cl.
CPC ........ G06F 3/04883 (2013.01); G06F 3/0236 (2013.01); G06F 3/0412 (2013.01); G06F 3/04842 (2013.01); G06F 3/04886 (2013.01); G06F 17/276 (2013.01); G06K 9/00402 (2013.01); G06F 2203/04101 (2013.01); G06F 2203/04104 (2013.01); G06F 2203/04808 (2013.01); G06K 2209/01 (2013.01)

(58) Field of Classification Search
CPC .................................................. G06F 3/04883
See application file for complete search history.

(56) References Cited

U.S. PATENT DOCUMENTS

| 4,672,677 | A | 6/1987 | Yamakawa |
|---|---|---|---|
| 5,029,223 | A | 7/1991 | Fujisaki |
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |

(Continued)

FOREIGN PATENT DOCUMENTS

| EP | 0 608 708 A2 | 8/1994 |
|---|---|---|
| EP | 0 624 853 A2 | 11/1994 |

(Continued)

OTHER PUBLICATIONS

Non-Final Office Action dated Apr. 24, 2017, for U.S. Appl. No. 14/746,662, filed Jun. 22, 2015, eight pages.

(Continued)

*Primary Examiner* — Keith Bloomquist
(74) *Attorney, Agent, or Firm* — Morrison & Foerster LLP

(57) ABSTRACT

In some embodiments, a device performs character recognition based on spatial and temporal components of touch input detected on a touch-sensitive surface. In some embodiments, a device provides feedback about handwritten input and its recognition by the device. In some embodiments, a device presents a user interface for changing previously-inputted characters.

32 Claims, 41 Drawing Sheets

(56) References Cited

U.S. PATENT DOCUMENTS

| | | |
|---|---|---|
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,963,847 B2 | 2/2015 | Hunt |
| 2004/0070573 A1 | 4/2004 | Graham |
| 2004/0161151 A1 | 8/2004 | Iwayama et al. |
| 2006/0197753 A1 | 9/2006 | Hotelling |
| 2008/0260252 A1* | 10/2008 | Borgaonkar ....... G06K 9/00422 382/189 |
| 2012/0216113 A1 | 8/2012 | Li |
| 2012/0308143 A1* | 12/2012 | Bellegarda ............... G06K 9/48 382/197 |
| 2014/0111416 A1* | 4/2014 | Sugiura ............... G06F 3/04883 345/156 |
| 2014/0171153 A1 | 6/2014 | Kienzle et al. |
| 2015/0169975 A1* | 6/2015 | Kienzle .................... G06K 9/34 382/189 |
| 2015/0370475 A1 | 12/2015 | Howard et al. |

FOREIGN PATENT DOCUMENTS

| | | |
|---|---|---|
| EP | 2 386 984 A2 | 11/2011 |
| EP | 2 535 844 A2 | 12/2012 |
| JP | 2000-163031 A | 6/2000 |
| JP | 2002-342033 A | 11/2002 |
| WO | WO-94/09438 A2 | 4/1994 |
| WO | WO-2015/200228 A1 | 12/2015 |

OTHER PUBLICATIONS

Bohn, D. (Jan. 6, 2014). "Rebooting webOS: how LG rethought the smart TV," The Verge, located at: http://www.theverge.com/2014/1/6/5279220/rebooting-webos-how-lg-rethought-the-smart-tv, retreieved on Jul. 11, 2014, five pages.

Grey, M. (2013). "Comcast's new X2 platform moves your DVR recordings from the box to the cloud," engadget, located at: http://www.engadget.com/2013/06/11/comcast-x2-platform/, retreieved on Jul. 11, 2014, two pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Jun. 27, 2017, for U.S. Appl. No. 14/746,662, filed Jun. 22, 2015, nine pages.

Non-Final Office Action dated Aug. 9, 2016, for U.S. Appl. No. 14/746,662, filed Jun. 22, 2015, seven pages.

International Search Report dated Dec. 10, 2015, for PCT Application No. PCT/US2015/037030, filed Jun. 22, 2015, seven pages.

* cited by examiner

CHARACTER RECOGNITION ON A COMPUTING DEVICE

CROSS REFERENCE TO RELATED APPLICATIONS

This Application claims the benefit of U.S. Provisional Application No. 62/016,597 filed on Jun. 24, 2014, the entire disclosure of which is herein incorporated by reference for all purposes.

FIELD OF THE DISCLOSURE

This relates generally to electronic devices that are capable of recognizing handwritten input provided to the devices.

BACKGROUND OF THE DISCLOSURE

User interaction with devices such as computers and other electronic computing devices has increased significantly in recent years. These devices can be devices such as computers, tablet computers, televisions, multimedia devices, and the like.

Interaction with these devices can be performed using various input devices, such as touch screen displays, touch-sensitive surfaces, remote controls, mice and other input devices. Touch-sensitive surfaces and touch screen displays, in particular, have become increasingly popular input devices, as has providing handwritten input using such input devices. Providing for robust character recognition of handwritten input enhances the user's experience with the device by reducing errors in character input and decreases user interaction time, which is particularly important where input devices are battery-operated.

SUMMARY OF THE DISCLOSURE

The embodiments described in this disclosure are directed to one or more devices that optionally perform character recognition, provide feedback relating to handwritten input, and present a user interface for changing previously-inputted characters, and one or more actions that the devices optionally perform that are related to the above. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
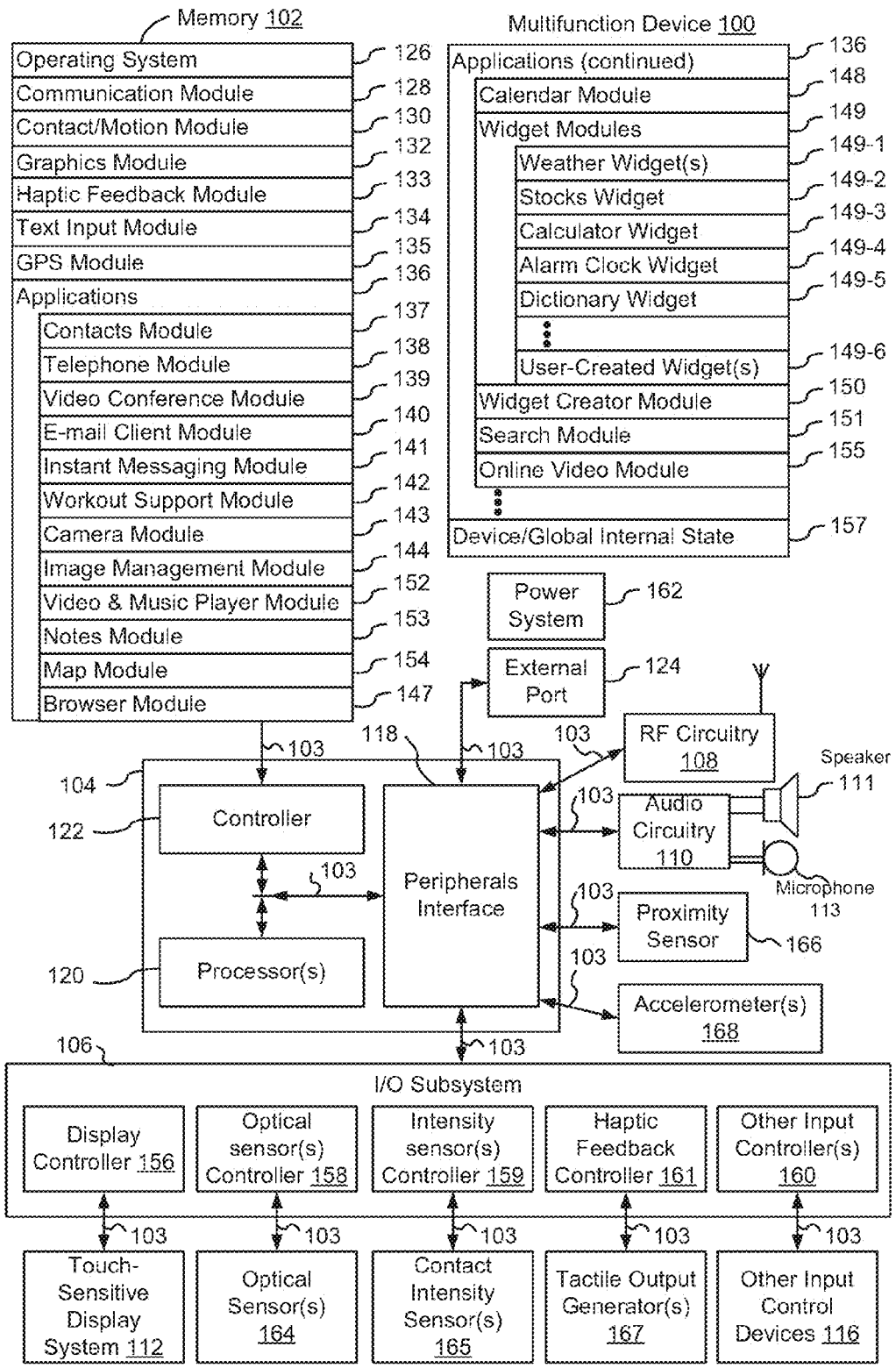
FIG. 1A is a block diagram illustrating a multifunction device with a touch-sensitive display in accordance with some embodiments.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
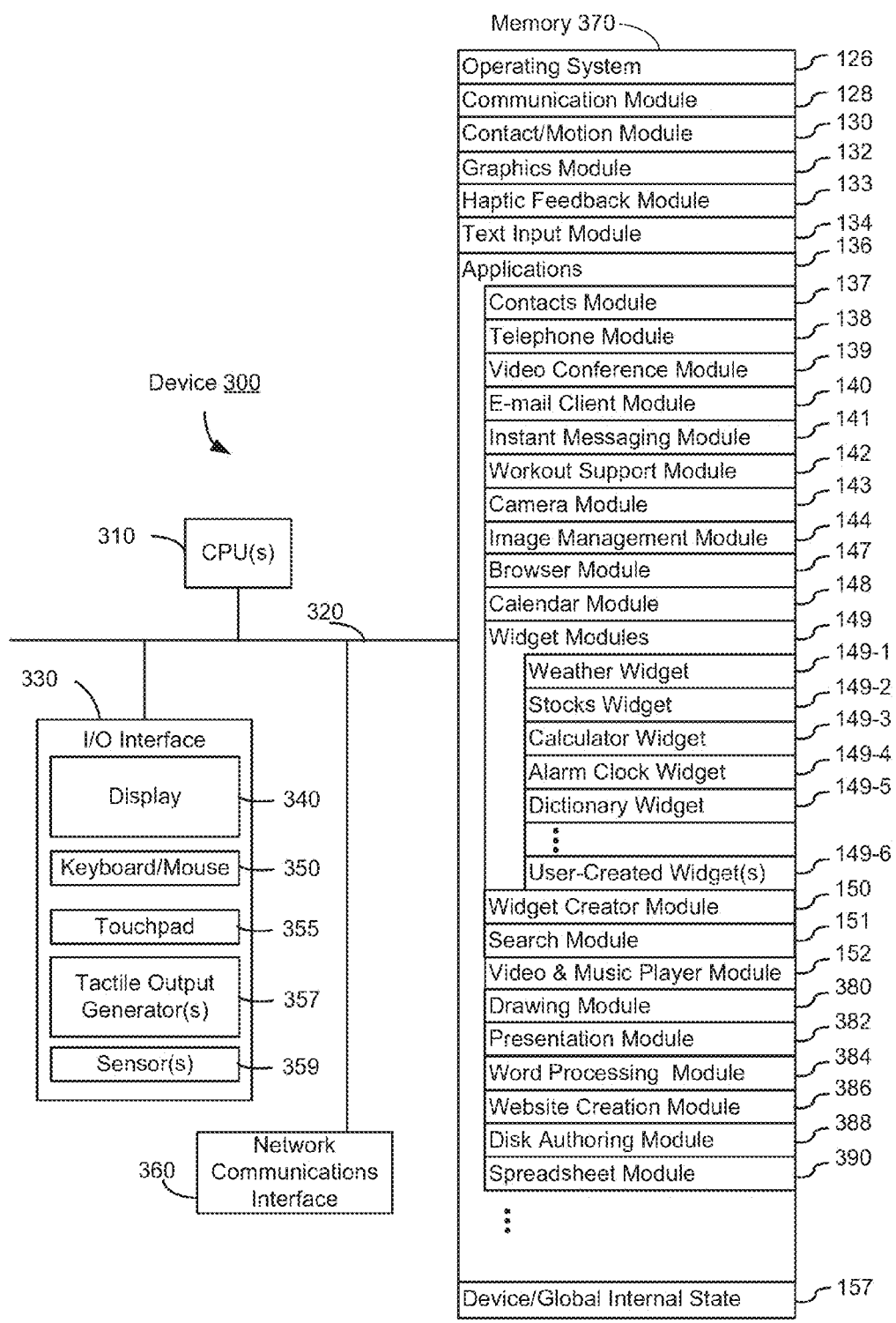
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154;
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
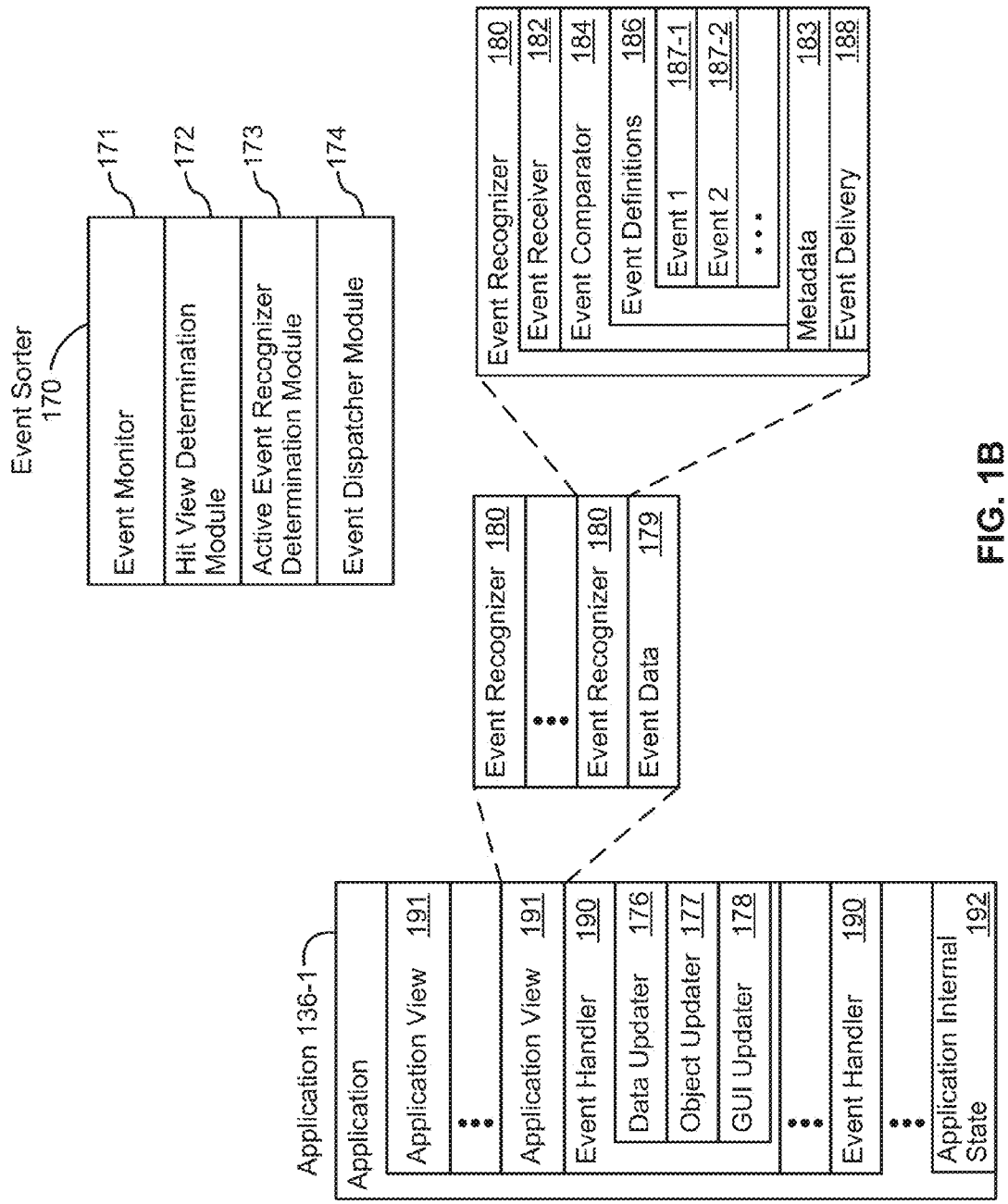
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture).

Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
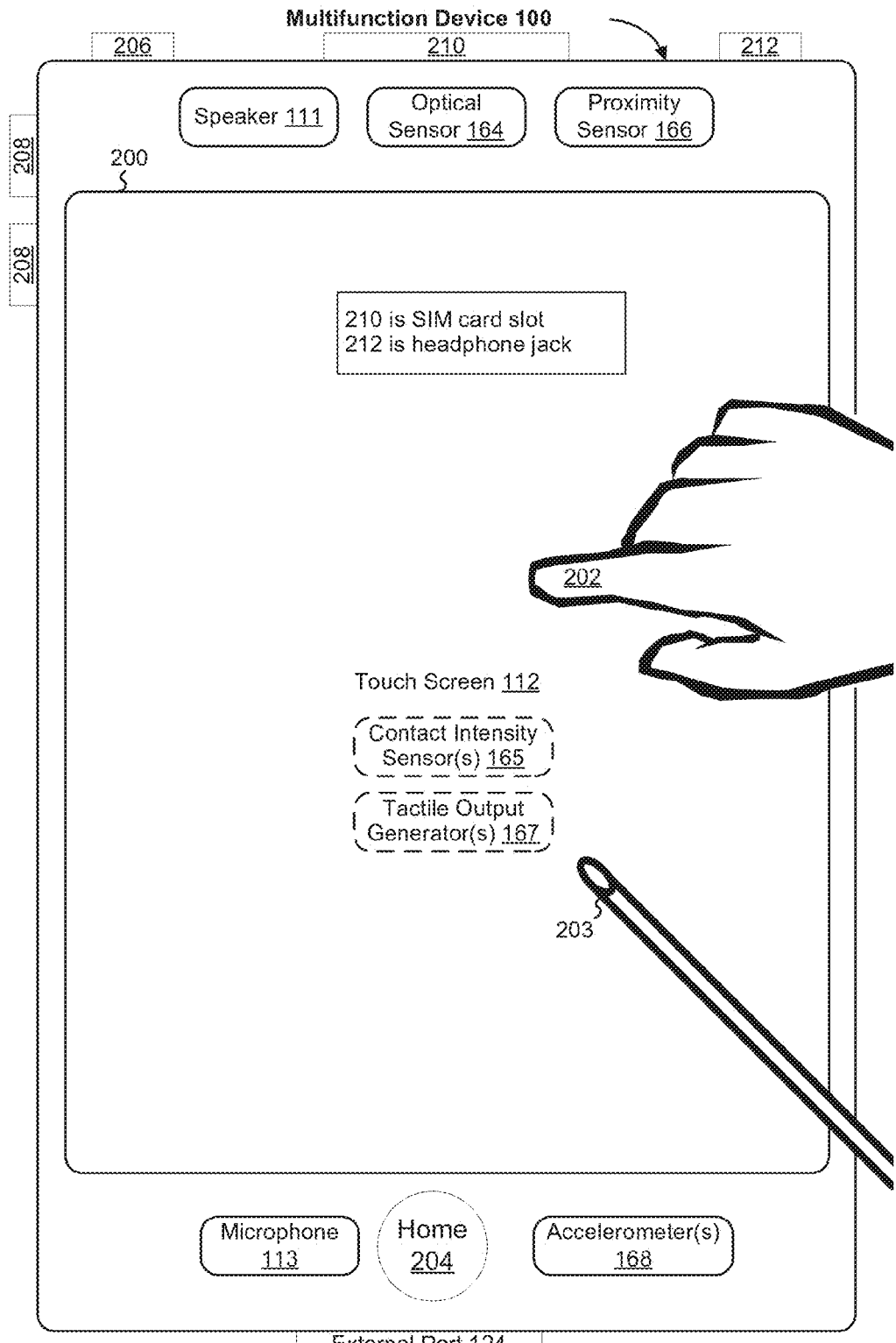
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
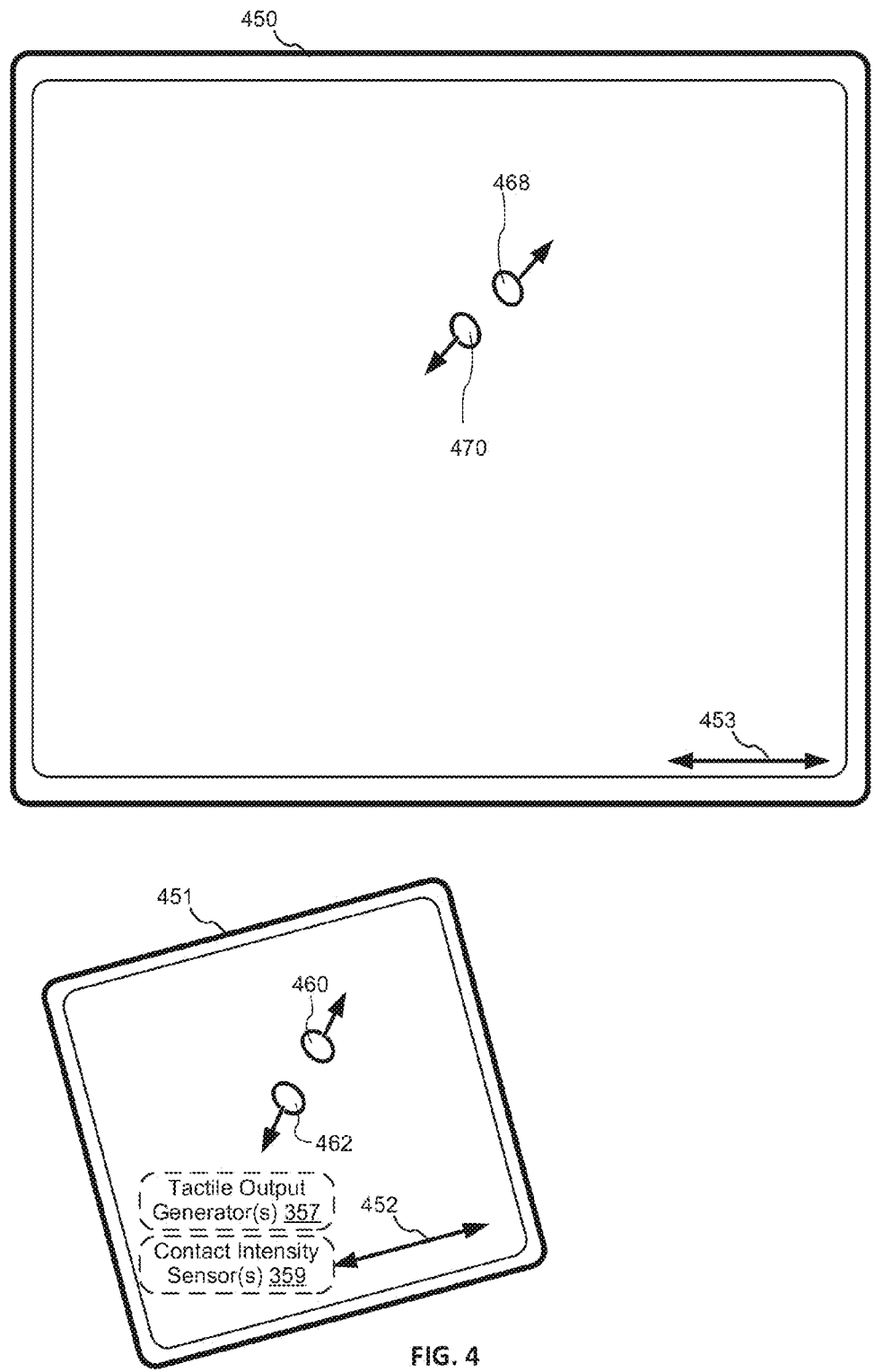
FIG. 4 illustrates an exemplary user interface for a multifunction device with a touch-sensitive surface that is separate from the display in accordance with some embodiments.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
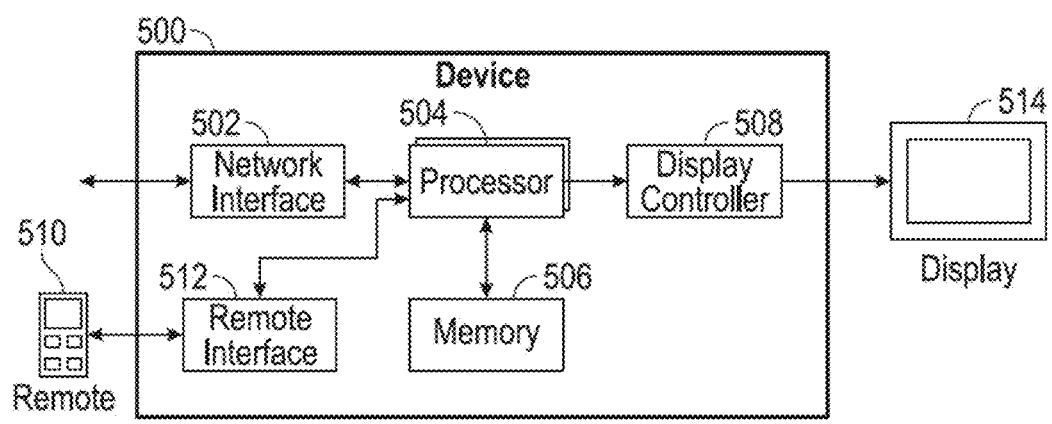
FIG. 5 illustrates a block diagram of an exemplary architecture for the device according to some embodiments of the disclosure.

FIG. 5 illustrates a block diagram of an exemplary architecture for the device 500 according to some embodiments of the disclosure. In the embodiment of FIG. 5, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, and/or 1100).

In some embodiments, display controller 508 causes the various user interfaces of the disclosure to be displayed on display 500. Further, input to device 500 is optionally provided by remote 510 via remote interface 512, which is optionally a wireless or a wired connection. It is understood that the embodiment of FIG. 5 is not meant to limit the features of the device of the disclosure, and that other components to facilitate other features described in the disclosure are optionally included in the architecture of FIG. 5 as well. In some embodiments, device 500 optionally corresponds to one or more of multifunction device 100 in FIGS. 1A and 2, and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 510 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and display 514 optionally corresponds to one or more of touch-sensitive display system 112 in FIGS. 1A and 2, display 340 in FIG. 3, and display 450 in FIG. 4.

User Interfaces and Associated Processes

Spatial and Temporal Character Recognition

Accurate recognition of handwritten character input to a device is generally desirable, as accurate recognition reduces unwanted input to the device by a user. The embodiments described below provide ways to provide for accurate handwritten character input recognition on a device, thus enhancing the user's interaction with the device. Enhancing interactions with a device reduces the amount of time needed by a user to perform operations, and thus reduces the power usage of the device and increases battery life for battery-powered devices.

It is understood that people use devices. When a person uses a device, that person is optionally referred to as a user of the device. Thus, in this disclosure, references to a "person" or "people" are optionally interchangeable with references to a "user" or "users", and references to a "user" or "users" are optionally interchangeable with references to a "person" or "people".

FIGS. 6A-6D illustrate exemplary ways in which handwritten character input to a device is recognized in accordance with some embodiments of the disclosure. The embodiments in these figures are used to illustrate the processes described below, including the processes described with reference to FIGS. 7A-7D.

Figure 6A:
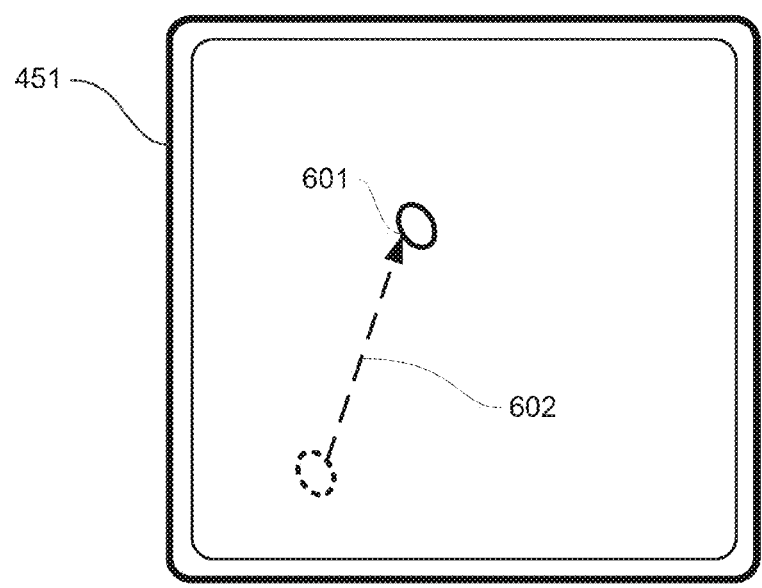
FIGS. 6A-6D illustrate exemplary ways in which handwritten character input to a device is recognized in accordance with some embodiments of the disclosure.

FIG. 6A illustrates an exemplary input detected on a touch-sensitive surface of the disclosure. Touch-sensitive surface 451 optionally corresponds to a touch-sensitive surface on remote 510 in FIG. 5. The input illustrated in FIG. 6A optionally includes movement of contact 601 in an upward-rightward direction. The movement of contact 601 optionally defines stroke 602. In some embodiments, a stroke is defined as the movement of a contact from touchdown of the contact to liftoff of the contact. In some embodiments, a stroke is defined as the movement of a contact from a start of motion of the contact until the contact has been substantially stationary (e.g., has moved less than a threshold amount in distance and/or speed) for at least a threshold amount of time.

Stroke 602 optionally includes a spatial component and a temporal component. The spatial component of stroke 602 optionally describes the final shape or appearance of stroke 602—in this case, a diagonal line tiled to the right. The temporal component of stroke 602 optionally describes what stroke 602 looked like over time. For example, the temporal component of stroke 602 optionally includes information identifying where stroke 602 began (e.g., in this case, in a bottom-left position on touch-sensitive surface 451), and how stroke 602 progressed as a function of time (e.g., in this case, in an upward-rightward direction, ending in a top-right position on touch-sensitive surface 451).

In recognizing a character that stroke 602 corresponds to, a device (e.g., device 500 in FIG. 5 in communication with touch-sensitive surface 451) optionally analyzes the spatial component of stroke 602 and the temporal component of stroke 602. Analyzing both the spatial and temporal components of stroke 602 will, in many circumstances results in a more accurate determination of stroke 602's character correspondence than analyzing the spatial component or temporal component alone, as described below. For example, a stroke that is meant to be a lower case A but that looks like an O will, in some circumstances, appear to correspond to an O when analyzed spatially, but when analyzed temporally, the stroke will appear to correspond to an "a", because the temporal component optionally indicates that there was movement of the contact creating the tail of the "a" even if that movement overlaps with the rest of the shape so that a spatial analysis of the shape looks more like an O. This movement is unlikely to exist if the input were an O and thus an O is an unlikely character for insertion. Additionally, some characters are frequently drawn with a stroke starting moving in a particular direction (e.g., down and to the left or up and to the right) and thus a stroke that is drawn up and to the right is more likely to be the beginning of an M than the beginning of an X.

Figure 6B:
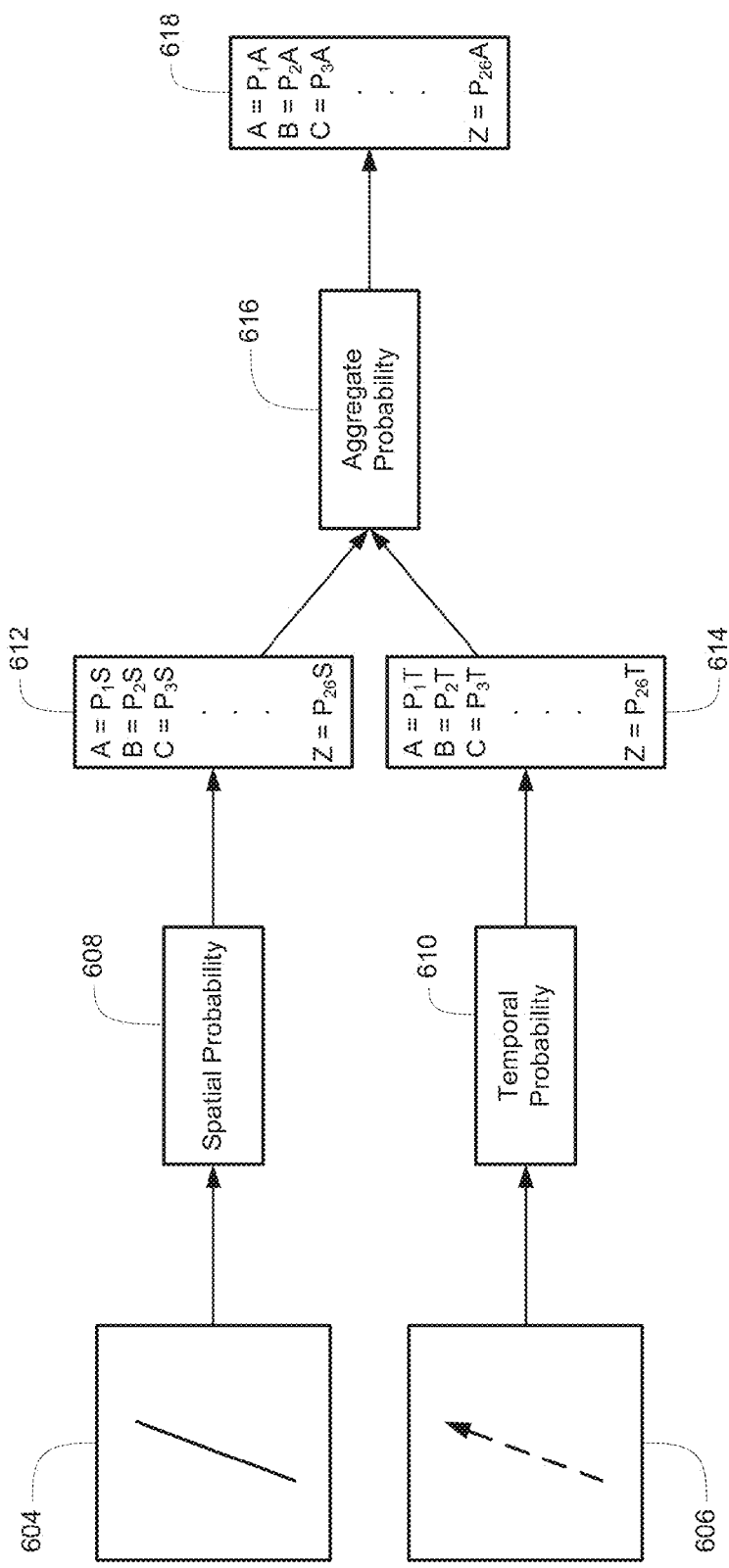

FIG. 6B shows a block diagram illustrating an exemplary character recognition technique applied to a stroke. As discussed above, stroke 602 optionally includes spatial component 604 and temporal component 606, and both components are optionally analyzed in determining one or more characters to which the stroke corresponds.

The spatial component 604 of stroke 602 is optionally inputted into a spatial probability determiner 608. Spatial probability determiner 608 optionally determines one or more probabilities that spatial component 604 of stroke 602 corresponds to one or more respective characters. For example, spatial probability determiner 608 optionally determines the probability that stroke 602 corresponds to one or more of an "A", "B", "C", etc. (optionally including any other character supported by the device of the disclosure) based on spatial component 604 (e.g., determines the probability that stroke 602 corresponds to a particular character based on the shape of stroke 602 when the determination is made). As shown in FIG. 6B, in some embodiments, spatial probability determiner 608 optionally determines respective probabilities that stroke 602 corresponds to each of characters A-Z ($P_1S$ through $P_{26}S$) based on spatial component 604 and, optionally, one or more other non-letter characters (e.g., /, ?, #, $, @, &, etc.). In some embodiments, probabilities 612 are ordered based on probability (e.g., the character to which spatial probability determiner 608 determines stroke 602 is most likely to correspond is optionally listed first, and the character to which spatial probability determiner 608 determines stroke 602 is least likely to correspond is optionally listed last).

Analogously, the temporal component 606 of stroke 602 is optionally inputted into a temporal probability determiner 610. Temporal probability determiner 610 optionally determines one or more probabilities that temporal component 606 of stroke 602 corresponds to one or more respective characters. For example, temporal probability determiner 610 optionally determines the probability that stroke 602 corresponds to one or more of an "A", "B", "C", etc. (optionally including any other character supported by the device of the disclosure) based on temporal component 606 (e.g., determines the probability that stroke 602 corresponds to a particular character based on how stroke 602 looked over time and/or changes in speed of stroke 602 over time). For example, a stroke that is meant to be a lower case A but that looks like an O optionally most likely corresponds to an O when analyzed spatially, but when analyzed temporally, optionally most likely corresponds to an "a", because the temporal component optionally indicates that there was movement of the contact creating the tail of the "a" even if that movement overlaps with the rest of the shape so that a spatial analysis of the shape looks more like an O. This movement would not exist if the input were an O. Additionally, some characters are frequently drawn with a stroke starting moving in a particular direction (e.g., down and to the left or up and to the right) and thus a stroke that is drawn up and to the right is more likely to be the beginning of an M than the beginning of an X. As shown in FIG. 6B, in some embodiments, temporal component 606 optionally includes information indicating that stroke 602 was drawn up and to the right, which optionally informs how likely it is that stroke 602 corresponds to various characters such as an "A", "M", "X", etc. As shown in FIG. 6B, in some embodiments, temporal probability determiner 610 optionally determines respective probabilities that stroke 602 corresponds to each of characters A-Z ($P_1T$ through $P_{26}T$) based on temporal component 606. As discussed above, in some embodiments, probabilities 614 are ordered based on probability (e.g., the character to which temporal probability determiner 610 determines stroke 602 is most likely to correspond is optionally listed first, and the character to which temporal probability determiner 610 determines stroke 602 is least likely to correspond is optionally listed last).

Aggregate probabilities 618 ($P_1A$ through $P_{26}A$) that stroke 602 corresponds to one or more characters are optionally determined based on spatial probabilities 612 and temporal probabilities 614 via aggregate probability determiner 616. In some embodiments, aggregate probability determiner 616 considers both the spatial 612 and temporal 614 probabilities in making a final determination about stroke 602. In some embodiments, the spatial 612 and temporal 614 probabilities are multiplied to result in aggregate probabilities 618. In some embodiments, the spatial 612 and temporal 614 probabilities are added together to result in aggregate probabilities 618, sometimes with respective weighting factors. In some embodiments, probabilities 618 are ordered based on probability (e.g., the character to which aggregate probability determiner 616 determines stroke 602 is most likely to correspond is optionally listed first, and the character to which aggregate probability determiner 616 determines stroke 602 is least likely to correspond is optionally listed last).

Aggregate probabilities 618 optionally provide more accurate likelihoods that stroke 602 corresponds to particular characters than spatial probabilities 612 or temporal probabilities 614 alone. In some embodiments, it is necessary to determine whether two or more handwritten input strokes correspond to a single character (e.g., are part of the same character) or correspond to more than one character (e.g., are part of different characters).

Figure 6C:
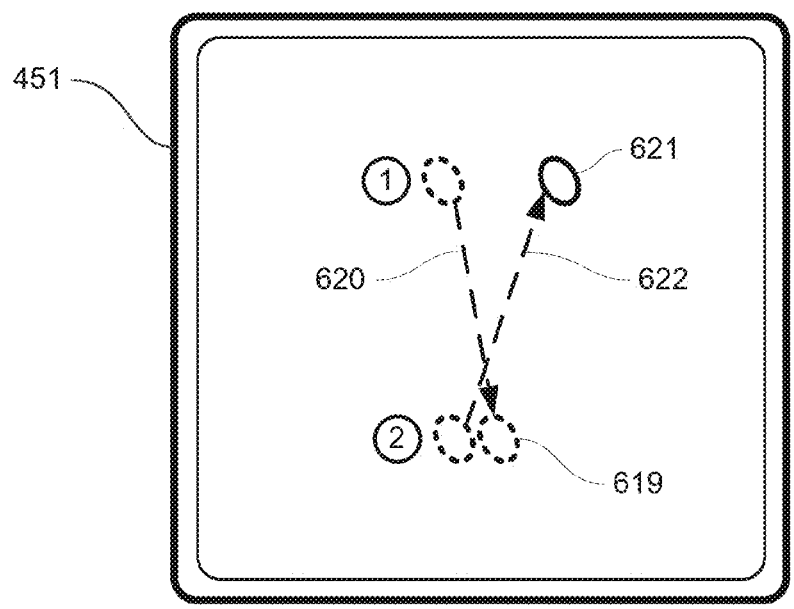

FIG. 6C illustrates an exemplary input detected on a touch-sensitive surface. The input detected on touch-sensitive surface 451 optionally includes movement of contact 619 in a downward-rightward direction (defining stroke 620), followed by movement of contact 621 in an upward-rightward direction (defining stroke 622). The device of the disclosure optionally needs to determine whether strokes 620 and 622 correspond to the same character (e.g., an "X") or to different characters (e.g., stroke 620 corresponds to an "M", and stroke 622 corresponds to an "A").

Figure 6D:
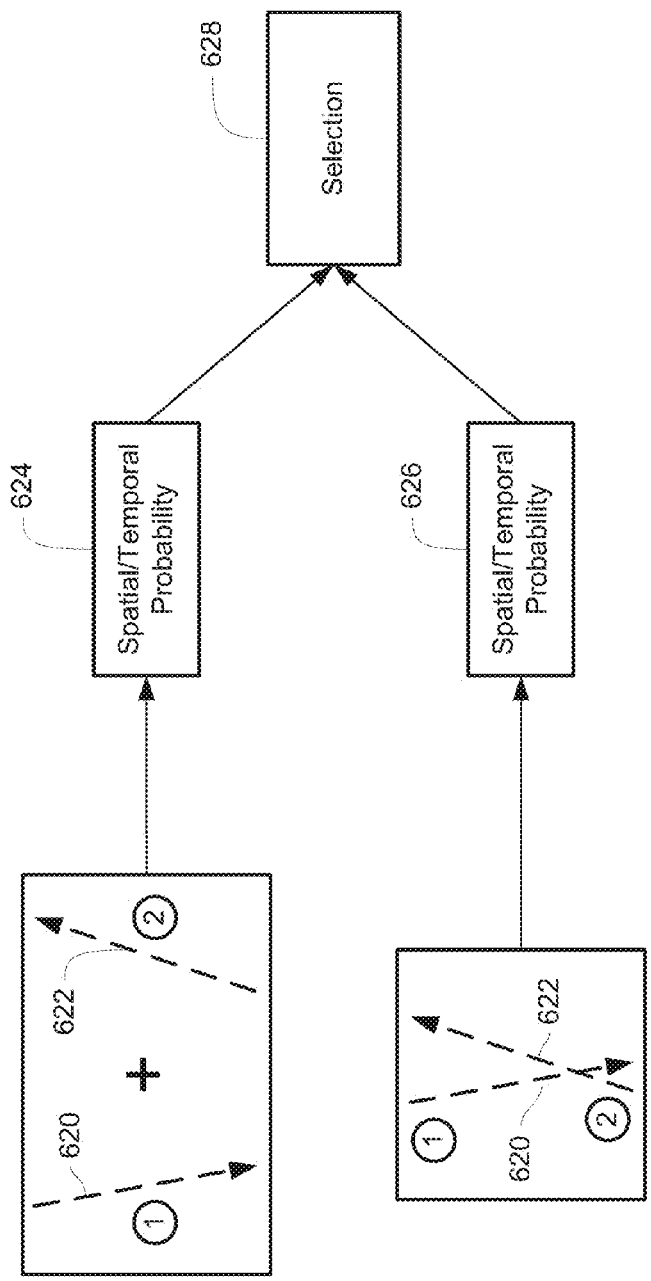
Figure 7A:
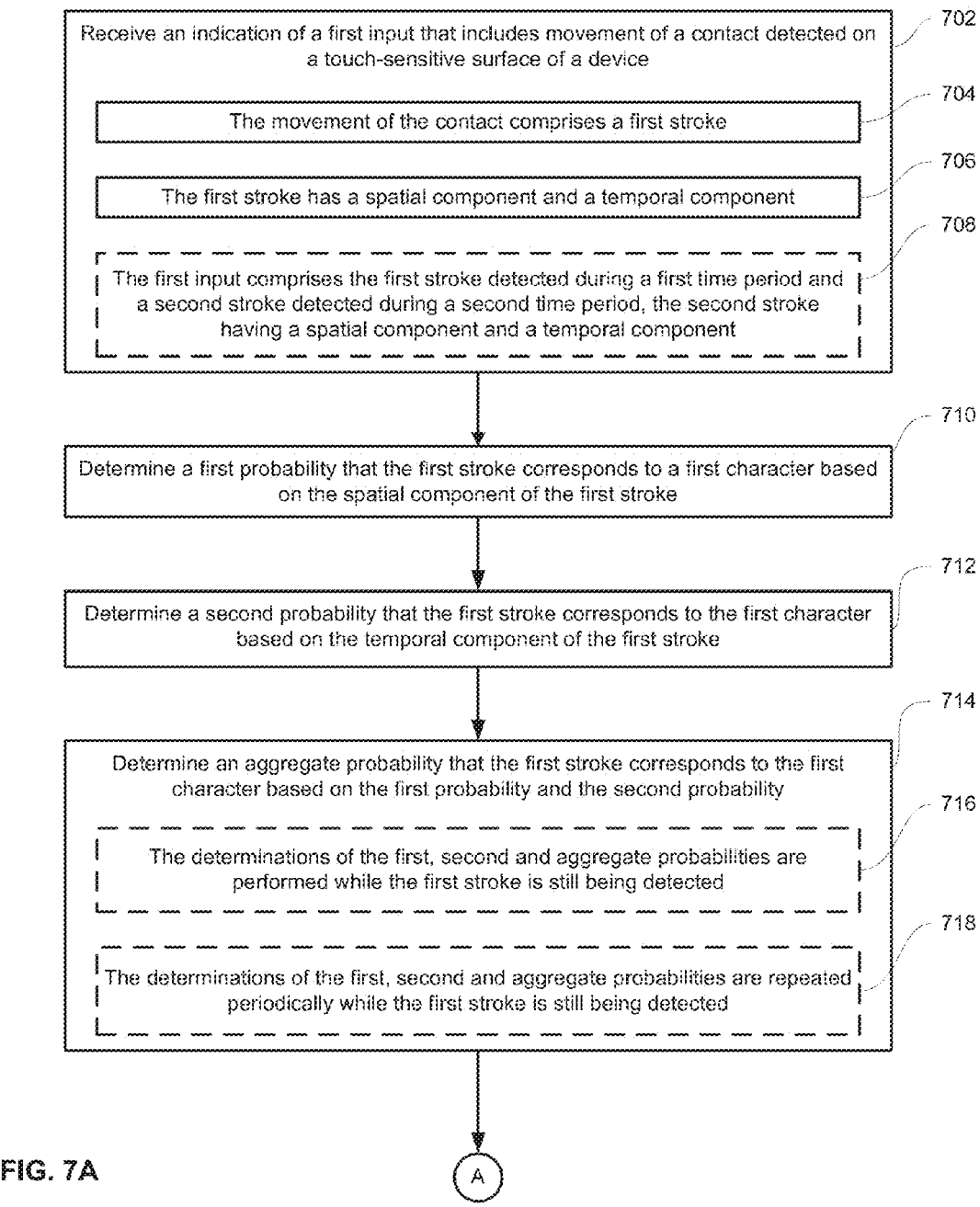
FIGS. 7A-7D are flow diagrams illustrating a method of recognizing handwritten input in accordance with some embodiments.
Figure 7B:
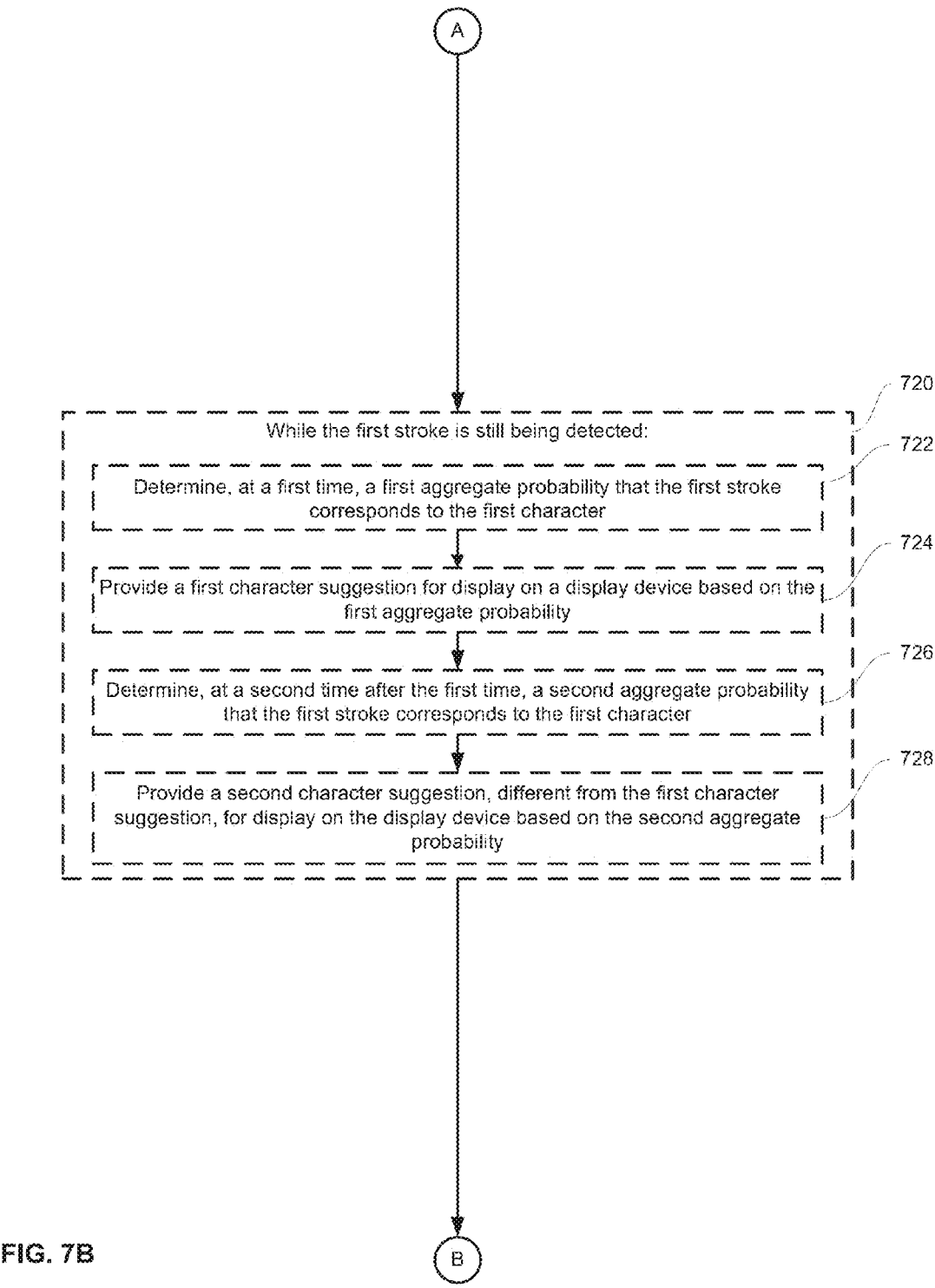
Figure 7C:
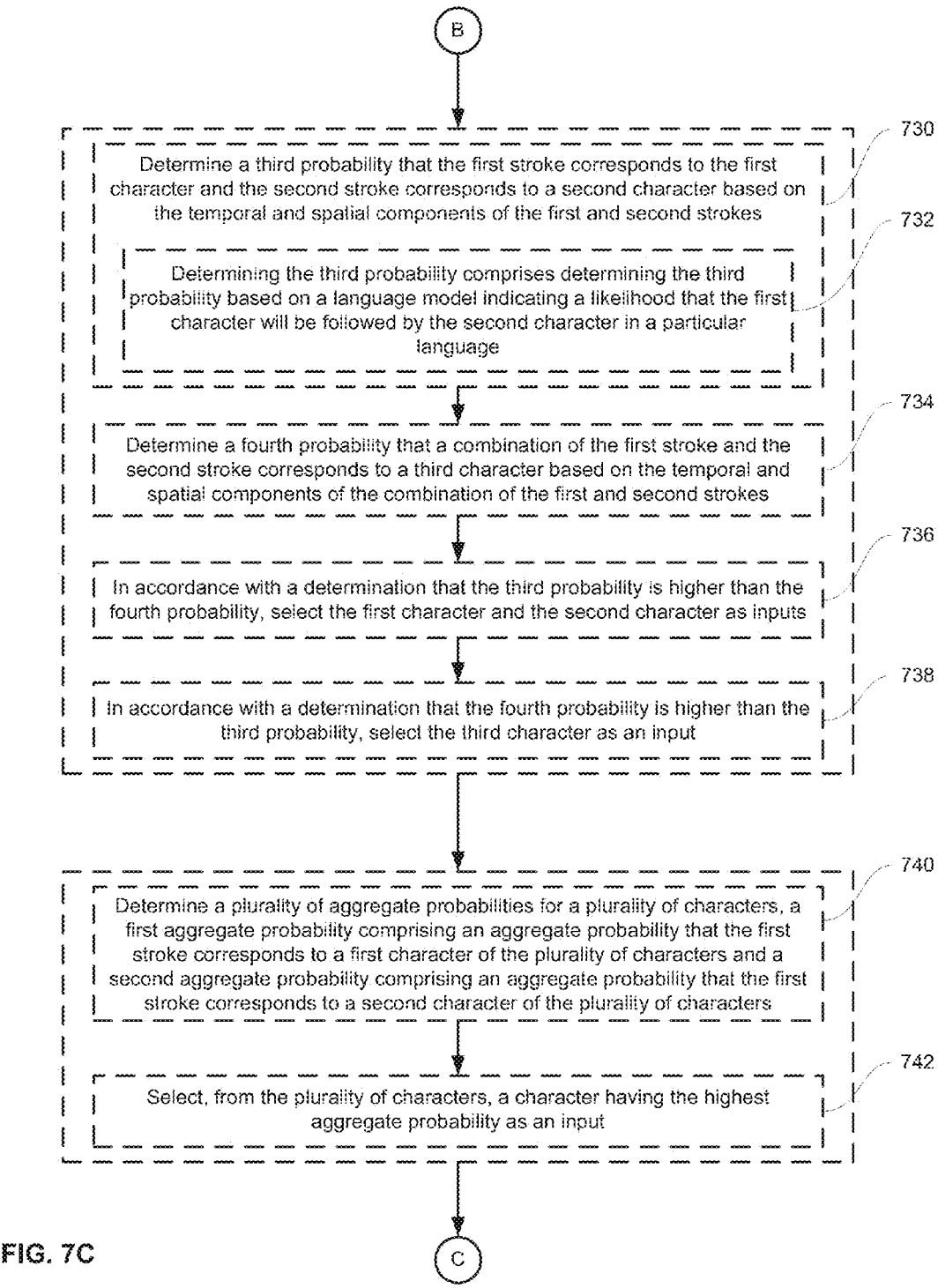
Figure 7D:
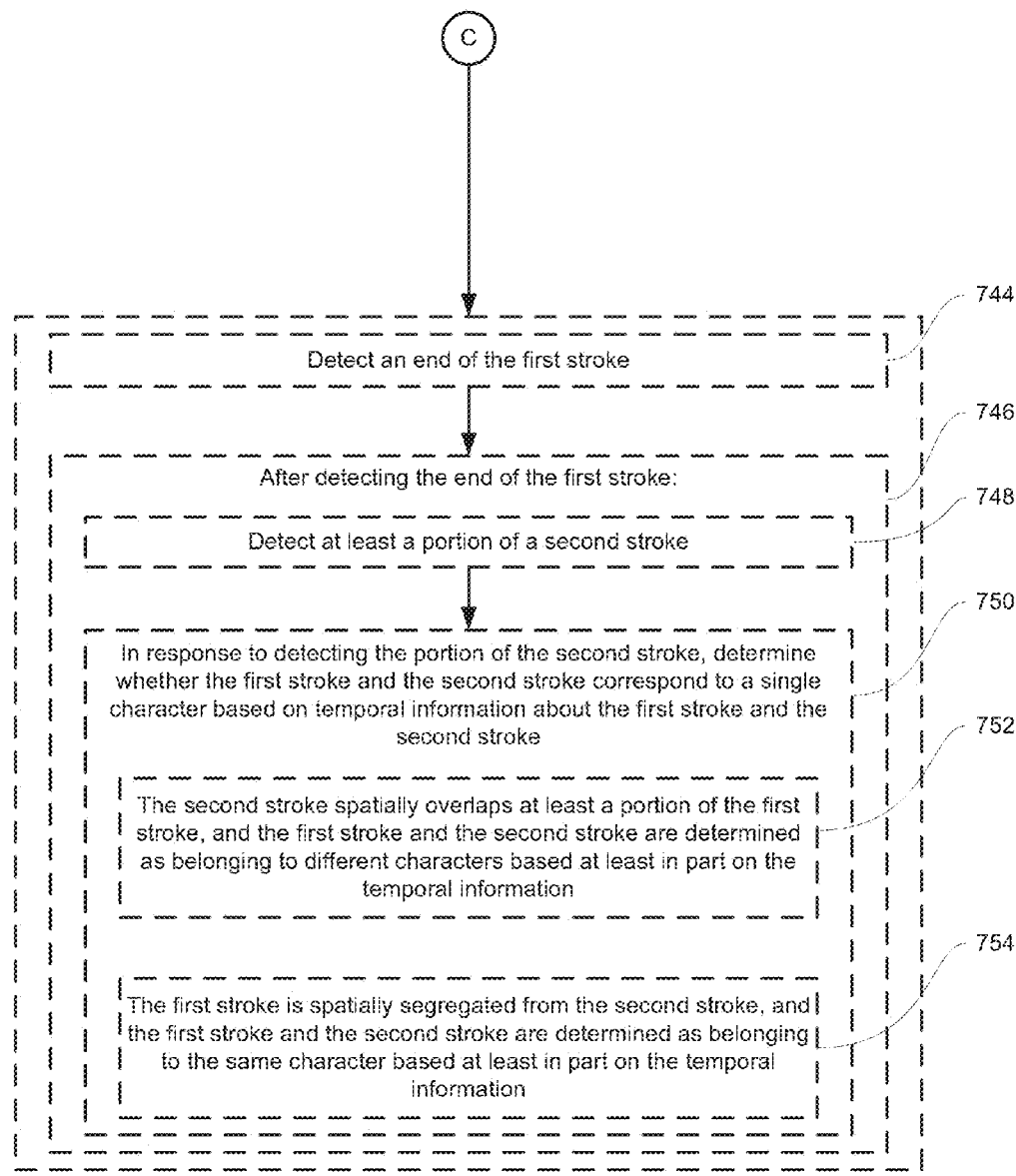

FIG. 6D shows a block diagram illustrating an exemplary character recognition technique applied to two or more strokes. Spatial/temporal probability determiner 624 optionally determines the probability that strokes 620 and 622 correspond to different characters (e.g., stroke 620 corresponds to a first character, and stroke 622 corresponds to a second character). In some embodiments, this determination is performed using the technique described in FIG. 6B, where the spatial and temporal components of each of strokes 620 and 622 are analyzed separately. The outputs of the technique described in FIG. 6B are then utilized to evaluate the likelihood that strokes 620 and 622 correspond to different characters (e.g., a first character followed by a second character). In some embodiments, this determination is also based on a language model that indicates the likelihood that the first character would be followed by the second character in a particular language (e.g., in determining how likely it is that stroke 620 corresponds to the first character and stroke 622 corresponds to the second character, the device also optionally utilizes a language model that informs how likely it is that the first character and the second character will be found together in, for example, words in the particular language).

Spatial/temporal probability determiner 626 optionally determines the probability that strokes 620 and 622 correspond to the same character (e.g., stroke 620 and stroke 622 together correspond to a single character). In some embodiments, this determination is performed using the technique described in FIG. 6B, where the spatial and temporal components of strokes 620 and 622 are analyzed together (e.g., as a combination). The outputs of the technique described in FIG. 6B are then utilized to evaluate the likelihood that strokes 620 and 622 correspond to a single character.

Selector 628 optionally selects whichever proposition (e.g., separate characters or the same character) is more likely based on the probabilities determined in spatial/temporal probability determiners 624 and 626.

It is understood that the various functional blocks illustrated in FIGS. 6B and 6D are merely illustrative, and do not limit the structure of any device of the disclosure. For example, spatial probability determiner 608, temporal probability determiner 610, aggregate probability determiner 616, spatial/temporal probability determiners 624 and 626, and selector 628 are, optionally, implemented by the same physical structure (e.g., processor, logic, etc.), or multiple physical structures.

FIGS. 7A-7D are flow diagrams illustrating a method 700 of recognizing handwritten input in accordance with some embodiments. The method 700 is optionally performed at an electronic device such as device 500 as described above with reference to FIG. 5, including a set top box or other user interface generating device that is in communication with a remote control and a display device. Some operations in method 700 are, optionally, combined and/or the order of some operations is, optionally, changed.

As described below, the method 700 provides ways in which a device optionally recognizes handwritten character input to the device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors and memory receives (702) an indication of a first input that includes movement of a contact (e.g., a finger contact or stylus contact, such as contact 601 in FIG. 6A) detected on a touch-sensitive surface of a device (e.g., a touch-sensitive surface of a remote control or a portable multifunction device with a touchscreen display, such as touch-sensitive surface 451 in FIG. 6A). The movement of the contact optionally comprises a first stroke (704) (e.g., in some embodiments, a stroke is defined as the movement of a contact from touchdown of the contact to liftoff of the contact, such as stroke 602 in FIG. 6A), and the first stroke optionally has a spatial component (e.g., the way that the final stroke looks, or the final shape of the stroke, such as spatial component 604 in FIG. 6B) and a temporal component (706) (e.g., how the stroke looked over time, such as temporal component 606. For example, the temporal component of the stroke optionally includes information as to where the stroke began, and how the stroke progressed as a function of time). In some embodiments, the first input comprises the first stroke detected during a first time period (e.g., stroke 620 in FIG. 6C) and a second stroke detected during a second time period (e.g., stroke 622 in FIG. 6C), the second stroke having a spatial component and a temporal component (708). For example, the first input is optionally the two strokes that form an X, or the first input is an O followed by a U)

In some embodiments, the electronic device determines (710) a first probability that the first stroke corresponds to a first character (e.g., letter, number, symbol, etc.) based on the spatial component of the first stroke (e.g., determine the probability that the first stroke corresponds to a particular character based on the shape of the stroke when the determination is made, such as probabilities 612 in FIG. 6B).

In some embodiments, the electronic device determines (712) a second probability that the first stroke corresponds to the first character based on the temporal component of the first stroke. For example, the electronic device optionally determines the probability that the first stroke corresponds to the particular character based on how the stroke looked over time and/or changes in speed of the stroke over time, such as probabilities 614 in FIG. 6B. For example, a stroke that is meant to be a lower case A but that looks like an O optionally most likely corresponds to an O when analyzed spatially, but when analyzed temporally, optionally most likely corresponds to an "a", because the temporal component optionally indicates that there was movement of the contact creating the tail of the "a" even if that movement overlaps with the rest of the shape so that a spatial analysis of the shape looks more like an O. This movement would not exist if the input were an O. Additionally, some characters are frequently drawn with a stroke starting moving in a particular direction (e.g., down and to the left or up and to the right) and thus a stroke that is drawn up and to the right is more likely to be the beginning of an M than the beginning of an X.

In some embodiments, the electronic device determines (714) an aggregate probability that the first stroke corresponds to the first character based on the first probability and the second probability (e.g., considers both the spatial and temporal probabilities in making a final determination about the stroke, such as probabilities 618 in FIG. 6B. In some embodiments, the spatial and temporal probabilities are multiplied. In some embodiments, the spatial and temporal probabilities are added together, sometimes with respective weighting factors). In some embodiments, the determinations of the first, second and aggregate probabilities are performed while the first stroke is still being detected (716) (e.g., at least a preliminary determination of the aggregate probability is completed before the first stroke is completed. The determinations need not wait for the end of the first stroke). In some embodiments, the determinations of the first, second and aggregate probabilities are repeated periodically while the first stroke is still being detected (718) (e.g., the spatial, temporal and aggregate probabilities are determined multiple times per stroke, each time with larger portions of the stroke as the stroke gets further defined with further movement of the contact. In some embodiments, the determinations are repeated at fixed-time intervals. In some embodiments, the determinations are triggered when there has been a change in the stroke that is greater than a threshold amount—e.g., there is a change in direction, velocity, acceleration, etc., of the stroke greater than a threshold amount, and this change causes the determinations to be made).

In some embodiments, while the first stroke is still being detected (720), the electronic device determines (722), at a first time, a first aggregate probability that the first stroke corresponds to the first character (e.g., makes a first aggregate probability determination during the first stroke). In some embodiments, the electronic device further provides (724) a first character suggestion for display on a display device (e.g., a television or other display device) based on the first aggregate probability (e.g., after determining an aggregate probability that the first stroke corresponds to the letter "a", if the aggregate probability associated with the letter "a" is the highest aggregate probability of aggregate probabilities associated with other characters, the electronic device displays the letter "a" as a suggestion on the display device. In some embodiments, a user optionally selects the suggestion to enter the letter "a" in a text field, for example, without having to complete the stroke input as an input. If the aggregate probability associated with another character is the highest aggregate probability, display that character as a suggestion on the display device). In some embodiments, the electronic device further determines (726), at a second time after the first time, a second aggregate probability that the first stroke corresponds to the first character (e.g., makes a second aggregate probability determination during the first stroke). In some embodiments, the electronic device provides (728) a second character suggestion, different from the first character suggestion, for display on the display device based on the second aggregate probability (e.g., updates the displayed character suggestion as the aggregate probabilities associated with characters change over time as more of the stroke has been inputted. For example, the electronic device optionally changes the displayed character selection from a "P" to a "D" as more of the stroke has been inputted).

In some embodiments, the electronic device determines (730) a third probability that the first stroke corresponds to the first character and the second stroke corresponds to a second character based on the temporal and spatial components of the first and second strokes (e.g., determines how likely it is that the first and second strokes correspond to different characters, such as in spatial/temporal probability determiner 624 in FIG. 6D. In some embodiments, this determination, as above, is based on the temporal and spatial components of each of the first and second strokes). In some embodiments, determining the third probability comprises determining the third probability based on a language model indicating a likelihood that the first character will be followed by the second character in a particular language (732) (e.g., in determining how likely it is that the first stroke corresponds to the first character and the second stroke corresponds to the second character, the electronic device optionally also utilizes a language model that informs how likely it is that the first character and the second character will be found together in, for example, words in the particular language).

In some embodiments, the electronic device determines (734) a fourth probability that a combination of the first stroke and the second stroke corresponds to a third character based on the temporal and spatial components of the combination of the first and second strokes (e.g., determines how likely it is that the first and second strokes together correspond to a single character, such as in spatial/temporal probability determiner 626 in FIG. 6D. In some embodiments, this determination, as above, is based on the temporal and spatial components of each of the first and second strokes, including temporal and spatial components of the combination of the first and second strokes).

In some embodiments, in accordance with a determination that the third probability is higher than the fourth probability, the electronic device selects (736) the first character and the second character as inputs (e.g., such as in selector 628 in FIG. 6D). In some embodiments, in accordance with a determination that the fourth probability is higher than the third probability, the electronic device selects (738) the third character as an input (e.g., such as in selector 628 in FIG. 6D).

In some embodiments, the electronic device determines (740) a plurality of aggregate probabilities for a plurality of characters, a first aggregate probability comprising an aggregate probability that the first stroke corresponds to a first character of the plurality of characters and a second aggregate probability comprising an aggregate probability that the first stroke corresponds to a second character of the plurality of characters (e.g., determines an aggregate probability that the first stroke corresponds to an "A", determines an aggregate probability that the first stroke corresponds to a "B", determines an aggregate probability that the first stroke corresponds to a "C", etc.). In some embodiments, the electronic device selects (742), from the plurality of characters, a character having the highest aggregate probability as an input (e.g., selects "B" as an input because its associated aggregate probability is the highest of the determined aggregate probabilities).

In some embodiments, the electronic device detects (744) an end of the first stroke (e.g., detects liftoff of the contact that made the first stroke, or detects a pause in movement of the contact that made the first stroke that indicates an end of the first stroke). In some embodiments, after detecting the end of the first stroke (746), the electronic device detects (748) at least a portion of a second stroke. In response to detecting the portion of the second stroke, the electronic device optionally determines (750) whether the first stroke and the second stroke correspond to a single character based on temporal information about the first stroke and the second stroke (e.g., determines whether a "l" stroke followed by a "—" stroke corresponds to a "T". In some embodiments, the two strokes correspond to an "l" followed by the beginning of an "e", for example. For example, strokes that are close to each other in time are more likely to be part of a single character than strokes that are further apart in time).

In some embodiments, the second stroke spatially overlaps at least a portion of the first stroke (e.g., the first stroke was detected in a first region of the touch-sensitive surface, and the second stroke was detected at least partially in the first region of the touch-sensitive surface), and the first stroke and the second stroke are determined as belonging to different characters based at least in part on the temporal information (752) (e.g., the first stroke and the second stroke are determined to belong to different characters based at least in part on: the fact that the second stroke was detected after the first stroke, the time between the end of the first stroke and the beginning of the second stroke, and/or the acceleration/speed/direction of the contact making the first stroke and the acceleration/speed/direction of the contact making the second stroke, etc. For example, a "\" stroke is optionally determined as belonging to a preceding "K", and a subsequent "/" stroke is optionally determined as belonging to a subsequent "M" because the first stroke is inputted from top-left to bottom-right, and the second stroke is inputted from bottom-left to top-right).

In some embodiments, the first stroke is spatially segregated from the second stroke (e.g., the first stroke was detected in a first region of the touch-sensitive surface, and the second stroke was detected in a second region of the touch-sensitive surface that does not overlay with the first region), and the first stroke and the second stroke are determined as belonging to the same character based at least in part on the temporal information (754) (e.g., the first stroke and the second stroke are determined to belong to the same character based at least in part on: the fact that the second stroke was detected after the first stroke, the time between the end of the first stroke and the beginning of the second stroke, and/or the acceleration/speed/direction of the contact making the first stroke and the acceleration/speed/direction of the contact making the second stroke, etc. For example, a "\" stroke and a subsequent "/" stroke are optionally determined as belonging to a single "X" because the first stroke is inputted from top-left to bottom-right, and the second stroke is inputted from top-right to bottom-left).

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1100) are also applicable in an analogous manner to method 700 described above with respect to FIGS. 7A-7D. For example, the touch-sensitive surface described above with reference to method 700 optionally has one or more of the characteristics of the touch-sensitive surfaces described herein with reference to other methods described herein (e.g., methods 900 and 1100). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 7A-7D are, optionally, implemented by components depicted in FIGS. 1A-1B. For example, receiving operation 702, and determination operations 710, 712 and 714 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Handwritten Input Feedback

When a user is providing handwritten input to a device, it can be beneficial for the device to provide some feedback to the user about the user's input and the device's interpretation of that input. This can give the user opportunity to adjust its input if needed to make it more likely that the desired input will be recognized by the device. The embodiments described below provide ways that a device optionally presents such feedback for handwritten input. Enhancing interactions with a device reduces the amount of time needed by a person to perform operations, and thus reduces the power usage of the device and increases battery life for battery-powered devices.

FIGS. 8A-8E illustrate exemplary ways in which feedback for handwritten input is presented in a user interface in accordance with some embodiments of the disclosure. The embodiments in these figures are used to illustrate the processes described below, including the processes described with reference to FIGS. 9A-9D.

Figure 8A:
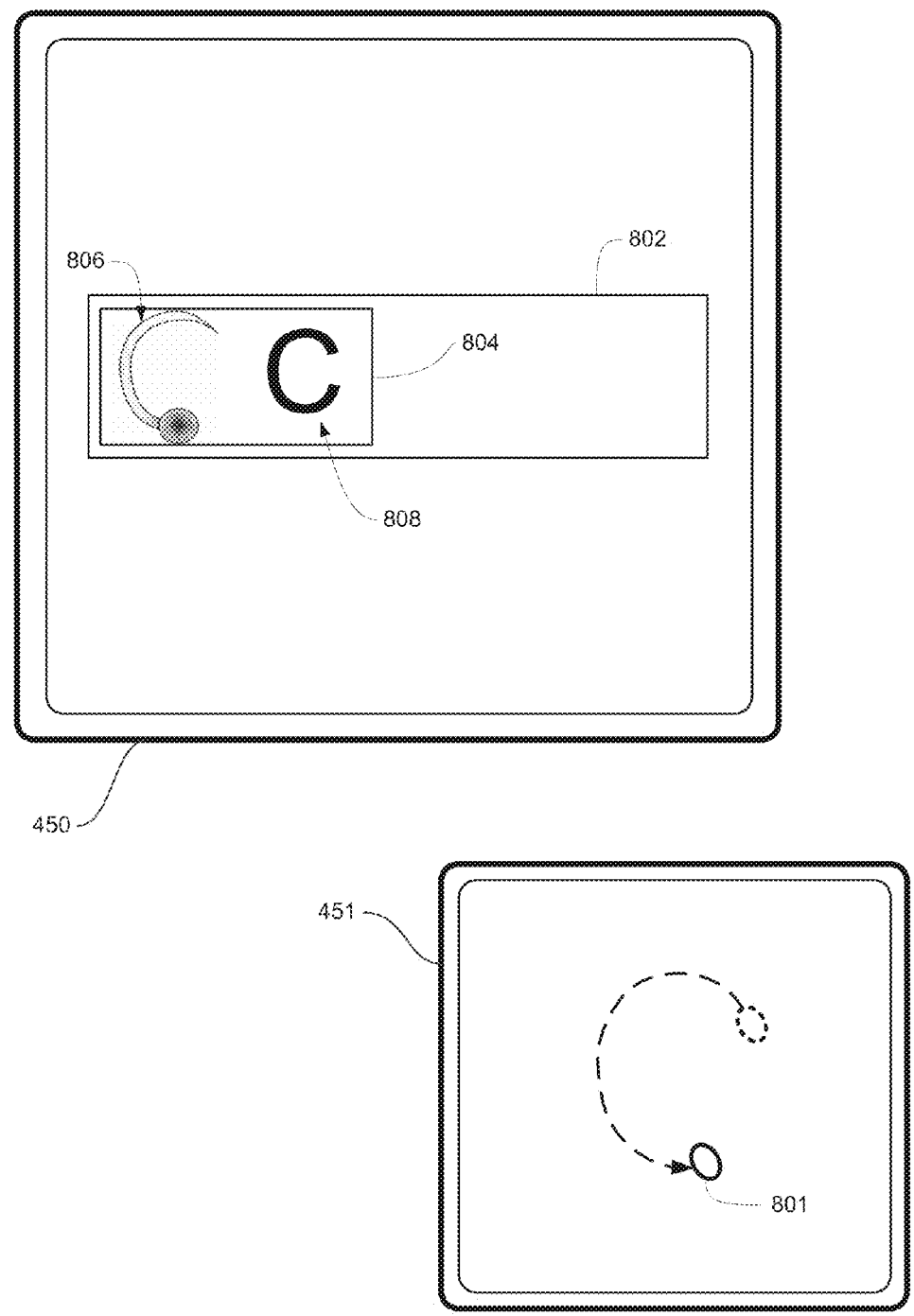
FIGS. 8A-8E illustrate exemplary ways in which feedback for handwritten input is presented in a user interface in accordance with some embodiments of the disclosure.

FIG. 8A illustrates an exemplary handwritten input and resulting user interface presented in accordance with some embodiments. A user interface is optionally presented on display 450, and an input is optionally detected on touch-sensitive surface 451. Display 450 optionally corresponds to display 514 in FIG. 5, and touch-sensitive surface 451 optionally corresponds to a touch-sensitive surface on remote 510 in FIG. 5. The user interface optionally includes a region into which text is to be inputted, such as text entry field 802. The user interface also optionally includes gesture display region 804, which is optionally a region for displaying gesture feedback corresponding to an input detected on touch-sensitive surface 451.

Handwritten input is optionally detected on touch-sensitive surface 451. The handwritten input optionally includes movement of contact 801, as illustrated in FIG. 8A. Gesture display region 804 optionally displays a representation 806 of the handwritten input (e.g., a representation of the movement of contact 801). In some embodiments, representation 806 of the handwritten input optionally includes a contact position indicator (e.g., a glowing dot) representing a current location of contact 801 on touch-sensitive surface 451, and a trail representing one or more past locations of contact 801 on touch-sensitive surface 451. In some embodiments, a visual emphasis of a respective point in the trail varies depending on the amount of time that has elapsed since the contact position indicator was at the respective point in the trail (e.g., the trail fades out over time. In some embodiments, the glowing dot represents contact 801, and as contact 801 moves, it leaves a trail representing how contact 801 has moved, in which points on the trail start to fade as a function of time since the points were created).

In some embodiments, and as illustrated in FIG. 8A, gesture display region 804 is displayed at a location in which character entry is to be performed (e.g., in-line with text entry field 802).

In addition to gesture display region, in some embodiments, a candidate character 808 is displayed concurrently with representation 806 of the movement of contact 801. The candidate character 808 is optionally a character that corresponds to the movement of contact 801 (e.g., the most likely candidate that corresponds to the movement of the contact). As shown in FIG. 8A, in some embodiments, the most likely candidate character is determined to be a "C", and the "C" is displayed concurrently with representation 806 of the movement of contact 801. As further input is detected on touch-sensitive surface 451, the user interface displayed on display 450 is optionally updated accordingly.

Figure 8B:
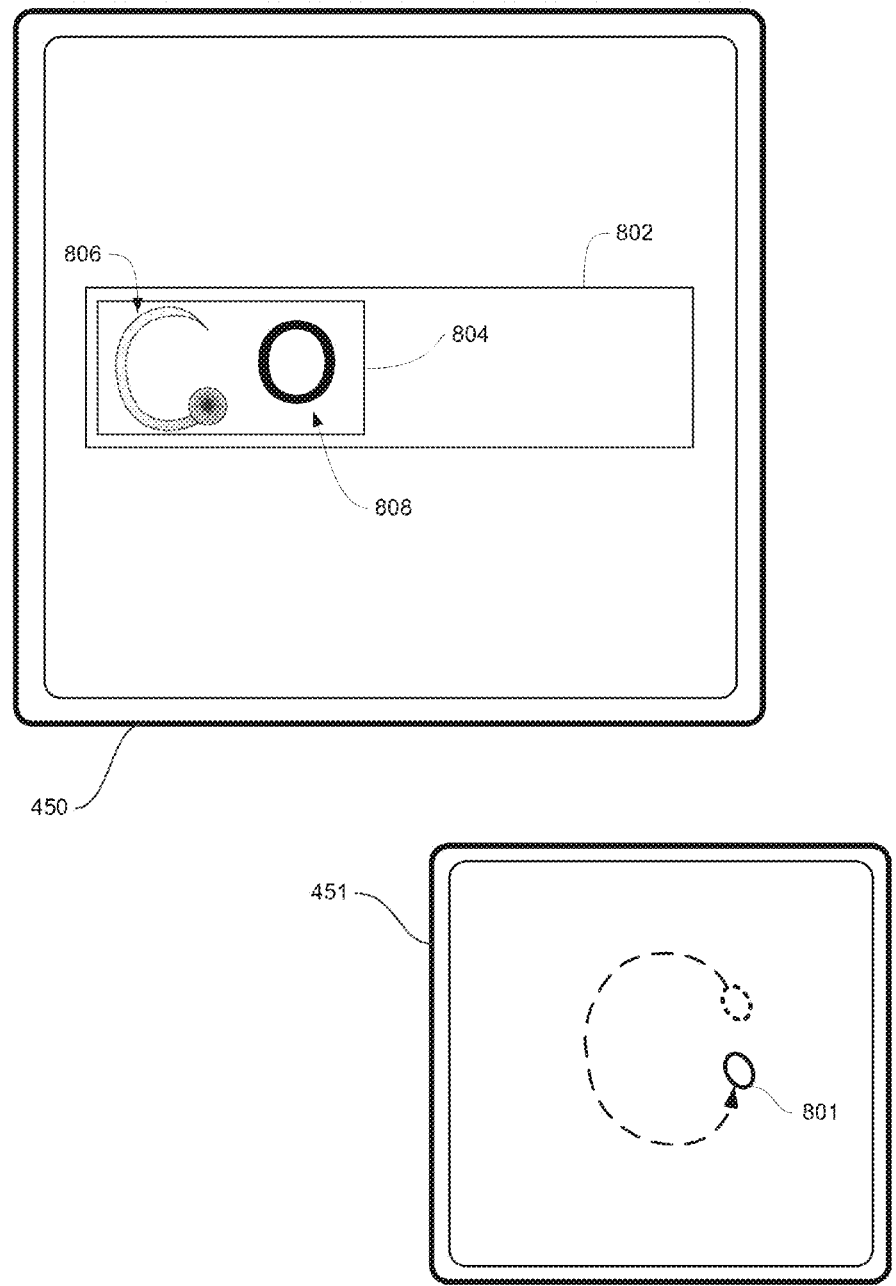

FIG. 8B illustrates an updating of a user interface in accordance with additional input detected on a touch-sensitive surface. In some embodiments, various aspects of the user interface displayed on display 450 are optionally continually updated as input is detected on touch-sensitive surface 451. In FIG. 8B, additional movement of contact 801 has been detected on touch-sensitive surface 451 with respect to that in FIG. 8A. In particular, the movement of contact 801 has continued in a circular fashion to approach the shape of a circle (e.g., the shape of an "O"). As a result, representation 806 of the movement of contact 801 has been updated to reflect this additional movement, and the candidate character 808 determined to correspond to the movement of contact 801 has been updated to reflect that the movement of contact 801 now most likely corresponds to an "O" rather than a "C", as was the case in FIG. 8A.

In some embodiments, as characters are entered into text entry field 802, gesture display region 804 shifts to the next area in text entry field 802 into which characters are to be inputted.

Figure 8C:
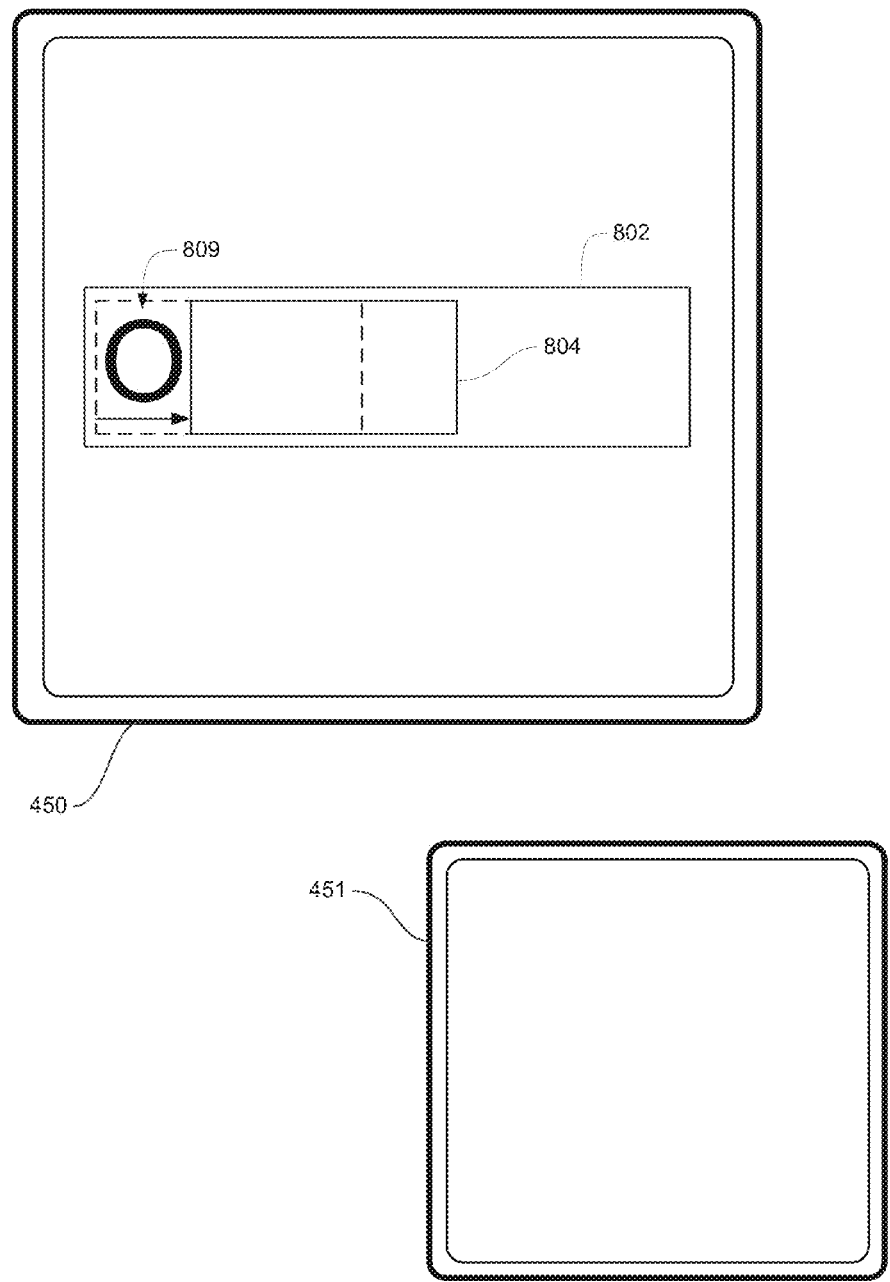

FIG. 8C illustrates an exemplary shifting of the gesture display region after a candidate character has been determined to be a final character. Candidate character "O" 808 has been determined to be a final character, and has been entered into text entry field 802 as final character 809. This optionally involves a determination that the input detected on touch-sensitive surface 451 in FIG. 8B corresponds to candidate character "O" 808, and that any additional input detected on touch-sensitive surface 451 would and/or does correspond to a different character, a determination that candidate character "O" 808 is the final character, and entering it in text entry field 802. In some embodiments, this occurs in response to input not being detected on touch-sensitive surface 451 for a threshold amount of time (0.1, 0.5, or 1 second, for example); in some embodiments, this occurs in response to receiving an indication of an input detected on touch-sensitive surface 451 indicating that candidate character "O" 808 is to be inputted in the user interface; in some embodiments, this occurs in response to a determination by the device that it is unlikely that further input on touch-sensitive surface 451 corresponds to the same character as input already received on touch-sensitive surface 451.

After final character 809 has been entered in text entry field 802, gesture display region 804 is optionally moved to the next location in the user interface (e.g., the next location in text entry field 802) at which another character is to be entered, as illustrated in FIG. 8C.

After gesture display region 804 has been moved, as described, character entry is optionally continued in a manner similar to as described with reference to FIGS. 8A-8C.

Figure 8D:
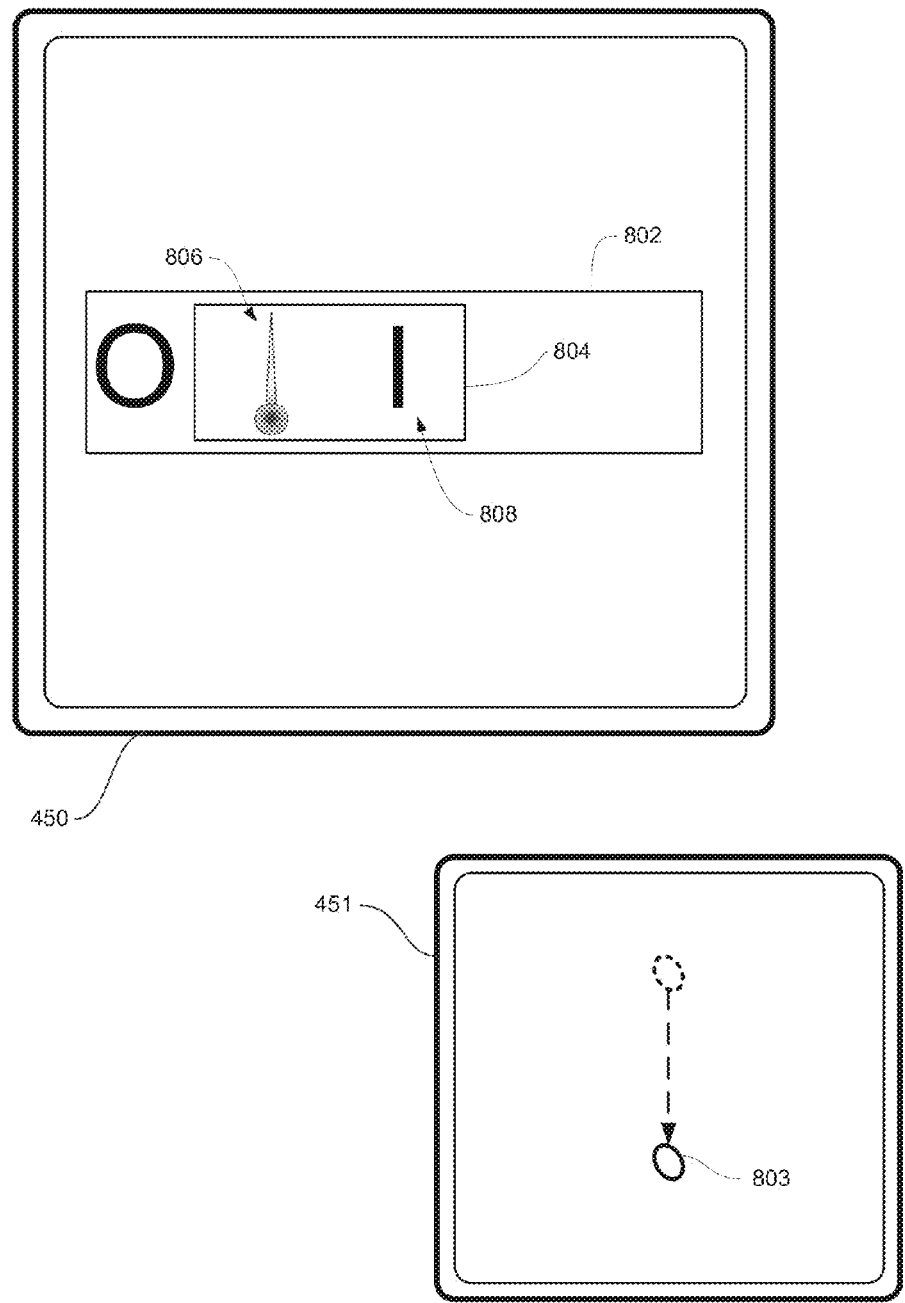

FIG. 8D illustrates an exemplary continuation of handwritten input recognition and user interface feedback provided after the movement of gesture display region 804 has completed. As illustrated in FIG. 8D, handwritten input recognition and user interface feedback optionally continues as described above with references to FIGS. 8A-8C.

Figure 8E:
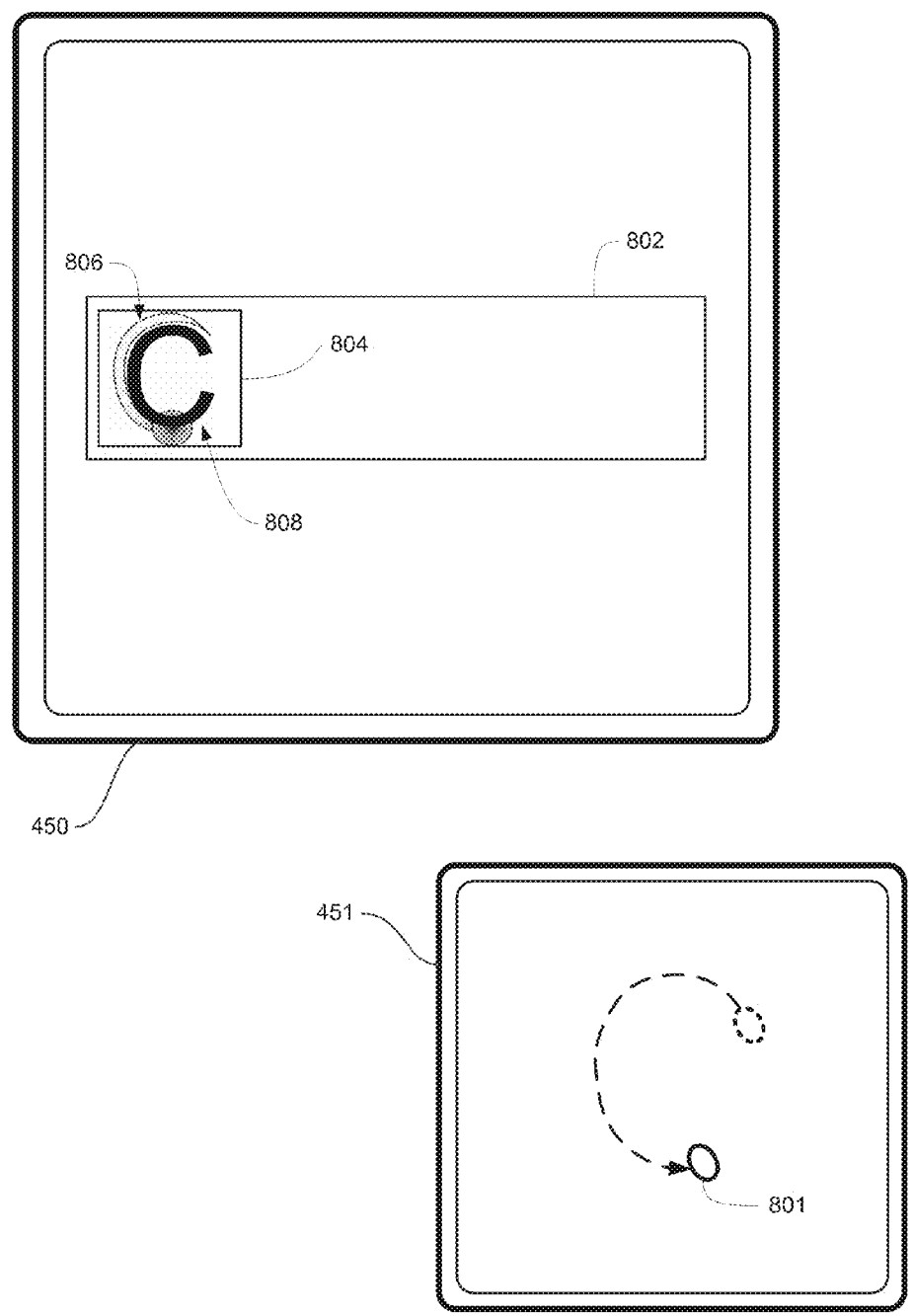
Figure 9A:
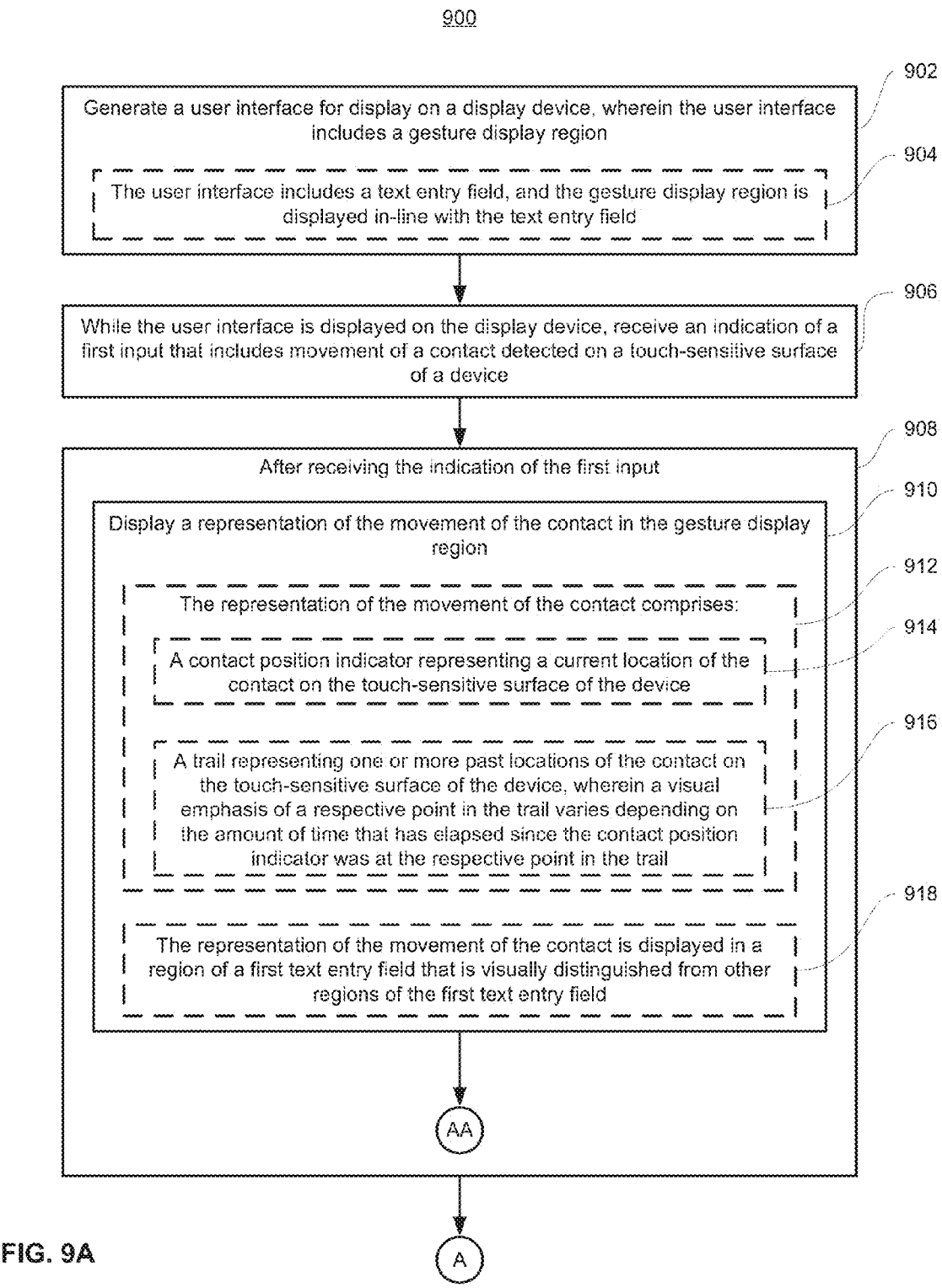
FIGS. 9A-9D are flow diagrams illustrating a method of presenting feedback for handwritten input in accordance with some embodiments.
Figure 9B:
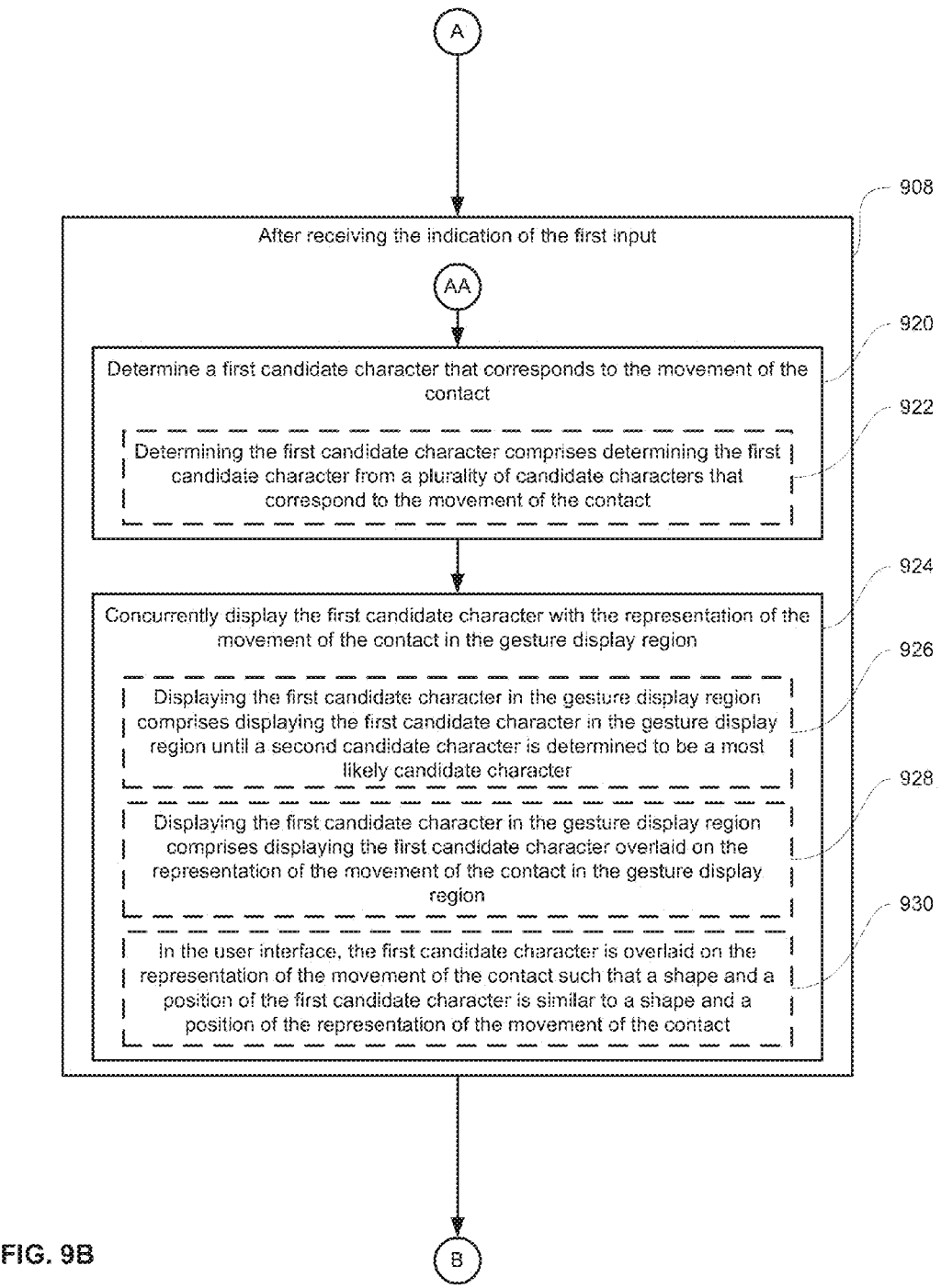
Figure 9C:
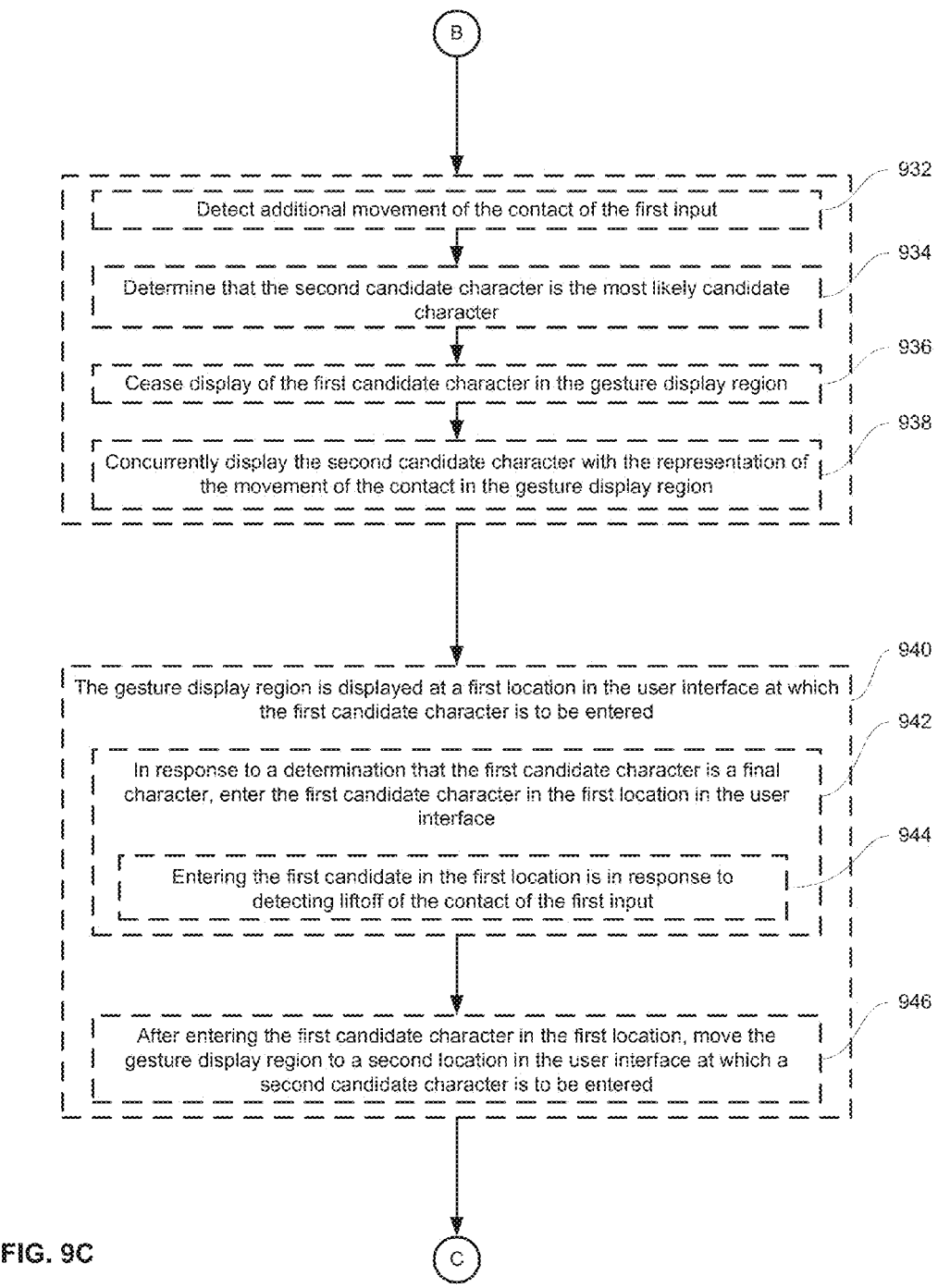
Figure 9D:
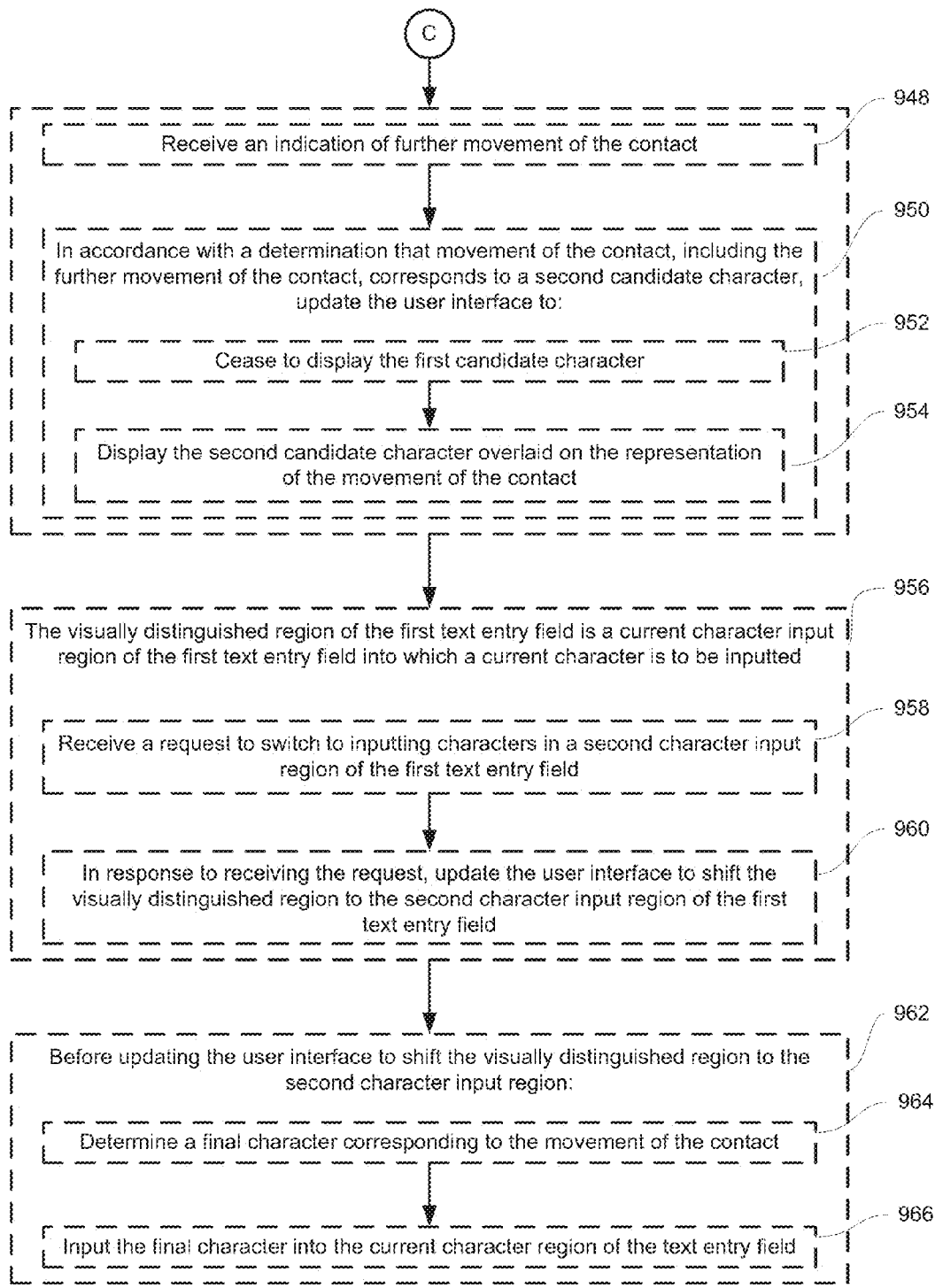

FIG. 8E illustrates an exemplary handwritten input and resulting user interface presented in accordance with some embodiments. In some embodiments, the candidate character 808 is displayed as an overlay on representation 806 of the movement of contact 801 such that a shape and a position of the candidate character 808 is similar to a shape and a position of representation 806 of the movement of contact 801. In some embodiments, the device attempts to match the trail left by the glowing dot, for example, as much as possible to the candidate character so that the lines/strokes of the candidate character align with the lines/strokes of the trail). As shown in FIG. 8E, the "C" candidate character 808 is overlaid on the representation 806 of the movement of contact 801, and a shape and a position of the candidate character 808 is similar to a shape and a position of representation 806 of the movement of contact 801.

FIGS. 9A-9D are flow diagrams illustrating a method 900 of presenting feedback for handwritten input in accordance with some embodiments. The method 900 is optionally performed at an electronic device such as device 500 as described above with reference to FIG. 5, including a set top box or other user interface generating device that is in communication with a remote control and a display device. Some operations in method 900 are, optionally, combined and/or the order of some operations is, optionally, changed.

As described below, the method 900 provides ways in which a device optionally presents feedback for handwritten input in a user interface. The method reduces the cognitive burden on a user when interacting with a user interface on the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors and memory generates (902) a user interface for display on a display device (e.g., a television or other display device), wherein the user interface includes a gesture display region (e.g., a region for displaying gesture feedback corresponding to an input received on a touch-sensitive surface of a device, such as gesture display region 804 in FIG. 8A). In some embodiments, the user interface includes a text entry field (e.g., search field, web address field, username/password field, such as text entry field 802 in FIG. 8A), and the gesture display region is displayed in-line with the text entry field (904) (e.g., the representation of the movement of the contact is displayed in or adjacent to an area of the text entry field in which the next text/character is to be inputted).

In some embodiments, while the user interface is displayed on the display device, the electronic device receives (906) an indication of a first input that includes movement of a contact (e.g., a finger contact or stylus contact, such as contact 801 in FIG. 8A) detected on a touch-sensitive surface of a device (e.g., a touch-sensitive surface of a remote control or a portable multifunction device with a touchscreen display, such as touch-sensitive surface 451 in FIG. 8A).

In some embodiments, after receiving the indication of the first input (908) (in some embodiments, this is while receiving the indication of the first input. In some embodiments, this is in response to receiving the first input), the electronic device displays (910) a representation of the movement of the contact in the gesture display region (e.g., displays the representation of the movement of the contact in the gesture display region in the user interface, such as representation 806 of the movement of contact 801 in FIG. 8A). In some embodiments, the representation of the movement of the contact comprises (912) a contact position indicator (e.g., a glowing dot) representing a current location of the contact on the touch-sensitive surface of the device (914), and a trail representing one or more past locations of the contact on the touch-sensitive surface of the device, wherein a visual emphasis of a respective point in the trail varies depending on the amount of time that has elapsed since the contact position indicator was at the respective point in the trail (916) (e.g., the trail fades out over time. In some embodiments, the glowing dot represents the contact, and as the contact moves, it leaves a trail representing how the contact has moved, in which points on the trail start to fade as a function of time since the points were created). In some embodiments, the representation of the movement of the contact is displayed in a region of a first text entry field that is visually distinguished from other regions of the first text entry field (918) (e.g., the representation of the movement of the contact is displayed in a region of the text entry field—for example, the region of the text entry field into which the current text is to inputted—having a slightly different shade than the rest of the text entry field. In some embodiments, the representation of the movement of the contact has an outline around it to differentiate it from the rest of the text entry field, such as illustrated by gesture display region 806 in FIG. 8A. The representation of the movement of the contact optionally has any visual feature that differentiates it, visually, from the text entry field generally).

In some embodiments, after receiving the indication of the first input (908), the electronic device determines (920) a first candidate character that corresponds to the movement of the contact (e.g., determine that "C" is the most likely candidate that corresponds to the movement of the contact). In some embodiments, determining the first candidate character comprises determining the first candidate character from a plurality of candidate characters that correspond to the movement of the contact (922) (e.g., the movement of the contact could correspond to a plurality of candidate characters, one of which—the first candidate character—the device determines to be the best and selects to be displayed in the gesture display region).

In some embodiments, after receiving the indication of the first input (908), the electronic device concurrently displays (924) the first candidate character with the representation of the movement of the contact in the gesture display region (e.g., displays both the first candidate character (e.g., "C") and the representation of the movement of the contact, such as representation 806 of the movement of contact 801 and candidate character 808 in FIG. 8A). In some embodiments, displaying the first candidate character in the gesture display region comprises displaying the first candidate character in the gesture display region until a second candidate character is determined to be a most likely candidate character (926) (e.g., the first candidate character is optionally currently the most likely candidate character, but will optionally be replaced in the gesture display region if another character becomes the most likely candidate character based on additional movement of the contact). In some embodiments, displaying the first candidate character in the gesture display region comprises displaying the first candidate character overlaid on the representation of the movement of the contact in the gesture display region (928). In some embodiments, in the user interface, the first candidate character is overlaid on the representation of the movement of the contact such that a shape and a position of the first candidate character is similar to a shape and a position of the representation of the movement of the contact (930) (e.g., attempt to match the trail left by the glowing dot, for example, as much as possible to the first candidate character so that the lines/strokes of the first candidate character align with the lines/strokes of the trail). In some embodiments, the candidate character is displayed in a predefined location, such as a center of the gesture display region at a predefined size.

In some embodiments, the electronic device detects (932) additional movement of the contact of the first input, determines (934) that the second candidate character is the most likely candidate character (e.g., determines that a new character is now the most likely candidate character), ceases (936) display of the first candidate character in the gesture display region, and concurrently displays (938) the second candidate character with the representation of the movement of the contact in the gesture display region (e.g., as illustrated in FIGS. 8A-8B).

In some embodiments, the gesture display region is displayed at a first location in the user interface at which the first candidate character is to be entered (940) (e.g., the gesture display region is displayed at a location where text/characters are to be entered in the user interface; for example, text entry field 802 in FIG. 8A), and the electronic device, in response to a determination that the first candidate character is a final character, enters (942) the first candidate character in the first location in the user interface (e.g., upon determining that the first input corresponds to the first candidate character, and that any additional input would/does correspond to a different character, the electronic device optionally determines that the first candidate character is the final character, and enter it in, for example, a text entry field (e.g., as illustrated in FIG. 8C). In some embodiments, this occurs in response to input not being detected for a threshold amount of time (0.1, 0.5, or 1 second, for example); in some embodiments, this occurs in response to receiving an indication of an input indicating that the first candidate character is to be inputted in the user interface; in some embodiments, this occurs in response to a determination by the device that it is unlikely that further input on the touch-sensitive surface will correspond to the same character as input already received on the touch-sensitive surface). In some embodiments, entering the first candidate in the first location is in response to detecting liftoff of the contact of the first input (944) (in some embodiments, this occurs in response to detecting liftoff of the contact and no further input for longer than a threshold amount of time (e.g., 0.1, 0.5 or 1 second)).

In some embodiments, the electronic device, after entering the first candidate character in the first location, moves (946) the gesture display region to a second location in the user interface at which a second candidate character is to be entered (e.g., moves the gesture display region from character entry location to character entry location in the user interface as characters are entered at the respective locations, such as illustrated in FIG. 8C).

In some embodiments, the electronic device receives (948) an indication of further movement of the contact, and, in accordance with a determination that movement of the contact, including the further movement of the contact, corresponds to a second candidate character, updates (950) the user interface to (e.g., a determination that the second candidate character is the best candidate character from a plurality of candidate characters that correspond to the movement of the contact and the further movement of the contact. For example, the further movement of the contact has changed the best guess of what character the movement of the contact corresponds to): cease to display the first candidate character (952), and display the second candidate character overlaid on the representation of the movement of the contact (954) (e.g., as the contact continues to move, the electronic device optionally uses the additional movement information to update the best candidate character that is displayed overlaid on the representation of the movement of the contact). In some embodiments, in accordance with a determination that the first candidate character continues to be the best candidate character from a plurality of candidate characters that correspond to the movement of the contact and the further movement of the contact (e.g., the further movement of the contact has not changed the best guess of what character the movement of the contact corresponds to), the user interface continues to display the first candidate character overlaid on the representation of the movement of the contact.

In some embodiments, the visually distinguished region of the first text entry field is a current character input region of the first text entry field into which a current character is to be inputted (956), and the electronic device receives (958) a request to switch to inputting characters in a second character input region of the first text entry field. In some embodiments, in response to receiving the request, the electronic device updates (960) the user interface to shift the visually distinguished region to the second character input region of the first text entry field (e.g., shift the visually distinguished region to the next position in the text entry field into which text/a character is to be inputted, such as illustrated in FIG. 8C).

In some embodiments, before updating the user interface to shift the visually distinguished region to the second character input region (962), the electronic device determines (964) a final character corresponding to the movement of the contact (e.g., determines the final character to which movement of the contact corresponds. In some embodiments, this occurs in response to input not being detected for a threshold amount of time (0.1, 0.5, or 1 second, for example); in some embodiments, this occurs in response to receiving an indication of an input indicating that a current candidate character is to be inputted in the user interface; in some embodiments, this occurs in response to a determination by the device that it is unlikely that further input on the touch-sensitive surface will correspond to the same character as input already received on the touch-sensitive surface).

In some embodiments, the electronic device inputs (966) the final character into the current character region of the text entry field (e.g., enters the final character into the current character entry position in the text entry field, such as final character 809 in FIG. 8C).

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1100) are also applicable in an analogous manner to method 900 described above with respect to FIGS. 9A-9D. For example, the user interface, display device and inputs described above with reference to method 900 optionally have one or more of the characteristics of the user interfaces, display devices and inputs described herein with reference to other methods described herein (e.g., methods 700 and 1100). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 9A-9D are, optionally, implemented by components depicted in FIGS. 1A-1B. For example, generation operation 902, receiving operation 906, and displaying operation 910 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Character Recognition Correction

When providing handwritten input to a device, a user may wish to correct a previously inputted character in a simple manner. Thus, it can be beneficial for a device to provide a robust handwritten input correction user interface such that interaction with the device is enhanced. The embodiments described below provide ways to present such a correction user interface. Enhancing interactions with a device reduces the amount of time needed by a user to perform operations, and thus reduces the power usage of the device and increases battery life for battery-powered devices.

FIGS. 10A-10K illustrate exemplary ways in which an electronic device presents a handwritten input correction user interface in accordance with some embodiments of the disclosure. The embodiments in these figures are used to illustrate the processes described below, including the processes described with reference to FIGS. 11A-11D.

Figure 10A:
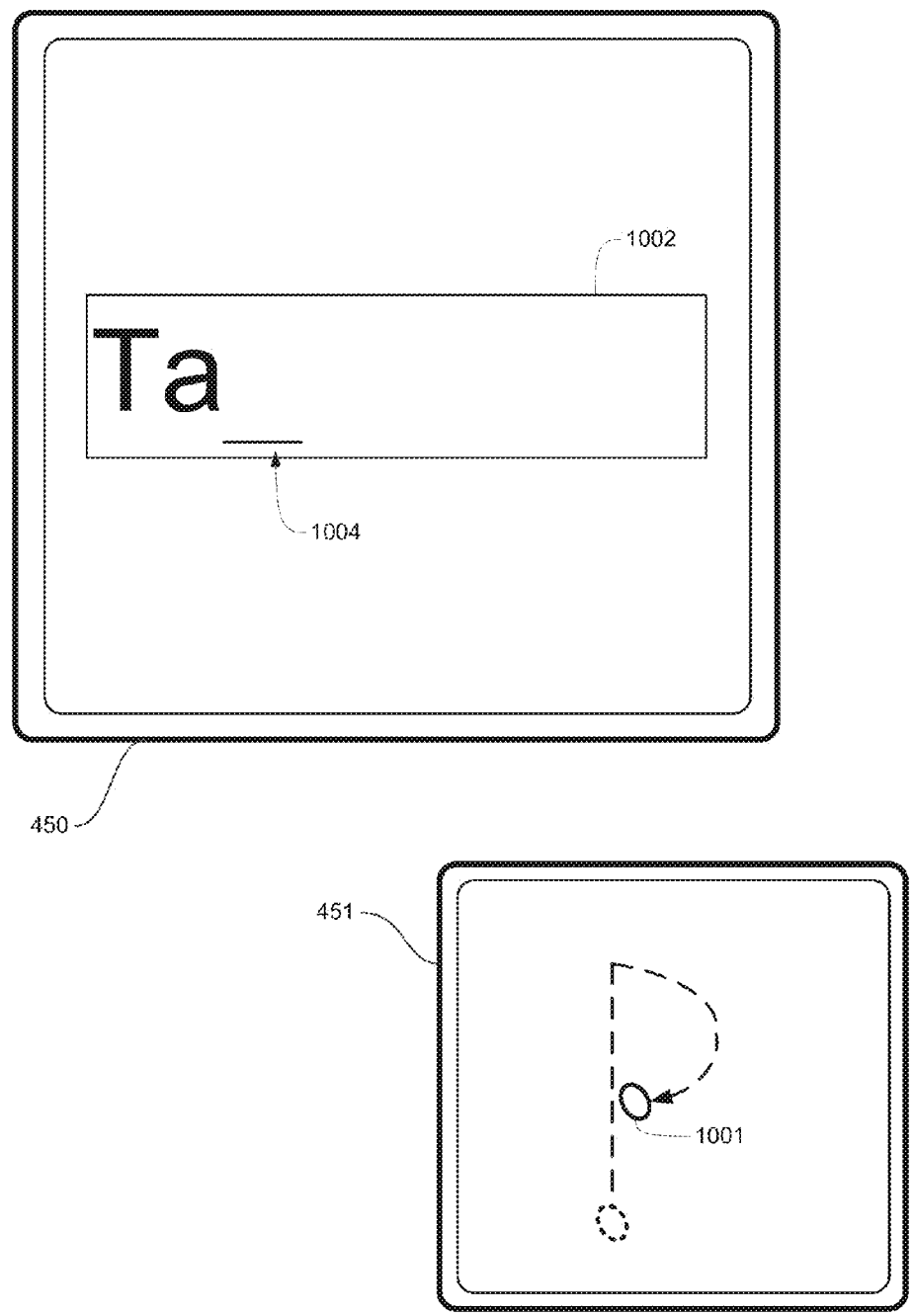
FIGS. 10A-10K illustrate exemplary ways in which an electronic device presents a handwritten input correction user interface in accordance with some embodiments of the disclosure.

FIG. 10A illustrates an exemplary user interface into which characters are being inputted. Display 450 optionally displays a user interface that includes a candidate character region (e.g., a region in the user interface into which one or more characters are inputted), such as text entry field 1002. Display 450 optionally corresponds to display 514 in FIG. 5. A "T" and an "a" have optionally already been inputted into text entry field 802. Indicator 1004 optionally indicates the next position into which a character, the handwritten input corresponding to which, will be inputted in text entry field 802. Indicator 1004 is included for ease of description, but need not actually be displayed in the user interface displayed on display 450.

Input is optionally being detected on touch-sensitive surface 451. Touch-sensitive surface 451 optionally corresponds to a touch-sensitive surface on remote 510 in FIG. 5. The input detected on touch-sensitive surface 451 optionally includes movement of contact 1001, as illustrated.

The device optionally identifies a character that corresponds to the movement of contact 1001 to input that character into text entry field 802.

Figure 10B:
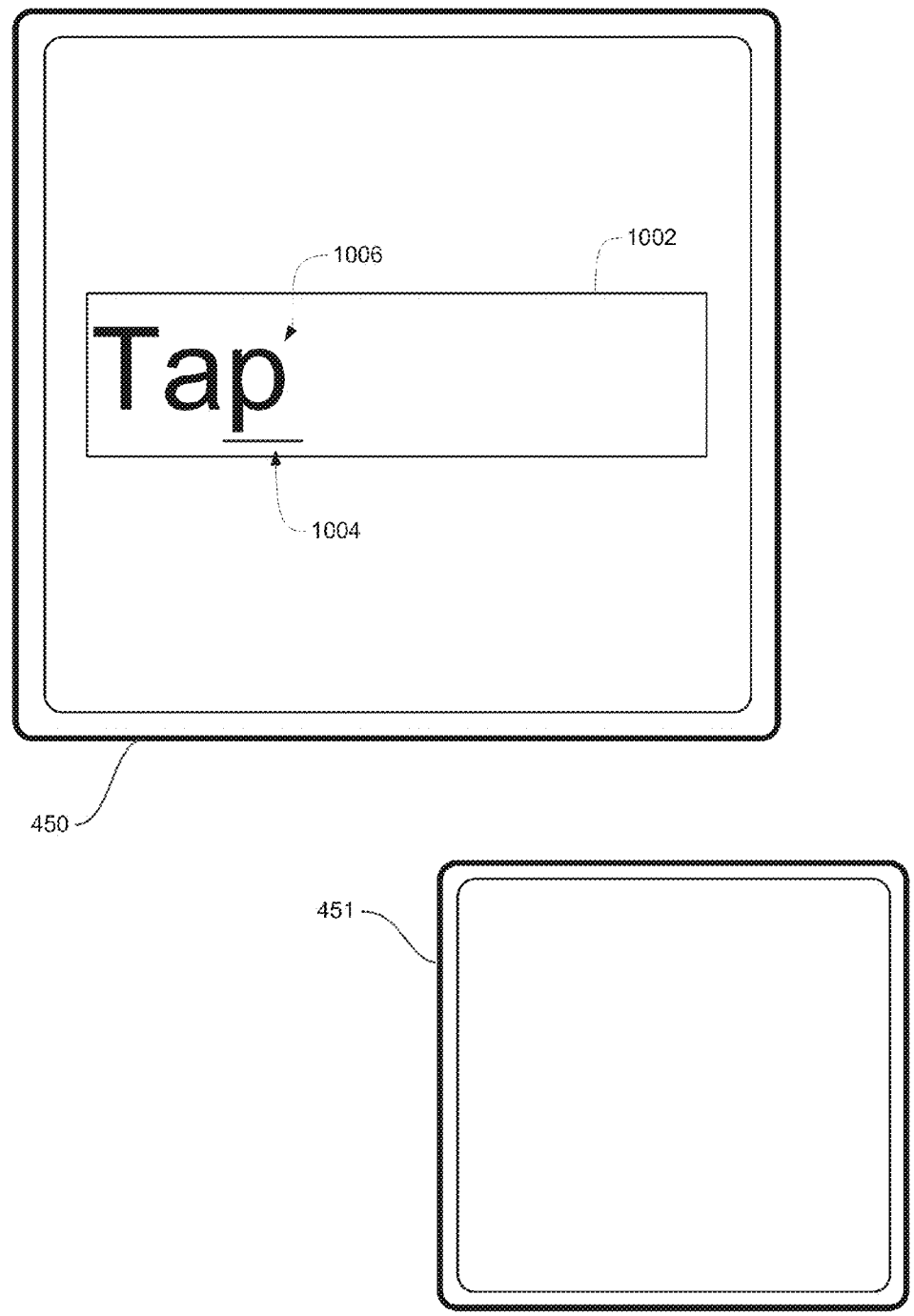

FIG. 10B illustrates recognition and inputting of a candidate character that corresponds to input detected on a touch-sensitive surface. As shown in FIG. 10B, in some embodiments, the device has identified a "p" as corresponding to the movement of contact 1001 detected on touch-sensitive surface 451, and has inputted and displayed candidate character "p" 1006 at location 1004 in text entry field 1002.

In some circumstances, a user wishes to change or correct the inputting of candidate character "p" 1006 in text entry field 1002 in order to select a different character to be inputted in text entry field 1002 instead.

Figure 10C:
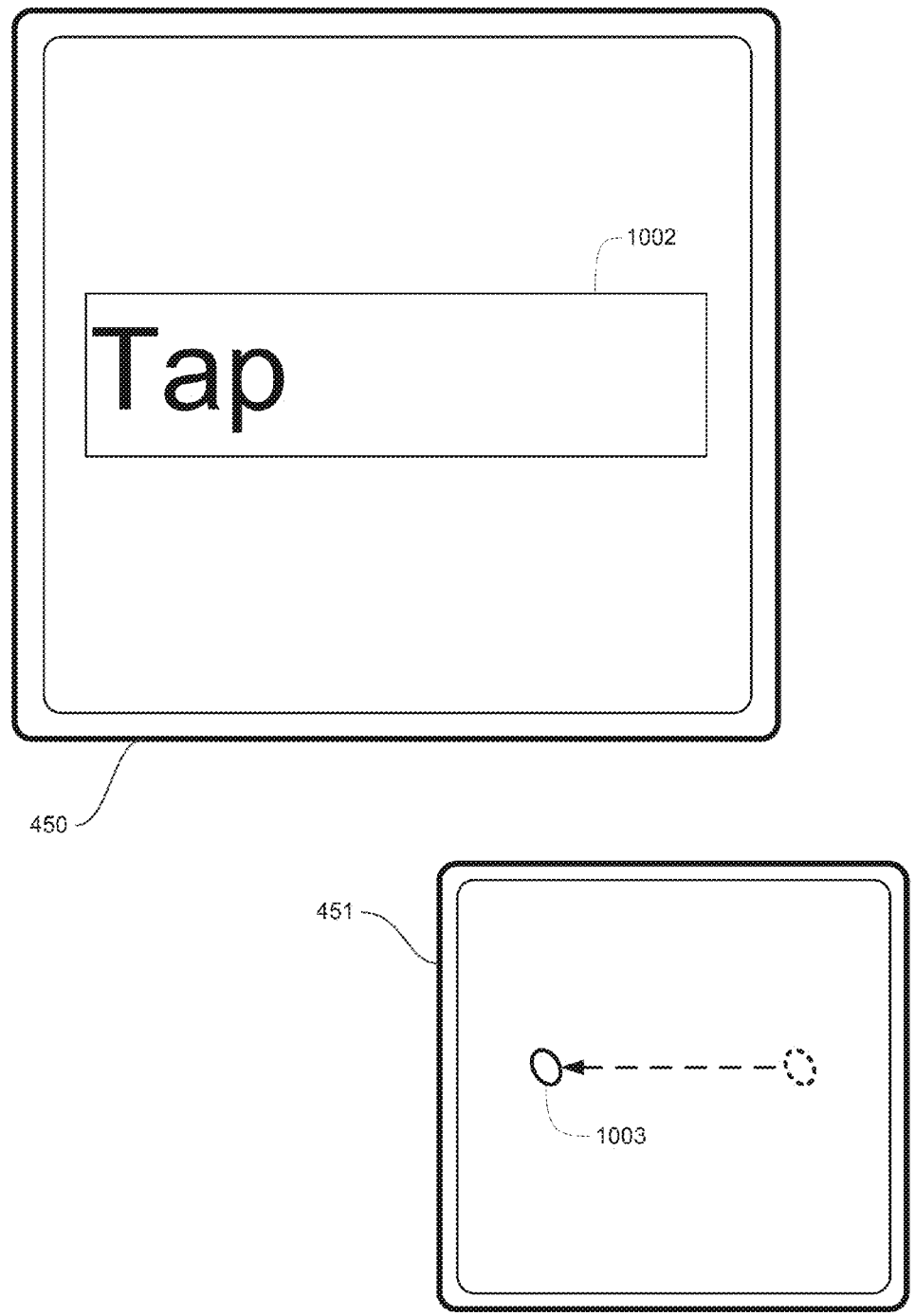

FIG. 10C illustrates part of an exemplary candidate character correction in accordance with some embodiments. As discussed above, a "p" was identified and inputted into text entry field 1002. However, in some circumstances, a user wishes to change the "p" that was inputted into text entry field 1002 to instead input a different character. In order to initiate such a change, in some embodiments, the device receives a request to delete the "p" character in text entry field 1002. As shown in FIG. 10C, in some embodiments, this request is a right-to-left swipe detected on touch-sensitive surface 451 as defined by the movement of contact 1003. It is understood that any request to delete a candidate character is within the scope of the disclosure, including detection of selection of a delete button in the user interface, on an input device, or otherwise.

Figure 10D:
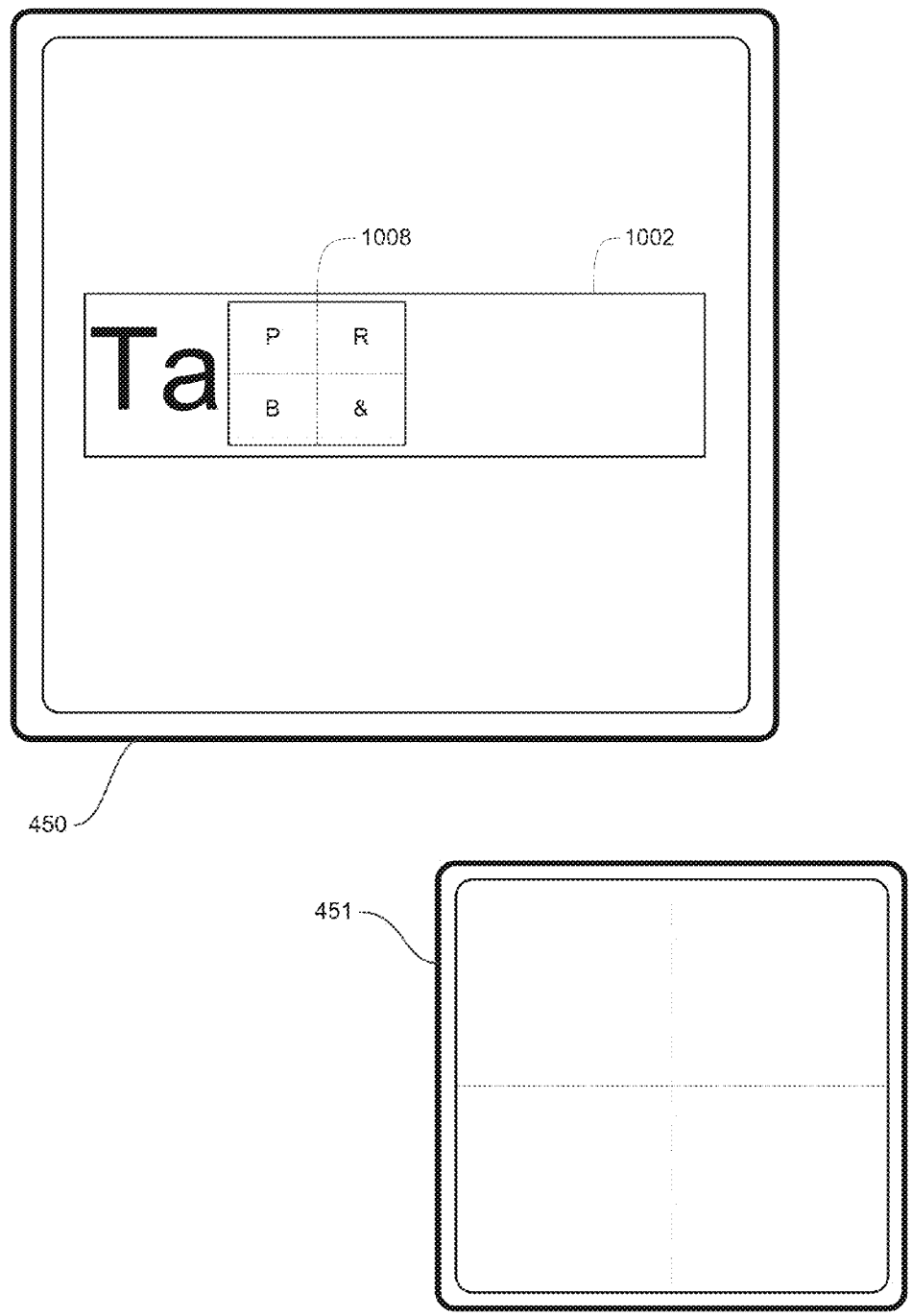

FIG. 10D illustrates deletion of a candidate character and displaying of other candidate characters in response to receiving a request to delete a candidate character. In response to the movement of contact 1003 detected on touch-sensitive surface 451, the device optionally deletes candidate character "p" from text entry field 1002, and displays, in place of candidate character "p", a plurality of other candidate characters 1008 that correspond to the movement of contact 1001 in FIG. 10A (e.g., the movement of the contact that resulted in the inputting of candidate character "p" in the first instance). For example, the plurality of other candidate characters are characters other than candidate character "p" that correspond to the input that was used to input candidate character "o" into the candidate character region (e.g., text entry field 1002) in the first place; or, alternative character matches.

As shown in FIG. 10D, in some embodiments, the plurality of other candidate characters 1008 include a "P", a "B", an "R" and a "&". In some embodiments, the plurality of other candidate characters 1008 is displayed in a layout similar to a layout of touch-sensitive surface 451. For example, the plurality of candidate characters 1008 is optionally displayed as a 2×2 grid in the user interface, with a first character in the top-left (e.g., character "P"), a second character in the top-right (e.g., character "R"), a third character in the bottom-right (e.g., character "&"), and a fourth character in the bottom-left (e.g., character "B"). Selection of a respective one of the characters is optionally accomplished by detecting a tap in the region on touch-sensitive surface 4451 (top-left, top-right, bottom-right, bottom-left) corresponding to the region in the grid in which the respective character is displayed. The device optionally detects selection of one of the plurality of other candidate characters 1008 to input the selected other candidate character into text entry field 1002, or optionally detects another input on touch-sensitive surface 451 to dismiss the plurality of other candidate characters 1008 from the user interface.

Figure 10E:
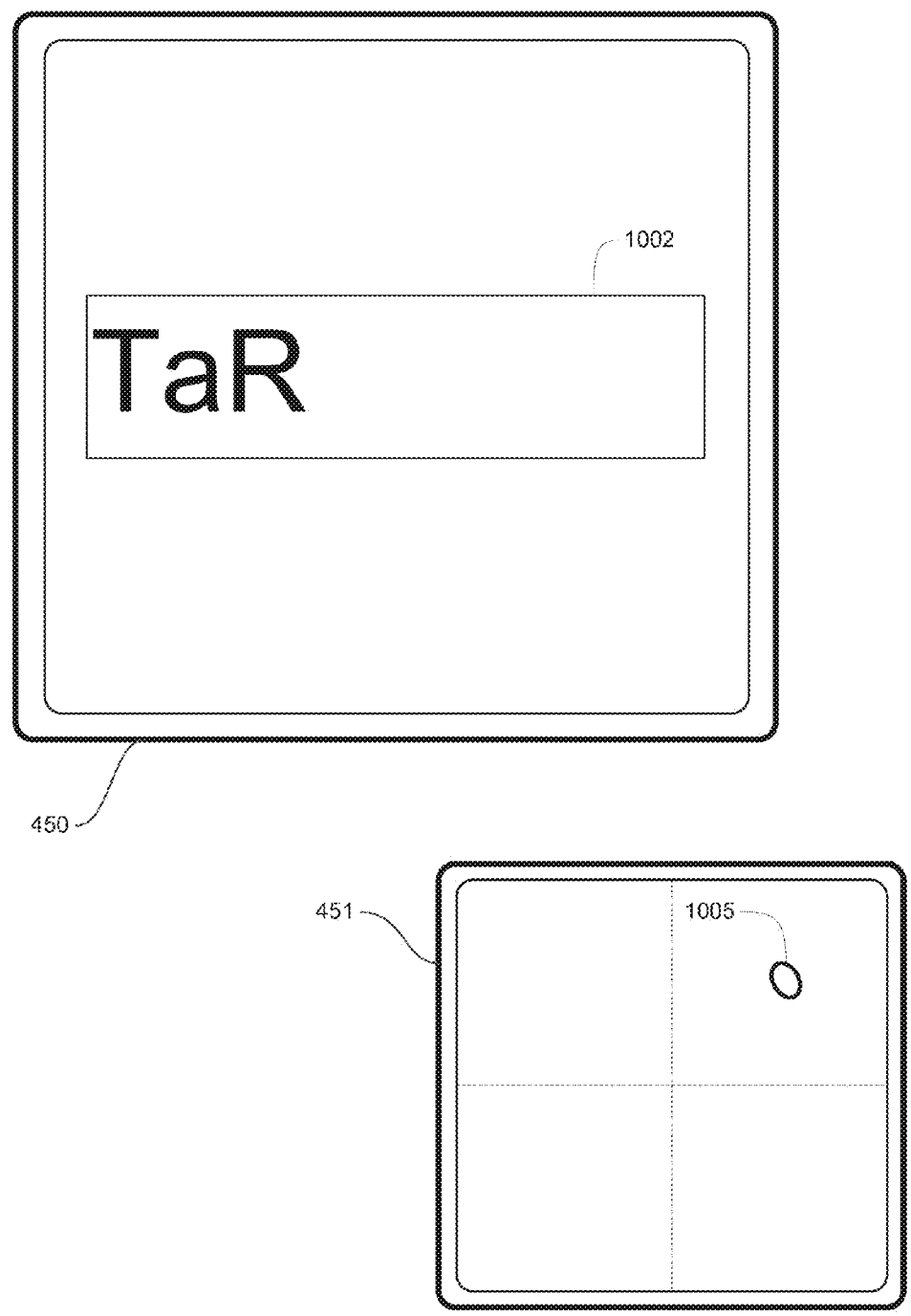

FIG. 10E illustrates detection of a selection of one of the plurality of other candidate characters for entry into text entry field 1002. As shown in FIG. 10E, in some embodiments, contact 1005 has been detected in the upper-right region of touch-sensitive surface 451. As a result, character "R" is inputted into text entry field 1002 in place of plurality of other candidate characters 1008 (and in place of original candidate character "p"), as illustrated in FIG. 10E. Others of the plurality of other candidate characters 1008 could have optionally been selected in an analogous manner.

Instead of selecting one of the plurality of other candidate characters 1008 shown in FIG. 10D, in some circumstances, a user optionally dismisses the plurality of other candidate characters 1008.

Figure 10F:
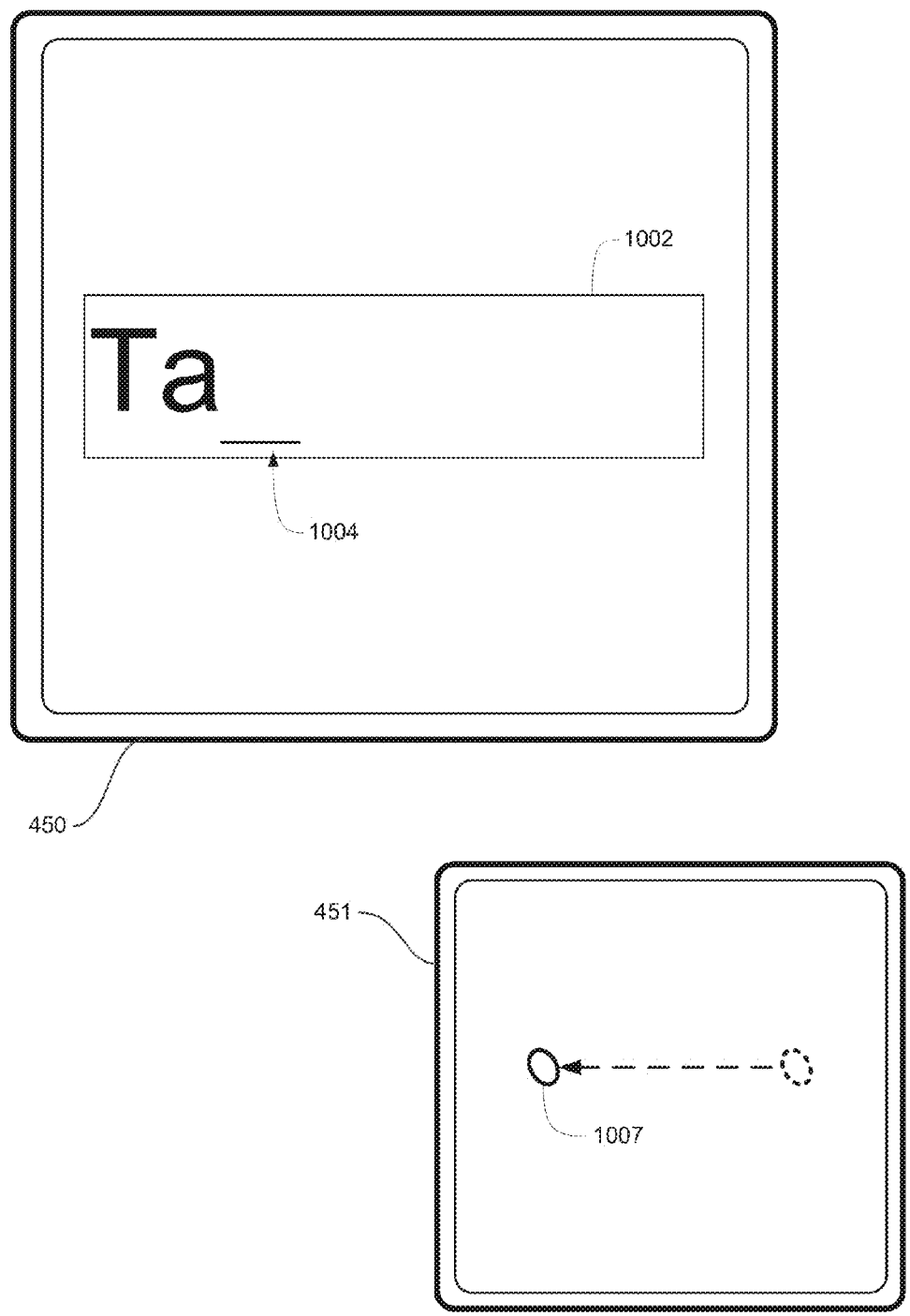

FIG. 10F illustrates dismissal of the plurality of other candidate characters displayed in the user interface. A request to dismiss the plurality of other candidate characters 1008 is optionally detected on touch-sensitive surface 451 while the plurality of other candidate characters are displayed, such as in FIG. 10D. As shown in FIG. 10F, in some embodiments, this request corresponds to a right-to-left swipe defined by movement of contact 1007. In some embodiments, the request to dismiss the plurality of other candidate characters 1008 is more generally a swipe in the same direction as the swipe for deleting one of the candidate characters (e.g., the right-to-left swipe defined by movement of contact 1003 in FIG. 10C to delete candidate character "p").

In response to detection of the swipe defined by the movement of contact 1007 detected on touch-sensitive surface, the device optionally ceases to display the plurality of other candidate characters 1008 displayed in FIG. 10D, as illustrated in FIG. 10F. Now, as shown in FIG. 10F, in some embodiments, only "T" and "a" remain in text entry field 1002. In some circumstances, a user optionally deletes candidate character "a" in text entry field 1002 in the same manner as described with references to FIGS. 10C-10D.

Figure 10G:
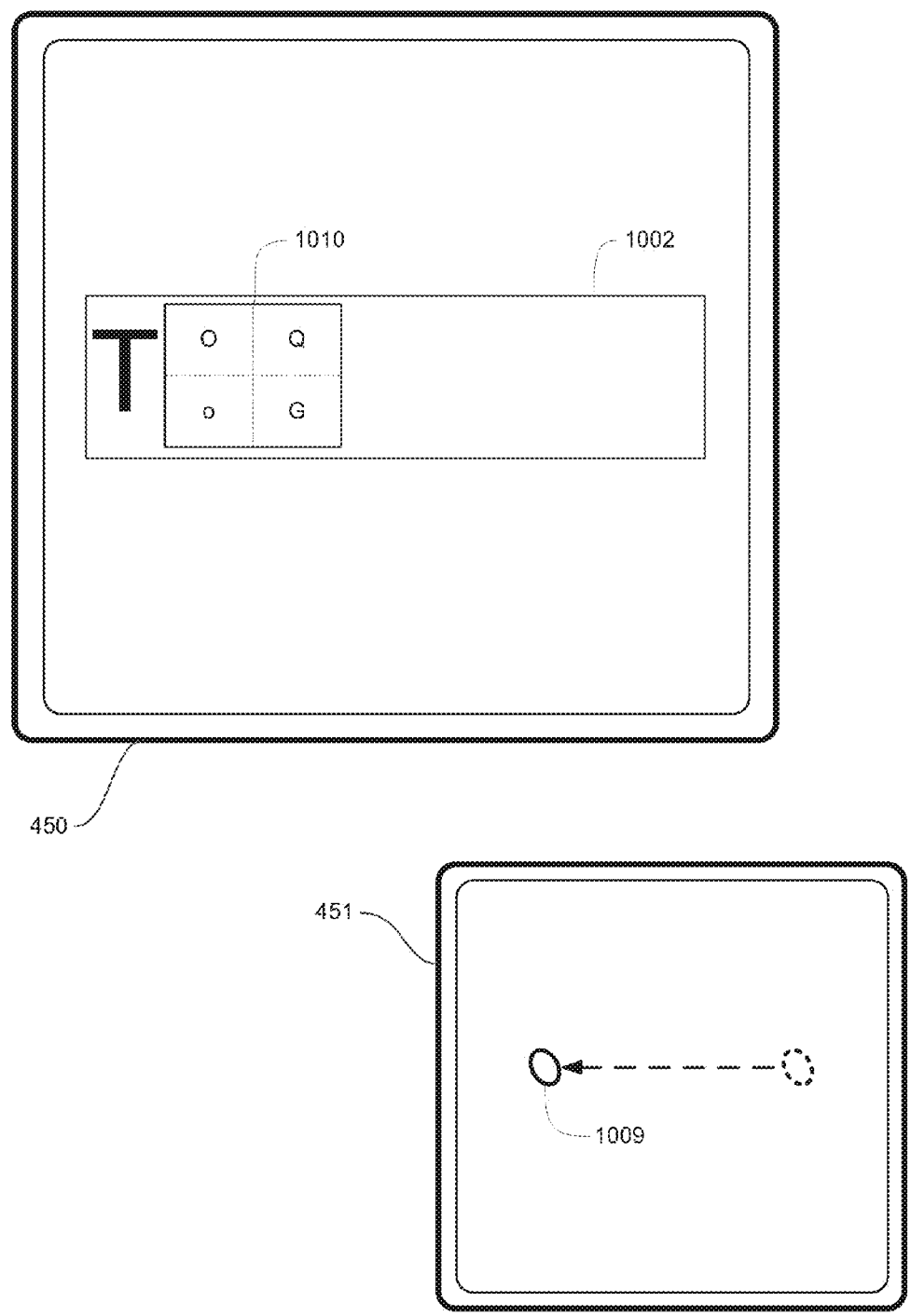

FIG. 10G illustrates deletion of a second candidate character and displaying of further candidate characters in response to receiving a request to delete the second candidate character. Similar to above, detection of movement of contact 1009 on touch-sensitive surface 451 that defines a right-to-left swipe optionally results in deletion of candidate character "a" from text entry field 1002. As before, after deletion of candidate character "a" from text entry field 1002, a plurality of candidate characters 1010 corresponding to the input that was used to input candidate character "a" into text entry field 1002 in the first place are optionally displayed in place of candidate character "a" in text entry field 1002. Selection and/or dismissal of the plurality of candidate character 1010 are optionally performed as described above with respect to FIGS. 10D-10F. Thus, the device of the disclosure optionally maintains alternative candidate character matches for more than one candidate character displayed in the user interface, allowing a user to sequentially delete the candidate characters and see alternative candidate character matches for each deleted candidate character.

Figure 10H:
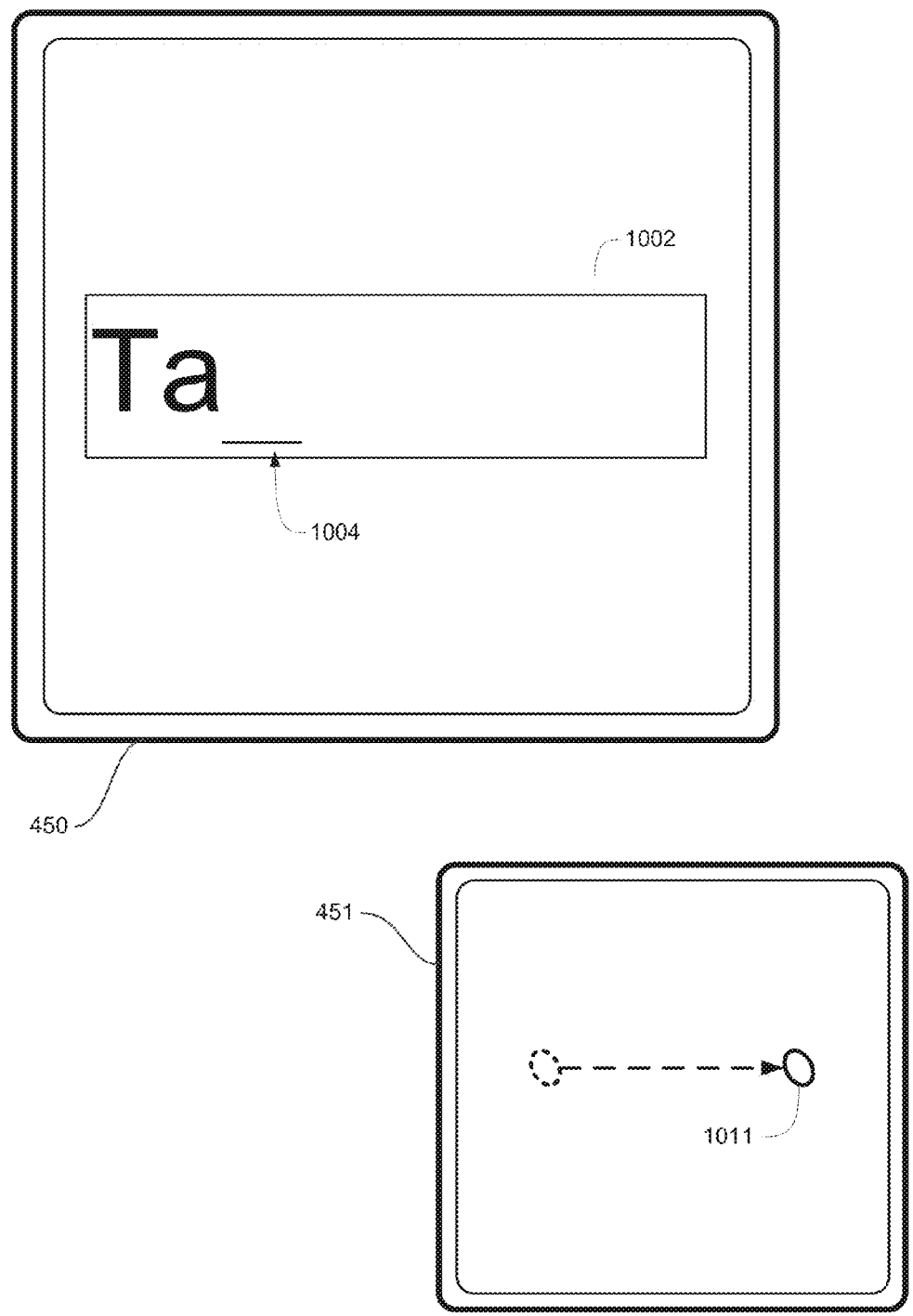
Figure 10I:
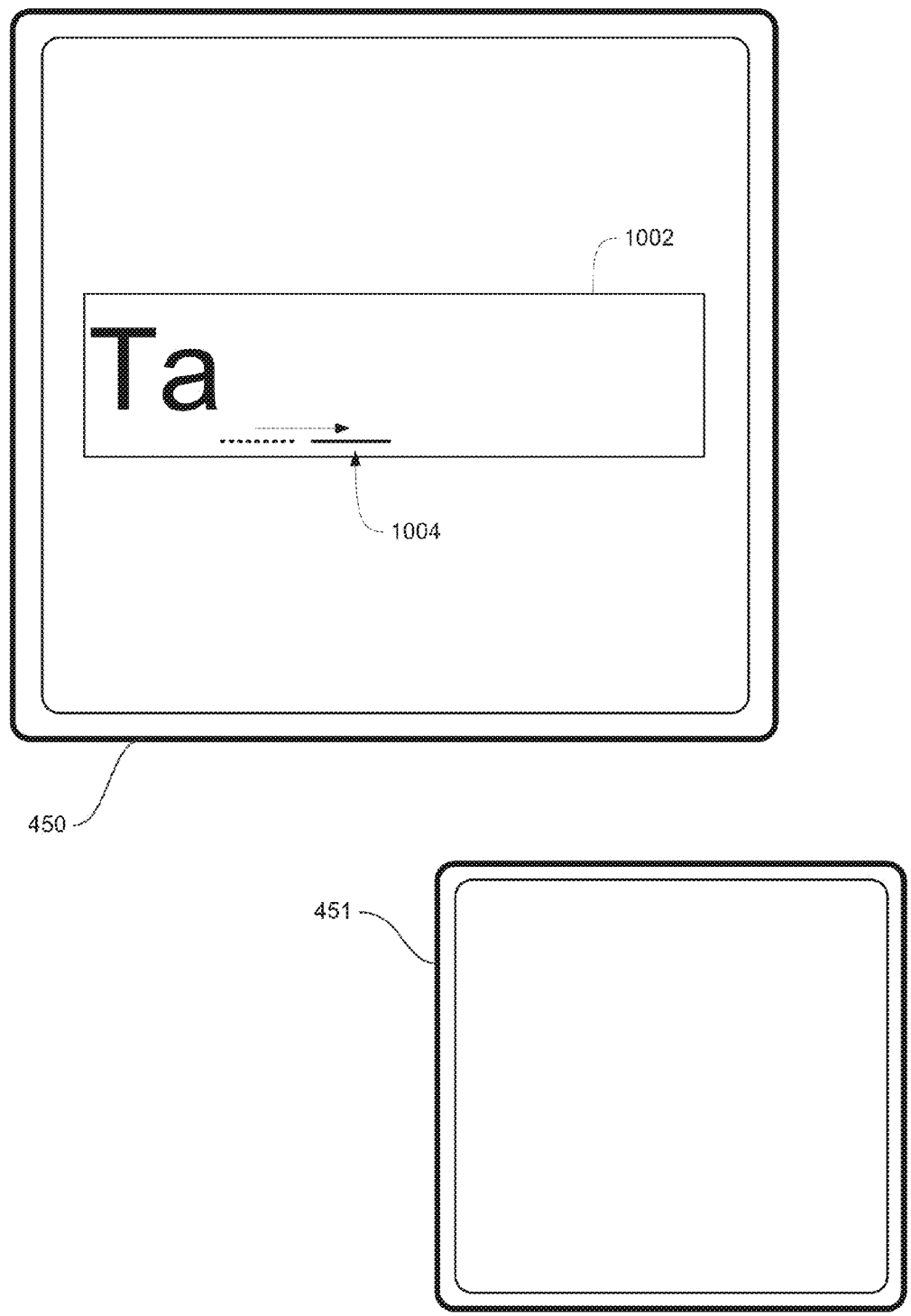

FIGS. 10H-10I illustrate the insertion of a space into the user interface in accordance with some embodiments. In some embodiments, in response to a forward swipe detected on touch-sensitive surface 451, as illustrated by movement of contact 1011 in FIG. 10H, the electronic device inputs a space into the candidate character region (e.g., text entry field 1002). FIG. 10I illustrates movement of indicator 1004 by the electronic device to indicate the insertion of the space into text entry field 1002 in response to detection of the forward swipe shown in FIG. 10H.

Figure 10J:
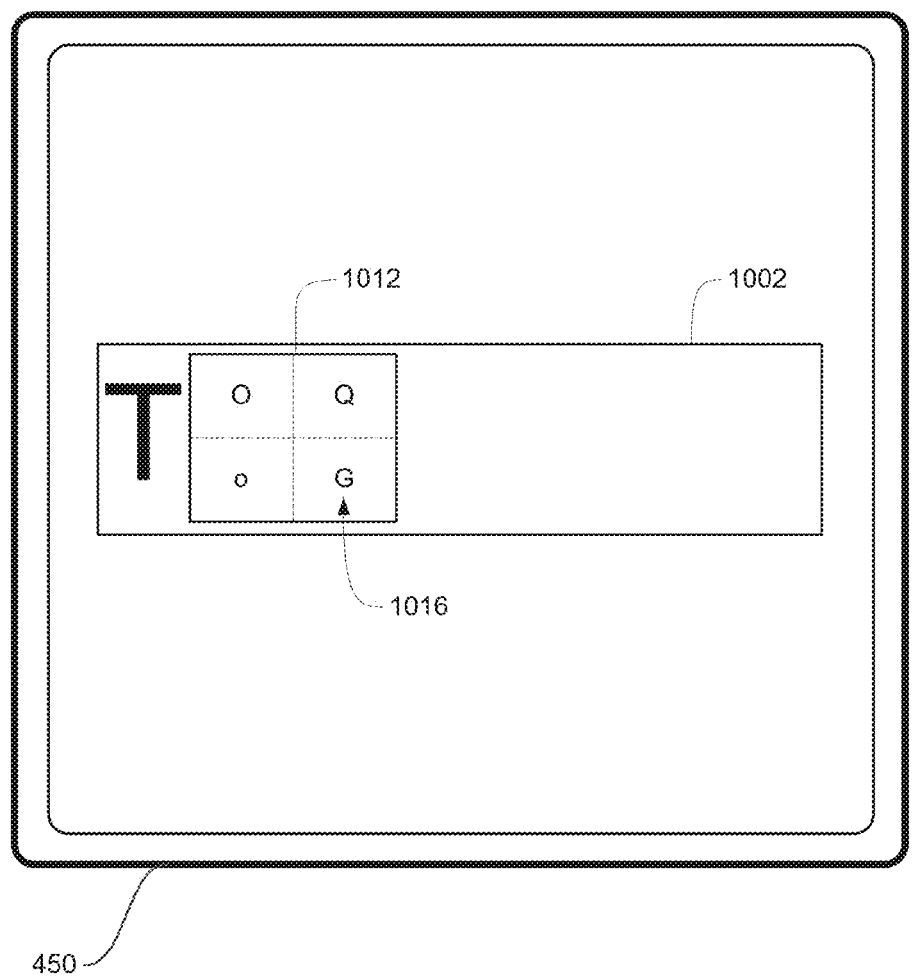
Figure 10K:
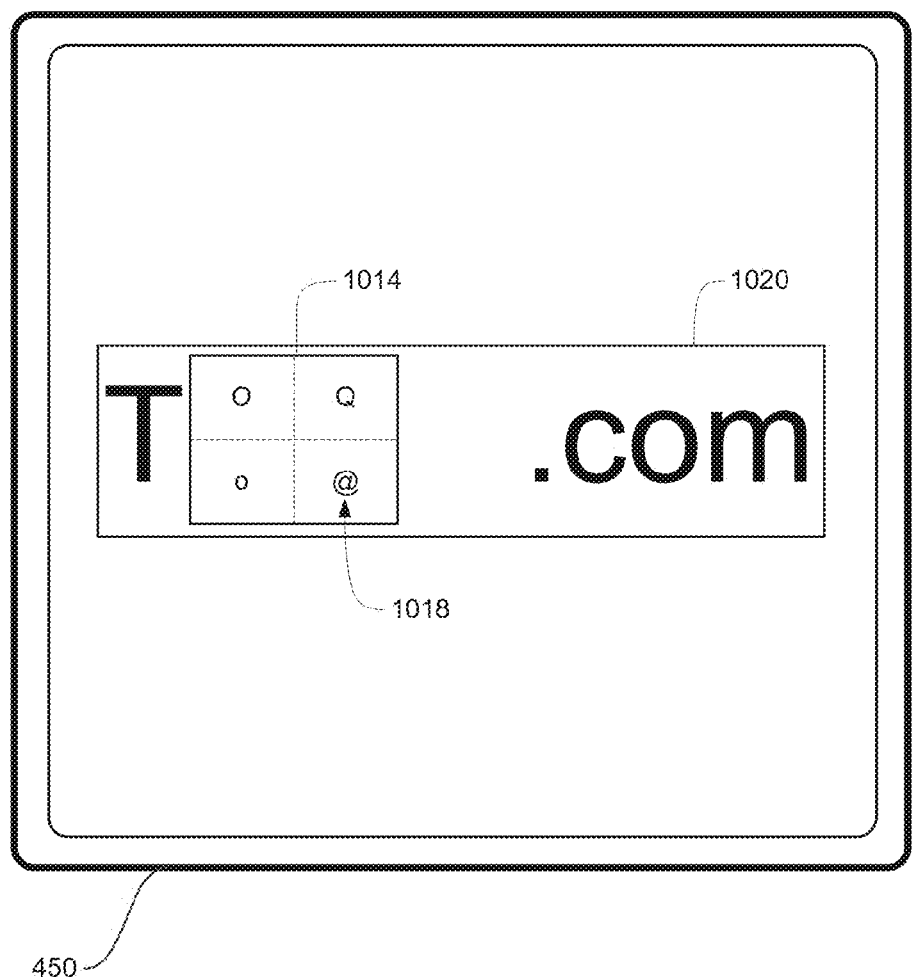
Figure 11A:
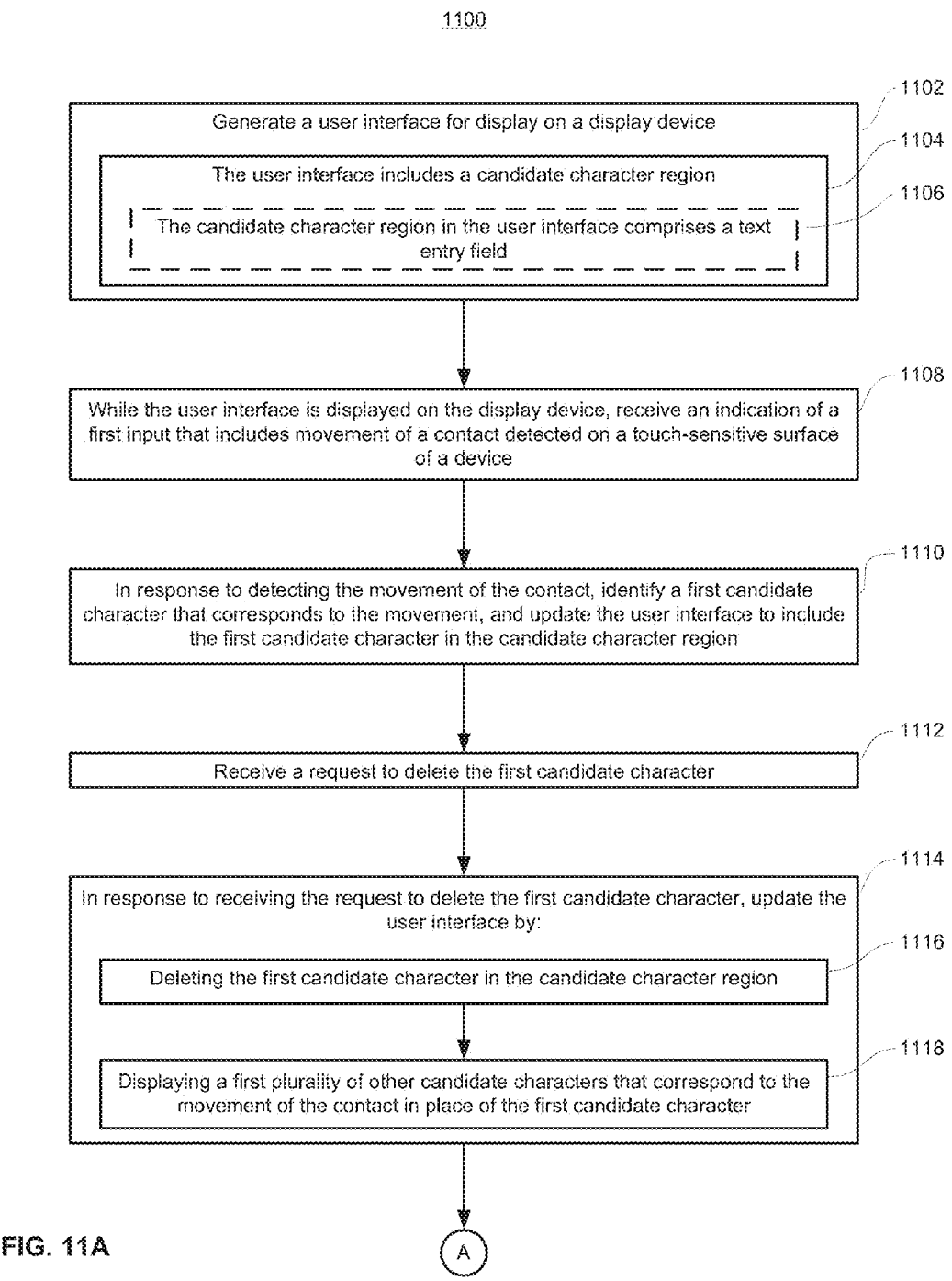
FIGS. 11A-11D are flow diagrams illustrating a method of presenting a handwritten input correction user interface in accordance with some embodiments.
Figure 11B:
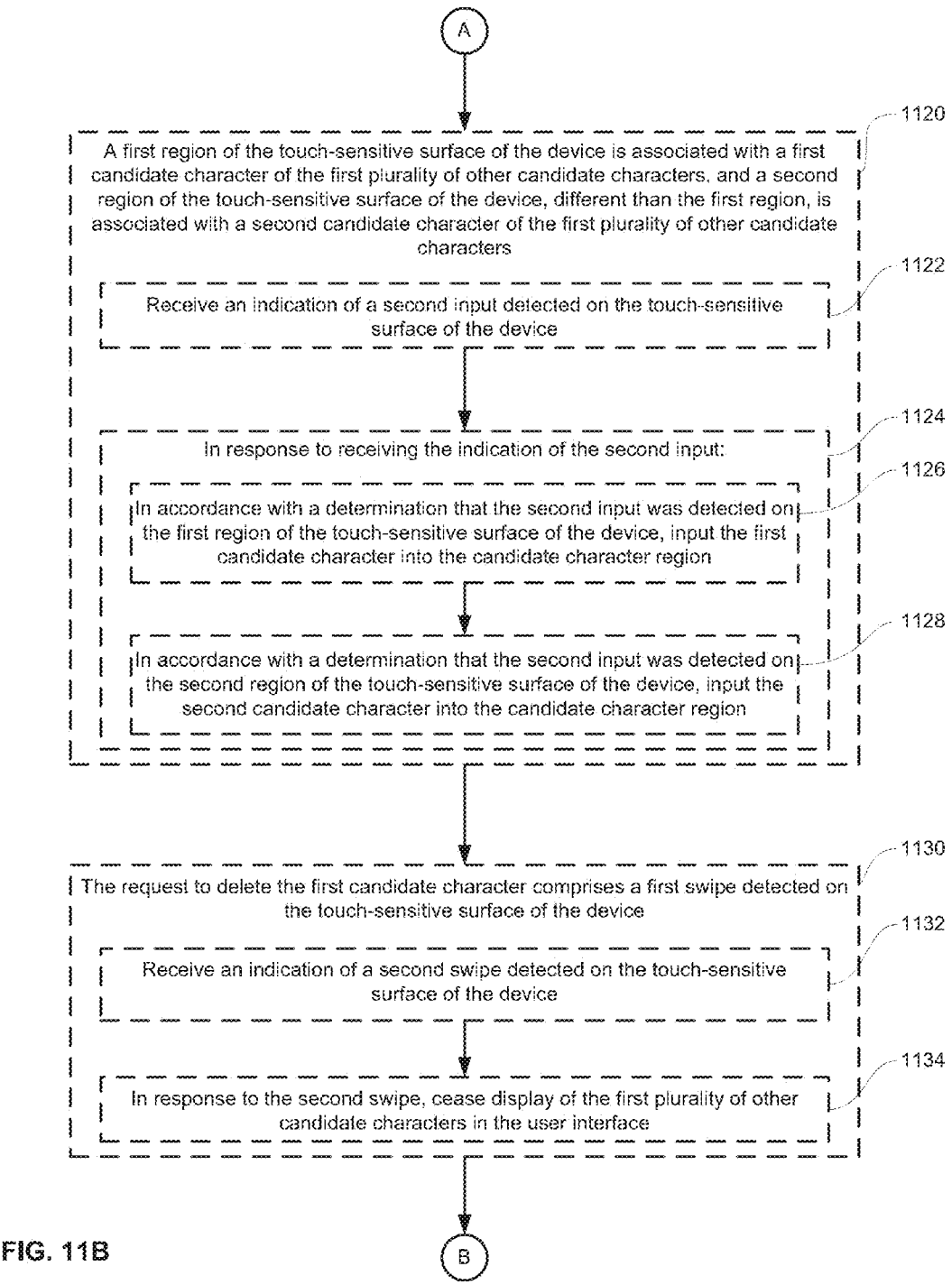
Figure 11C:
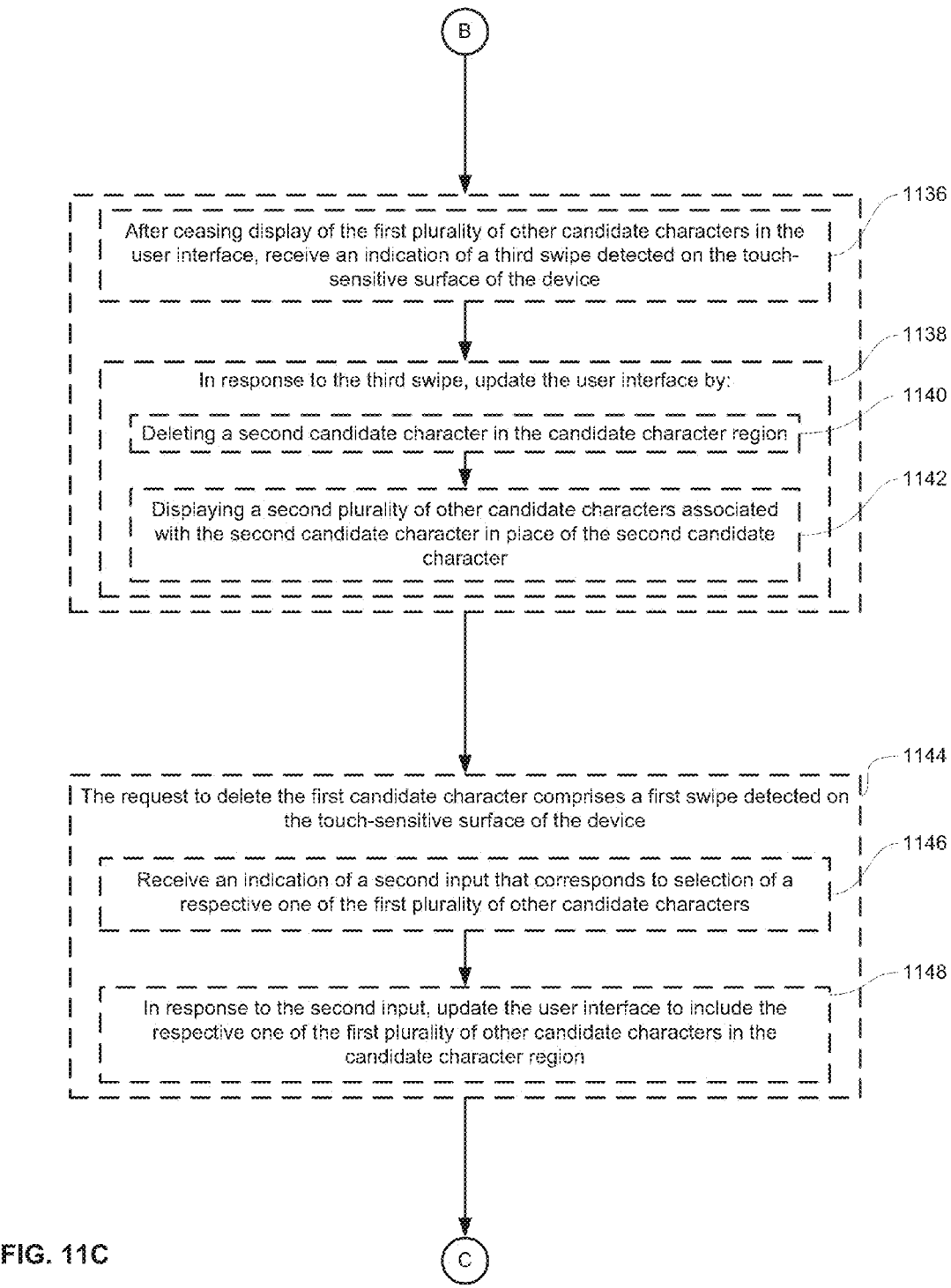
Figure 11D:
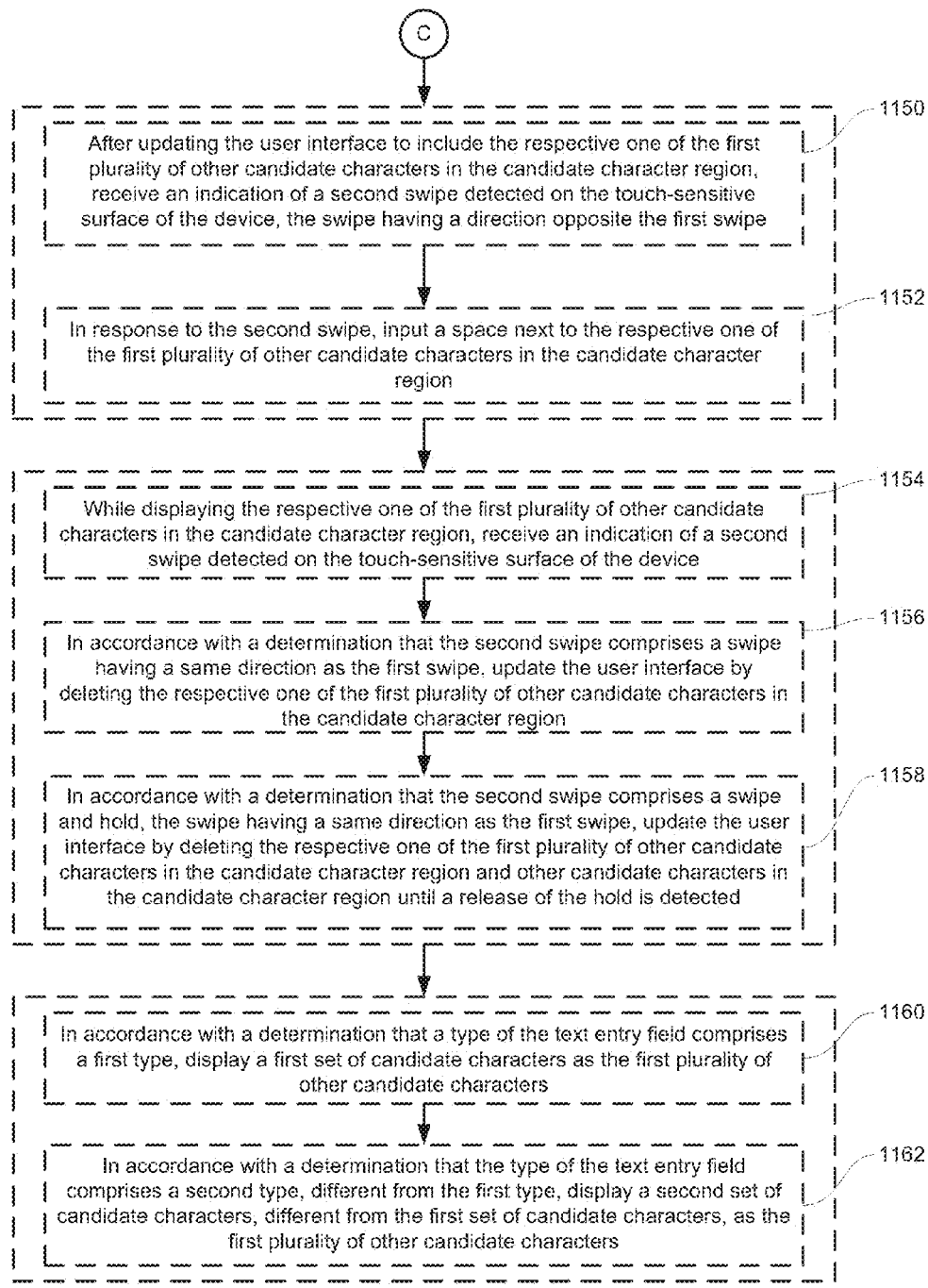

FIGS. 10J-10K illustrate the display of different candidate characters based on the type of candidate character region (e.g., text entry field) into which the device is inputting text. FIG. 10J illustrates an exemplary plurality of other candidate characters 1012 displayed when text entry field 1002 is, for example, a search field or an otherwise regular text entry field (e.g., a text entry field into which entry of characters other than letters is unlikely). In some embodiments, the plurality of other candidate characters 1012 displayed when text entry field 1002 is a search field are optionally mostly or all letters. However, in some embodiments, the type of text entry field optionally affects the device's determination of the candidate characters that are going to be displayed by the electronic device. FIG. 10K illustrates an exemplary plurality of other candidate characters 1014 displayed when text entry field 1020 is, for example, an email address entry field. If text entry field 1020 is an email address entry field, as shown in FIG. 10K, the likelihood that a "@" character is displayed as a candidate character is optionally higher than if the text entry field is a search field or an otherwise regular text entry field, such as text entry field 1002 in FIG. 10J. In FIG. 10K, the plurality of other candidate characters 1012 optionally include the "@" character 1018 in place of the "G" character 1016 in FIG. 10J, for the reasons given above.

FIGS. 11A-11D are flow diagrams illustrating a method 1100 of presenting a handwritten input correction user interface in accordance with some embodiments. The method 1100 is optionally performed at an electronic device such as device 500 as described above with reference to FIG. 5, including a set top box or other user interface generating device that is in communication with a remote control and a display device. Some operations in method 1100 are, optionally, combined and/or the order of some operations is, optionally, changed.

As described below, the method 1100 provides ways in which a device optionally presents a handwritten input correction user interface. The method reduces the cognitive burden on a user when interacting with a user interface on the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors and memory generates (1102) a user interface for display on a display device (e.g., a television or other display device), wherein the user interface includes a candidate character region (1104) (e.g., a region in the user interface into which one or more characters are inputted; for example, a text entry field, such as text entry field 1002 in FIG. 10A). In some embodiments, the candidate character region in the user interface comprises a text entry field (1106) (e.g., search field, web address field, username/password field, such as text entry field 1002 in FIG. 10A).

In some embodiments, while the user interface is displayed on the display device, the electronic device receives (1108) an indication of a first input that includes movement of a contact (e.g., a finger contact or stylus contact, such as contact 1001 in FIG. 10A) detected on a touch-sensitive surface of a device (e.g., a touch-sensitive surface of a remote control or a portable multifunction device with a touchscreen display, such as touch-sensitive surface 451 in FIG. 10A).

In some embodiments, in response to detecting the movement of the contact, the electronic device identifies (1110) a first candidate character that corresponds to the movement, such as candidate character 1006 in FIG. 10B (e.g., determines that the movement of the contact corresponds to a "C"), and updates the user interface to include the first candidate character in the candidate character region (e.g., inputs a "C" in the candidate character region).

In some embodiments, the electronic device receives (1112) a request to delete the first candidate character (e.g., by detecting selection of a delete button, by detecting a delete gesture on the touch-sensitive surface, etc., such as detection of movement of contact 1003 in FIG. 10C).

In some embodiments, in response to receiving the request to delete the first candidate character, the electronic device updates (1114) the user interface by deleting the first candidate character in the candidate character region (1116), as illustrated in FIG. 10C, and displaying a first plurality of other candidate characters that correspond to the movement of the contact in place of the first candidate character (1118) (e.g., the first plurality of other candidate characters are characters other than the first character that correspond to the input that was used to input the first character into the candidate character region in the first place, such as the plurality of other candidate characters 1008 in FIG. 10D; e.g., alternative character matches for the handwriting input).

In some embodiments, a first region of the touch-sensitive surface of the device (e.g., a touch-sensitive surface of a remote control or a portable multifunction device with a touchscreen display) is associated with a first candidate character of the first plurality of other candidate characters, and a second region of the touch-sensitive surface of the device, different than the first region, is associated with a second candidate character of the first plurality of other candidate characters (1120) (e.g., in some embodiments, the relative location of the first region on the touch-sensitive surface to the second region on the touch-sensitive surface is the same as the relative location of the first candidate character to the second candidate character in the user interface. That is, the first plurality of other candidate characters is displayed in a layout similar to a layout of the touch-sensitive surface of the device, as illustrated in FIG. 10D).

In some embodiments, the electronic device receives (1122) an indication of a second input (e.g., tap or tap-and-click) detected on the touch-sensitive surface of the device, and in response to receiving the indication of the second input (1124), in accordance with a determination that the second input was detected on the first region of the touch-sensitive surface of the device, inputs (1126) the first candidate character into the candidate character region (e.g., detection of contact 1005 in FIG. 10E optionally results in the electronic device inputting candidate character "R" into text entry field 1002). In some embodiments, in accordance with a determination that the second input was detected on the second region of the touch-sensitive surface of the device, the electronic device inputs (1128) the second candidate character into the candidate character region. For example, the plurality of candidate characters is optionally displayed as a 2×2 grid in the user interface, with a first character in the top-left, a second character in the top-right, a third character in the bottom-right, and a fourth character in the bottom-left, as illustrated in FIG. 10C. Selection of a respective one of the characters is optionally accomplished by tapping in the region on the touch-sensitive surface (top-left, top-right, bottom-right, bottom-left) corresponding to the region in the grid in which the respective character is displayed.

In some embodiments, the request to delete the first candidate character comprises a first swipe (e.g., a right-to-left horizontal swipe) detected on the touch-sensitive surface of the device (1130) (e.g., a touch-sensitive surface of a remote control or a portable multifunction device with a touchscreen display). In some embodiments, the electronic device receives (1132) an indication of a second swipe (e.g., a right-to-left horizontal swipe, such as the swipe defined by movement of contact 1007 in FIG. 10F) detected on the touch-sensitive surface of the device (in some embodiments, this is any request to dismiss the first plurality of other candidate characters in the user interface. In some embodiments, this is another right-to-left horizontal swipe detected on the touch-sensitive surface of the device following detection of the right-to-left horizontal swipe to delete the first candidate character, or more generally, a swipe in the same direction as the swipe for deleting the first candidate character). In some embodiments, in response to the second swipe, the electronic device ceases (1134) display of the first plurality of other candidate characters in the user interface, as illustrated in FIG. 10F.

In some embodiments, after ceasing display of the first plurality of other candidate characters in the user interface, the electronic device receives (1136) an indication of a third swipe (e.g., a right-to-left horizontal swipe, such as the swipe defined by movement of contact 1009 in FIG. 10G) detected on the touch-sensitive surface of the device (in some embodiments, this is any request to delete a character in the candidate character region. In some embodiments, this is another right-to-left horizontal swipe detected on the touch-sensitive surface of the device following detection of the right-to-left horizontal swipe to dismiss the first plurality of candidate characters, or more generally, a swipe in the same direction as the swipe for dismissing the first plurality of candidate characters). In some embodiments, in response to the third swipe, the electronic device updates (1138) the user interface by: deleting a second candidate character in the candidate character region (1140) (e.g., another character, other than the first candidate character, that is in the candidate character region, such as candidate character "a" in FIG. 10F), and displaying a second plurality of other candidate characters associated with the second candidate character (e.g., the plurality of candidate characters 1010 in FIG. 10G) in place of the second candidate character (1142), such as illustrated in FIG. 10G. For example, in the case that the second candidate character was entered using handwriting recognition, the second plurality of candidate characters are characters, sometimes other than the second candidate character, that correspond to the input that was used to input the second candidate character into the candidate character region in the first place (e.g., alternative character matches for the handwriting input).

In some embodiments, the request to delete the first candidate character comprises a first swipe (e.g., a right-to-left horizontal swipe, or a backward swipe) detected on the touch-sensitive surface of the device (1144) (e.g., a touch-sensitive surface of a remote control or a portable multifunction device with a touchscreen display). In some embodiments, the electronic device receives (1146) an indication of a second input that corresponds to selection of a respective one of the first plurality of other candidate characters (e.g., any input detected on the touch-sensitive surface for selecting the respective candidate character, such as the region-based selection discussed previously). In some embodiments, in response to the second input, the electronic device updates (1148) the user interface to include the respective one of the first plurality of other candidate characters in the candidate character region (e.g., enters the selected character into the candidate character region in the user interface, such as illustrated in FIG. 10E).

In some embodiments, after updating the user interface to include the respective one of the first plurality of other candidate characters in the candidate character region, the electronic device receives (1150) an indication of a second swipe detected on the touch-sensitive surface of the device (e.g., a touch-sensitive surface of a remote control or a portable multifunction device with a touchscreen display), the swipe having a direction opposite the first swipe (e.g., a left-to-right horizontal swipe, or a forward swipe). In some embodiments, in response to the second swipe, the electronic device inputs (1152) a space next to the respective one of the first plurality of other candidate characters in the candidate character region, as illustrated in FIGS. 10H-10I (e.g., a swipe forward adds a space to the candidate character region, whereas a swipe backward deletes a character in the candidate character region and presents an alternate character user interface, as described previously).

In some embodiments, while displaying the respective one of the first plurality of other candidate characters in the candidate character region, the electronic device receives (1154) an indication of a second swipe detected on the touch-sensitive surface of the device (e.g., a touch-sensitive surface of a remote control or a portable multifunction device with a touchscreen display). In some embodiments, in accordance with a determination that the second swipe comprises a swipe having a same direction as the first swipe (e.g., the swipe used to delete the first candidate character. In some embodiments, a right-to-left horizontal swipe, or a backward swipe), the electronic device updates (1156) the user interface by deleting the respective one of the first plurality of other candidate characters in the candidate character region. In some embodiments, in accordance with a determination that the second swipe comprises a swipe and hold, the swipe having a same direction as the first swipe (e.g., the swipe used to delete the first candidate character.

In some embodiments, a right-to-left horizontal swipe, or a backward swipe, followed by a holding of the contact at the end of the swipe for longer than a threshold period (0.1, 0.5 or 1 seconds)), the electronic device updates (1158) the user interface by deleting the respective one of the first plurality of other candidate characters in the candidate character region and other candidate characters in the candidate character region until a release of the hold is detected (e.g., delete characters one by one in the candidate character region until liftoff of the contact defining the swipe is detected).

In some embodiments, in accordance with a determination that a type of the text entry field comprises a first type (e.g., an email address entry field), the electronic device displays (1160) a first set of candidate characters as the first plurality of other candidate characters, and in accordance with a determination that the type of the text entry field comprises a second type (e.g., a number entry field), different from the first type, the electronic device displays (1162) a second set of candidate characters, different from the first set of candidate characters, as the first plurality of other candidate characters. For example, the type of the text entry field optionally affects the electronic device's determination of the candidate characters that are going to be displayed. If the text entry field is an email address entry field, for example, the likelihood that a "@" symbol is displayed as a candidate character is optionally higher than if the text entry field is a number or regular text entry field, as illustrated in FIGS. 10J-10K.

It should be understood that the particular order in which the operations in FIGS. 11A-11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 1100 described above with respect to FIGS. 11A-11D. For example, the user interface, display device and touch-sensitive surface described above with reference to method 1100 optionally have one or more of the characteristics of the user interfaces, display devices and touch-sensitive surfaces described herein with reference to other methods described herein (e.g., methods 700 and 900). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 11A-11D are, optionally, implemented by components depicted in FIGS. 1A-1B. For example, generation operation 1102, receiving operation 1108, identifying operation 1110, and updating operation 1114 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
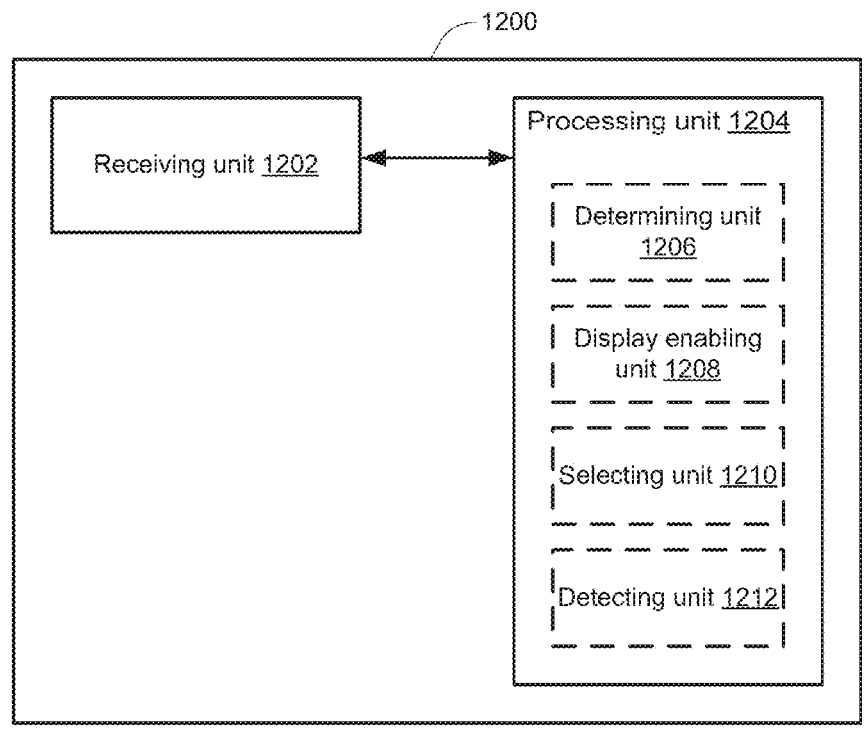
FIGS. 12-14 are functional block diagrams of electronic devices in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 optionally includes a receiving unit 1202 configured to receive inputs, and a processing unit 1204 coupled to the receiving unit 1202. In some embodiments, the processing unit 1204 includes a determining unit 1206, a display enabling unit 1208, a selecting unit 1210, and a detecting unit 1212.

In some embodiments, the receiving unit 1202 is configured to receive an indication of a first input that includes movement of a contact detected on a touch-sensitive surface of a device, wherein the movement of the contact comprises a first stroke, and the first stroke has a spatial component and a temporal component.

In some embodiments, the processing unit 1205 is configured to determine a first probability that the first stroke corresponds to a first character based on the spatial component of the first stroke (e.g., with the determining unit 1206), determine a second probability that the first stroke corresponds to the first character based on the temporal component of the first stroke (e.g., with the determining unit 1206), and determine an aggregate probability that the first stroke corresponds to the first character based on the first probability and the second probability (e.g., with the determining unit 1206).

In some embodiments, the determinations of the first, second and aggregate probabilities are performed (e.g., with the determining unit 1206) while the first stroke is still being detected. In some embodiments, the determinations of the first, second and aggregate probabilities are repeated periodically (e.g., with the determining unit 1206) while the first stroke is still being detected.

In some embodiments, the processing unit 1204 is further configured to, while the first stroke is still being detected: determine, at a first time, a first aggregate probability that the first stroke corresponds to the first character (e.g., with the determining unit 1206), provide a first character suggestion for display on a display device based on the first aggregate probability (e.g., with the display enabling unit 1208), determine, at a second time after the first time, a second aggregate probability that the first stroke corresponds to the first character (e.g., with the determining unit 1206), and provide a second character suggestion, different from the first character suggestion, for display on the display device based on the second aggregate probability (e.g., with the display enabling unit 1208).

In some embodiments, the first input comprises the first stroke detected during a first time period and a second stroke detected during a second time period, the second stroke having a spatial component and a temporal component, and the processing unit 1204 is further configured to: determine a third probability that the first stroke corresponds to the first character and the second stroke corresponds to a second character based on the temporal and spatial components of the first and second strokes (e.g., with the determining unit 1206), determine a fourth probability that a combination of the first stroke and the second stroke corresponds to a third character based on the temporal and spatial components of the combination of the first and second strokes (e.g., with the determining unit 1206), in accordance with a determination that the third probability is higher than the fourth probability, select the first character and the second character as inputs (e.g., with the selecting unit 1210), and in accordance with a determination that the fourth probability is higher than the third probability, select the third character as an input (e.g., with the selecting unit 1210).

In some embodiments, determining the third probability comprises determining the third probability based on a language model indicating a likelihood that the first character will be followed by the second character in a particular language.

In some embodiments, the processing unit 1204 is further configured to determine a plurality of aggregate probabilities for a plurality of characters, a first aggregate probability comprising an aggregate probability that the first stroke corresponds to a first character of the plurality of characters and a second aggregate probability comprising an aggregate probability that the first stroke corresponds to a second character of the plurality of characters (e.g., with the determining unit 1206), and select, from the plurality of characters, a character having the highest aggregate probability as an input (e.g., with the selecting unit 1210).

In some embodiments, the processing unit 1204 is further configured to detect an end of the first stroke (e.g., with the detecting unit 121), and after detecting the end of the first stroke, detect at least a portion of a second stroke (e.g., with the detecting unit 1212), and in response to detecting the portion of the second stroke, determine whether the first stroke and the second stroke correspond to a single character based on temporal information about the first stroke and the second stroke (e.g., with the determining unit 1206). In some embodiments, the second stroke spatially overlaps at least a portion of the first stroke, and the first stroke and the second stroke are determined as belonging to different characters based at least in part on the temporal information. In some embodiments, the first stroke is spatially segregated from the second stroke, and the first stroke and the second stroke are determined as belonging to the same character based at least in part on the temporal information.

Figure 13:
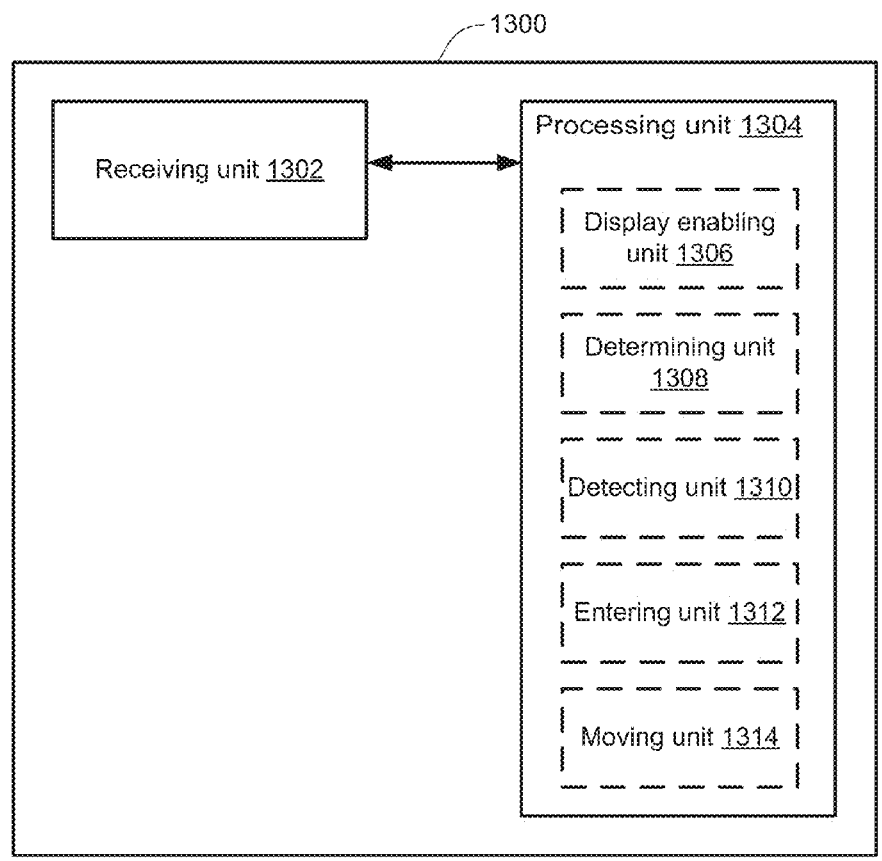

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 optionally includes a receiving unit 1302 configured to receive inputs, and a processing unit 1304 coupled to the receiving unit 1302. In some embodiments, the processing unit 1304 includes a display enabling unit 1306, a determining unit 1308, a detecting unit 1310, an entering unit 1312, and a moving unit 1314.

In some embodiments, the receiving unit 1302 is configured to, while a user interface is displayed on a display device, receive an indication of a first input that includes movement of a contact detected on a touch-sensitive surface of a device. In some embodiments, the processing unit 1304 is configured to generate the user interface for display on the display device (e.g., with the display enabling unit 1306), wherein the user interface includes a gesture display region, and after receiving the indication of the first input: display a representation of the movement of the contact in the gesture display region (e.g., with the display enabling unit 1306), determine a first candidate character that corresponds to the movement of the contact (e.g., with the determining unit 1308), and concurrently display the first candidate character with the representation of the movement of the contact in the gesture display region (e.g., with the display enabling unit 1306).

In some embodiments, the user interface includes a text entry field, and the gesture display region is displayed in-line with the text entry field. In some embodiments, displaying the first candidate character in the gesture display region comprises displaying the first candidate character in the gesture display region until a second candidate character is determined to be a most likely candidate character, and the processing unit is further configured to: detect additional movement of the contact of the first input (e.g., with the detecting unit 1310), determine that the second candidate character is the most likely candidate character (e.g., with the determining unit 1308), cease display of the first candidate character in the gesture display region (e.g., with the display enabling unit 1306), and concurrently display the second candidate character with the representation of the movement of the contact in the gesture display region (e.g., with the display enabling unit 1306).

In some embodiments, the gesture display region is displayed at a first location in the user interface at which the first candidate character is to be entered, and the processing unit is further configured to: in response to a determination that the first candidate character is a final character (e.g., with the determining unit 1308), enter the first candidate character in the first location in the user interface (e.g., with the entering unit 1312), and after entering the first candidate character in the first location, move the gesture display region to a second location in the user interface at which a second candidate character is to be entered (e.g., with the moving unit 1314).

In some embodiments, entering the first candidate in the first location is in response to detecting liftoff of the contact of the first input. In some embodiments, the representation of the movement of the contact comprises: a contact position indicator representing a current location of the contact on the touch-sensitive surface of the device, and a trail representing one or more past locations of the contact on the touch-sensitive surface of the device, wherein a visual emphasis of a respective point in the trail varies depending on the amount of time that has elapsed since the contact position indicator was at the respective point in the trail.

In some embodiments, determining the first candidate character comprises determining the first candidate character from a plurality of candidate characters that correspond to the movement of the contact, and displaying the first candidate character in the gesture display region comprises displaying the first candidate character overlaid on the representation of the movement of the contact in the gesture display region.

In some embodiments, in the user interface, the first candidate character is overlaid on the representation of the movement of the contact such that a shape and a position of the first candidate character is similar to a shape and a position of the representation of the movement of the contact.

In some embodiments, the receiving unit 1302 is further configured to receive an indication of further movement of the contact, and the processing unit 1304 is further configured to: in accordance with a determination that movement of the contact, including the further movement of the contact, corresponds to a second candidate character (e.g., with the determining unit 1308), update the user interface to: cease to display the first candidate character (e.g., with the display enabling unit 1306), and display the second candidate character overlaid on the representation of the movement of the contact (e.g., with the display enabling unit 1306).

In some embodiments, the representation of the movement of the contact is displayed in a region of a first text entry field that is visually distinguished from other regions of the first text entry field. In some embodiments, the visually distinguished region of the first text entry field is a current character input region of the first text entry field into which a current character is to be inputted, the receiving unit 1302 is further configured to receive a request to switch to inputting characters in a second character input region of the first text entry field, and the processing unit 1304 is further configured to, in response to receiving the request, update the user interface to shift the visually distinguished region to the second character input region of the first text entry field (e.g., with the moving unit 1314).

In some embodiments, the processing unit 1304 is further configured to, before updating the user interface to shift the visually distinguished region to the second character input region: determine a final character corresponding to the movement of the contact (e.g., with the determining unit 1308), and input the final character into the current character region of the text entry field (e.g., with the entering unit 1312).

Figure 14:
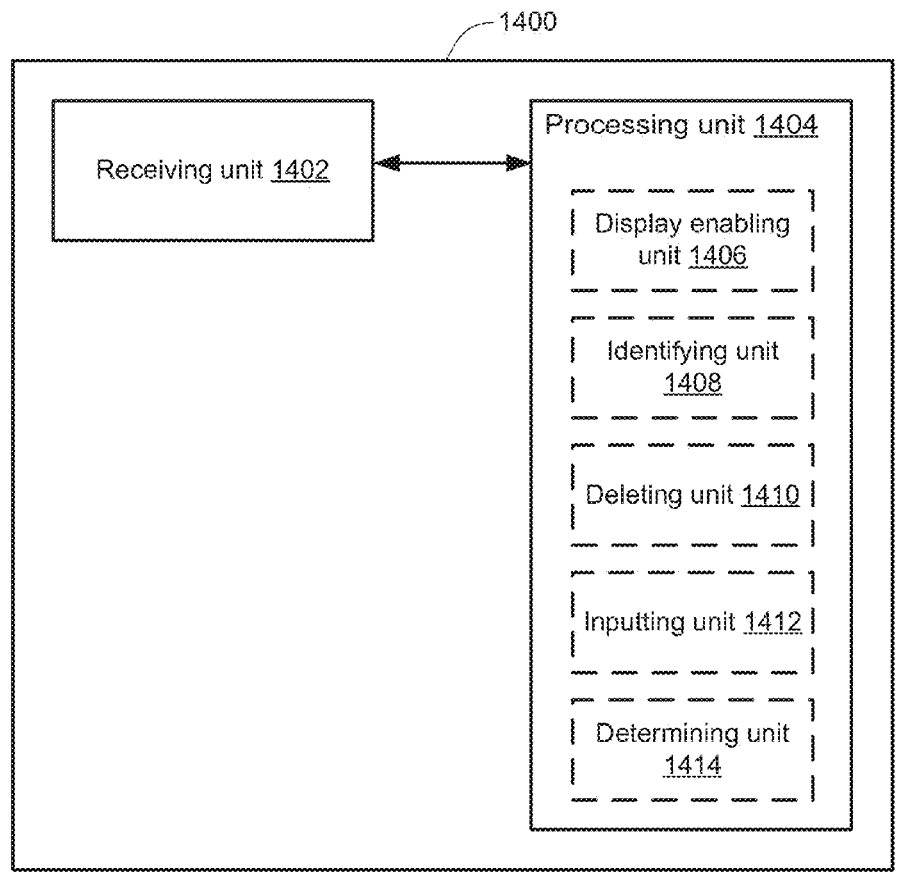

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 optionally includes a receiving unit 1402 configured to receive inputs, and a processing unit 1404 coupled to the receiving unit 1402. In some embodiments, the processing unit 1404 includes a display enabling unit 1406, an identifying unit 1408, a deleting unit 1410, an inputting unit 1412, and a determining unit 1414.

In some embodiments, the receiving unit 1402 is configured to: while a user interface is displayed on a display device, receive an indication of a first input that includes movement of a contact detected on a touch-sensitive surface of a device, and receive a request to delete a first candidate character. In some embodiments, the processing unit 1404 is configured to generate the user interface for display on the display device, wherein the user interface includes a candidate character region (e.g., with the display enabling unit 1406), in response to detecting the movement of the contact, identify the first candidate character that corresponds to the movement (e.g., with the identifying unit 1408), and update the user interface to include the first candidate character in the candidate character region (e.g., with the display enabling unit 1406), and in response to receiving the request to delete the first candidate character, update the user interface by: deleting the first candidate character in the candidate character region (e.g., with the deleting unit 1410), and displaying a first plurality of other candidate characters that correspond to the movement of the contact in place of the first candidate character (e.g., with the display enabling unit 1406).

In some embodiments, a first region of the touch-sensitive surface of the device is associated with a first candidate character of the first plurality of other candidate characters, a second region of the touch-sensitive surface of the device, different than the first region, is associated with a second candidate character of the first plurality of other candidate characters, the receiving unit 1402 is further configured to receive an indication of a second input detected on the touch-sensitive surface of the device, and the processing unit 1404 is further configured to, in response to receiving the indication of the second input: in accordance with a determination that the second input was detected on the first region of the touch-sensitive surface of the device (e.g., with the determining unit 1414), input the first candidate character into the candidate character region (e.g., with the inputting unit 1412), and in accordance with a determination that the second input was detected on the second region of the touch-sensitive surface of the device (e.g., with the determining unit 1414), input the second candidate character into the candidate character region (e.g., with the inputting unit 1412).

In some embodiments, the request to delete the first candidate character comprises a first swipe detected on the touch-sensitive surface of the device, the receiving unit 1402 is further configured to receive an indication of a second swipe detected on the touch-sensitive surface of the device, and the processing unit 1404 is further configured to, in response to the second swipe, cease display of the first plurality of other candidate characters in the user interface (e.g., with the display enabling unit 1406).

In some embodiments, the receiving unit 1402 is further configured to, after display of the first plurality of other candidate characters in the user interface is ceased, receive an indication of a third swipe detected on the touch-sensitive surface of the device, the processing unit 1404 is further configured to, in response to the third swipe, update the user interface by: deleting a second candidate character in the candidate character region (e.g., with the deleting unit 1410), and displaying a second plurality of other candidate characters associated with the second candidate character in place of the second candidate character (e.g., with the display enabling unit 1406).

In some embodiments, the request to delete the first candidate character comprises a first swipe detected on the touch-sensitive surface of the device, the receiving unit 1402 is further configured to receive an indication of a second input that corresponds to selection of a respective one of the first plurality of other candidate characters, and the processing unit 1404 is further configured to, in response to the second input, update the user interface to include the respective one of the first plurality of other candidate characters in the candidate character region (e.g., with the display enabling unit 1406). In some embodiments, the receiving unit 1402 is further configured to, after the user interface is updated to include the respective one of the first plurality of other candidate characters in the candidate character region, receive an indication of a second swipe detected on the touch-sensitive surface of the device, the swipe having a direction opposite the first swipe, and the processing unit 1404 is further configured to, in response to the second swipe, input a space next to the respective one of the first plurality of other candidate characters in the candidate character region (e.g., with the inputting unit 1412).

In some embodiments, the receiving unit 1402 is further configured to, while the respective one of the first plurality of other candidate characters is displayed in the candidate character region, receive an indication of a second swipe detected on the touch-sensitive surface of the device, and the processing unit 1404 is further configured to, in accordance with a determination that the second swipe comprises a swipe having a same direction as the first swipe (e.g., with the determining unit 1414), update the user interface by deleting the respective one of the first plurality of other candidate characters in the candidate character region (e.g., with the display enabling unit 1406), and in accordance with a determination that the second swipe comprises a swipe and hold, the swipe having a same direction as the first swipe (e.g., with the determining unit 1414), update the user interface by deleting the respective one of the first plurality of other candidate characters in the candidate character region and other candidate characters in the candidate character region until a release of the hold is detected (e.g., with the display enabling unit 1406).

In some embodiments, the candidate character region in the user interface comprises a text entry field. In some embodiments, displaying the first plurality of other candidate characters comprises: in accordance with a determination that a type of the text entry field comprises a first type (e.g., with the determining unit 1414), displaying a first set of candidate characters as the first plurality of other candidate characters (e.g., with the display enabling unit 1406), and in accordance with a determination that the type of the text entry field comprises a second type, different from the first type (e.g., with the determining unit 1414), displaying a second set of candidate characters, different from the first set of candidate characters, as the first plurality of other candidate characters (e.g., with the display enabling unit 1406).

The operations described above with reference to FIGS. 7A-7D, 9A-9D, and 11A-11D are, optionally, implemented by components depicted in FIGS. 1A-1B, FIG. 12, FIG. 13, or FIG. 14. For example, determining operations 710 and 920, and identifying operation 1110 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, FIG. 12, FIG. 13, or FIG. 14.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. An electronic device, comprising:
one or more processors;
memory; and
one or more programs, wherein the one or more programs are stored in the memory and configured to be executed by the one or more processors, the one or more programs including instructions for:
  receiving an indication of a first input that includes movement of a contact detected on a touch-sensitive surface of a device, wherein:
    the movement of the contact comprises a first stroke, and
    the first stroke has a spatial component and a temporal component;
  determining a first probability that the first stroke corresponds to a first character based on the spatial component of the first stroke;
  determining a second probability that the first stroke corresponds to the first character based on the temporal component of the first stroke;
  determining an aggregate probability that the first stroke corresponds to the first character based on the first probability and the second probability;
  detecting an end of the first stroke; and
  after detecting the end of the first stroke:
    detecting at least a portion of a second stroke; and
    in response to detecting the portion of the second stroke and while the second stroke is still being detected, determining whether the first stroke and the second stroke correspond to a single character based on temporal information about the first stroke and the second stroke.

2. The electronic device of claim 1, wherein the determinations of the first, second and aggregate probabilities are performed while the first stroke is still being detected.

3. The electronic device of claim 1, wherein the determinations of the first, second and aggregate probabilities are repeated periodically while the first stroke is still being detected.

4. The electronic device of claim 3, wherein the one or more programs further include instructions for:
while the first stroke is still being detected:
  determining, at a first time, a first aggregate probability that the first stroke corresponds to the first character;
  providing a first character suggestion for display on a display device based on the first aggregate probability;
  determining, at a second time after the first time, a second aggregate probability that the first stroke corresponds to the first character; and
  providing a second character suggestion, different from the first character suggestion, for display on the display device based on the second aggregate probability.

5. The electronic device of claim 1, wherein the first input comprises the first stroke detected during a first time period and the second stroke detected during a second time period, the second stroke having a spatial component and a temporal component, and the one or more programs further include instructions for:
  determining a third probability that the first stroke corresponds to the first character and the second stroke corresponds to a second character based on the temporal and spatial components of the first and second strokes;
  determining a fourth probability that a combination of the first stroke and the second stroke corresponds to a third character based on the temporal and spatial components of the combination of the first and second strokes;
  in accordance with a determination that the third probability is higher than the fourth probability, selecting the first character and the second character as inputs; and
  in accordance with a determination that the fourth probability is higher than the third probability, selecting the third character as an input.

6. The electronic device of claim 5, wherein determining the third probability comprises determining the third probability based on a language model indicating a likelihood that the first character will be followed by the second character in a particular language.

7. The electronic device of claim 1, wherein the one or more programs further include instructions for:
  determining a plurality of aggregate probabilities for a plurality of characters, a first aggregate probability comprising an aggregate probability that the first stroke corresponds to a first character of the plurality of characters and a second aggregate probability comprising an aggregate probability that the first stroke corresponds to a second character of the plurality of characters; and
  selecting, from the plurality of characters, a character having a highest aggregate probability as an input.

8. The electronic device of claim 1, wherein:
the second stroke spatially overlaps at least a portion of the first stroke, and
the first stroke and the second stroke are determined as belonging to different characters based at least in part on the temporal information.

9. The electronic device of claim 1, wherein:
the first stroke is spatially segregated from the second stroke, and
the first stroke and the second stroke are determined as belonging to the same character based at least in part on the temporal information.

10. The electronic device of claim 1, wherein detecting the end of the first stroke comprises detecting a pause.

11. The electronic device of claim 1, wherein detecting the end of the first stroke comprises detecting a liftoff of the contact detected on the touch-sensitive surface of the device.

12. The electronic device of claim 1, wherein the temporal information about the first stroke and the second stroke comprises a proximity in time between the first stroke and the second stroke.

13. A method comprising:
at an electronic device with one or more processors and memory:
receiving an indication of a first input that includes movement of a contact detected on a touch-sensitive surface of a device, wherein:
the movement of the contact comprises a first stroke, and
the first stroke has a spatial component and a temporal component;
determining a first probability that the first stroke corresponds to a first character based on the spatial component of the first stroke;
determining a second probability that the first stroke corresponds to the first character based on the temporal component of the first stroke;
determining an aggregate probability that the first stroke corresponds to the first character based on the first probability and the second probability
detecting an end of the first stroke; and
after detecting the end of the first stroke:
detecting at least a portion of a second stroke; and
in response to detecting the portion of the second stroke and while the second stroke is still being detected, determining whether the first stroke and the second stroke correspond to a single character based on temporal information about the first stroke and the second stroke.

14. The method of claim 13, wherein the determinations of the first, second and aggregate probabilities are performed while the first stroke is still being detected.

15. The method of claim 13, wherein the determinations of the first, second and aggregate probabilities are repeated periodically while the first stroke is still being detected.

16. The method of claim 13, wherein the first input comprises the first stroke detected during a first time period and the second stroke detected during a second time period, the second stroke having a spatial component and a temporal component, the method further comprising:
determining a third probability that the first stroke corresponds to the first character and the second stroke corresponds to a second character based on the temporal and spatial components of the first and second strokes;
determining a fourth probability that a combination of the first stroke and the second stroke corresponds to a third character based on the temporal and spatial components of the combination of the first and second strokes;
in accordance with a determination that the third probability is higher than the fourth probability, selecting the first character and the second character as inputs; and
in accordance with a determination that the fourth probability is higher than the third probability, selecting the third character as an input.

17. The method of claim 13, further comprising:
determining a plurality of aggregate probabilities for a plurality of characters, a first aggregate probability comprising an aggregate probability that the first stroke corresponds to a first character of the plurality of characters and a second aggregate probability comprising an aggregate probability that the first stroke corresponds to a second character of the plurality of characters; and
selecting, from the plurality of characters, a character having a highest aggregate probability as an input.

18. The method of claim 13, wherein:
the first stroke is spatially segregated from the second stroke, and
the first stroke and the second stroke are determined as belonging to the same character based at least in part on the temporal information.

19. The method of claim 13, wherein:
the second stroke spatially overlaps at least a portion of the first stroke, and
the first stroke and the second stroke are determined as belonging to different characters based at least in part on the temporal information.

20. The method of claim 13, wherein detecting the end of the first stroke comprises detecting a pause.

21. The method of claim 13, wherein detecting the end of the first stroke comprises detecting a liftoff of the contact detected on the touch-sensitive surface of the device.

22. The method of claim 13, wherein the temporal information about the first stroke and the second stroke comprises a proximity in time between the first stroke and the second stroke.

23. A non-transitory computer readable storage medium storing one or more programs, the one or more programs comprising instructions, which when executed by an electronic device with one or more processors and memory, cause the device to:
receive an indication of a first input that includes movement of a contact detected on a touch-sensitive surface of a device, wherein:
the movement of the contact comprises a first stroke, and
the first stroke has a spatial component and a temporal component;
determine a first probability that the first stroke corresponds to a first character based on the spatial component of the first stroke;
determine a second probability that the first stroke corresponds to the first character based on the temporal component of the first stroke;
determine an aggregate probability that the first stroke corresponds to the first character based on the first probability and the second probability;
detect an end of the first stroke; and
after detecting the end of the first stroke:
detect at least a portion of a second stroke; and
in response to detecting the portion of the second stroke and while the second stroke is still being detected, determine whether the first stroke and the second stroke correspond to a single character based on temporal information about the first stroke and the second stroke.

24. The non-transitory computer readable storage medium of claim 23, wherein the determinations of the first, second and aggregate probabilities are performed while the first stroke is still being detected.

25. The non-transitory computer readable storage medium of claim 23, wherein the determinations of the first, second and aggregate probabilities are repeated periodically while the first stroke is still being detected.

26. The non-transitory computer readable storage medium of claim 23, wherein the first input comprises the first stroke detected during a first time period and the second stroke detected during a second time period, the second stroke having a spatial component and a temporal component, and the one or more programs further comprise instructions that cause the device to:
- determine a third probability that the first stroke corresponds to the first character and the second stroke corresponds to a second character based on the temporal and spatial components of the first and second strokes;
- determine a fourth probability that a combination of the first stroke and the second stroke corresponds to a third character based on the temporal and spatial components of the combination of the first and second strokes;
- in accordance with a determination that the third probability is higher than the fourth probability, select the first character and the second character as inputs; and
- in accordance with a determination that the fourth probability is higher than the third probability, select the third character as an input.

27. The non-transitory computer readable storage medium of claim 23, wherein the one or more programs further comprise instructions that cause the device to:
- determine a plurality of aggregate probabilities for a plurality of characters, a first aggregate probability comprising an aggregate probability that the first stroke corresponds to a first character of the plurality of characters and a second aggregate probability comprising an aggregate probability that the first stroke corresponds to a second character of the plurality of characters; and
- select, from the plurality of characters, a character having a highest aggregate probability as an input.

28. The non-transitory computer readable storage medium of claim 23, wherein:
- the second stroke spatially overlaps at least a portion of the first stroke, and
- the first stroke and the second stroke are determined as belonging to different characters based at least in part on the temporal information.

29. The non-transitory computer readable storage medium of claim 23, wherein:
- the first stroke is spatially segregated from the second stroke, and
- the first stroke and the second stroke are determined as belonging to the same character based at least in part on the temporal information.

30. The non-transitory computer readable storage medium of claim 23, wherein detecting the end of the first stroke comprises detecting a pause.

31. The non-transitory computer readable storage medium of claim 23, wherein detecting the end of the first stroke comprises detecting a liftoff of the contact detected on the touch-sensitive surface of the device.

32. The non-transitory computer readable storage medium of claim 23, wherein the temporal information about the first stroke and the second stroke comprises a proximity in time between the first stroke and the second stroke.

* * * * *